United States Patent
Hasegawa et al.

(10) Patent No.: US 7,286,495 B2
(45) Date of Patent: Oct. 23, 2007

(54) DIGITAL SUBSCRIBER LINE TRANSMISSION METHOD, APPARATUS AND SYSTEM

(75) Inventors: Kazutomo Hasegawa, Kawasaki (JP); Hidetake Asahina, Yokohama (JP); Seiji Miyoshi, Kawasaki (JP); Nobukazu Koizumi, Kawasaki (JP); Yutaka Awata, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 10 days.

(21) Appl. No.: 11/159,806

(22) Filed: Jun. 23, 2005

(65) Prior Publication Data

US 2005/0232171 A1    Oct. 20, 2005

Related U.S. Application Data

(60) Division of application No. 09/671,468, filed on Sep. 27, 2000, which is a continuation-in-part of application No. PCT/JP99/02673, filed on May 21, 1999.

(51) Int. Cl.
*H04B 1/44* (2006.01)
*H04L 5/14* (2006.01)
*H04J 4/00* (2006.01)
*H04J 3/06* (2006.01)

(52) U.S. Cl. ............ 370/282; 370/294; 370/478; 370/503

(58) Field of Classification Search ............ None
See application file for complete search history.

(56) References Cited

U.S. PATENT DOCUMENTS

| 4,756,007 | A |   | 7/1988 | Qureshi et al. |
|---|---|---|---|---|
| 5,353,280 | A |   | 10/1994 | Ungerbock |
| 5,541,967 | A |   | 7/1996 | Gluska et al. |
| 5,991,311 | A |   | 11/1999 | Long et al. |
| 6,122,246 | A | * | 9/2000 | Marchok et al. ............ 370/208 |
| 6,134,283 | A | * | 10/2000 | Sands et al. ............ 375/354 |
| 6,212,247 | B1 |   | 4/2001 | Olafsson |

FOREIGN PATENT DOCUMENTS

| EP | 0 917 315 | 5/1999 |
|---|---|---|
| GB | 2 275 398 | 8/1994 |
| JP | 6-244879 | 9/1994 |
| JP | 10-303872 | 11/1998 |
| JP | 2000-32096 | 1/2000 |
| JP | 2000-101623 | 4/2000 |
| WO | 96/02991 | 2/1996 |
| WO | WO 99/12267 | 3/1999 |

OTHER PUBLICATIONS

Notification of Reasons for Refusal mailed Aug. 1, 2006.

(Continued)

*Primary Examiner*—Daniel J. Ryman
(74) *Attorney, Agent, or Firm*—Katten Muchin Rosenman LLP

(57) ABSTRACT

A digital subscriber line transmission (xDSL)-, system includes a transmitting side which transmits training symbols by adding some data that is contained in a training symbol sequence onto at least one of the beginning and the end of this symbol sequence and then transmits the training symbol sequence. A receiving side removes the data that has been added onto the training symbol sequence and executes training processing. The length of the training symbol sequence and of a transmit symbol sequence at time of normal communication is set in such a manner that the symbol sequence will not fall within an interval in which effects of near-end crosstalk from a neighboring line are received. The data added to the training symbol sequence specifies an interval in which effects of the crosstalk are received.

4 Claims, 41 Drawing Sheets

OTHER PUBLICATIONS

Kazuya Matsumoto, et al. Performance analysis of ADSL modems under the crosstalk noise from ISDN and a study of performance improvement. The Institute of Electronics, Information and Communication Engineer; Technical Report of IEICE vol. 98 No. 147 (Jun. 1998).

N. Koizumi et al. An ADSL Transmission Technique under the TCM-ISDN Noise Environment. Proceedings of the 1998 Communication Society Conference of IEICE, The second collection of treatise (Sep. 1998), p. 296.

Katsutoshi Seki et al. Equalizer Training Algorithm for DMT Modulation System. Proceedings of the 1998 IEICE General Conference Communication 2 (Mar. 1998) p. 402.

Hiroshi Okada et al. A Study on ADSL System for TCM-ISDN Crosstalk. Proceediings of the 1998 IEICE General Conference Communication 2 (Mar. 1998) p. 403.

* cited by examiner

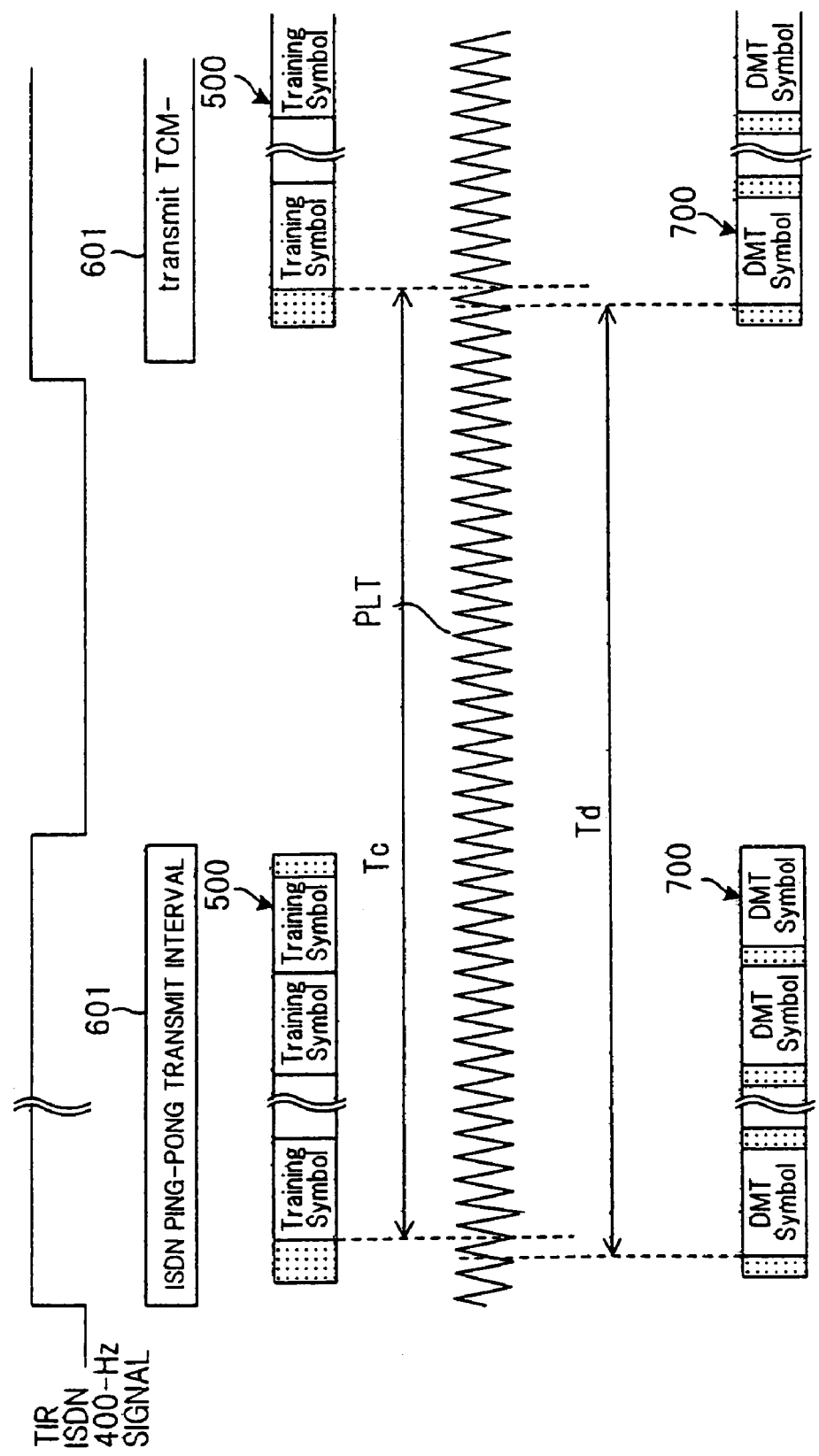

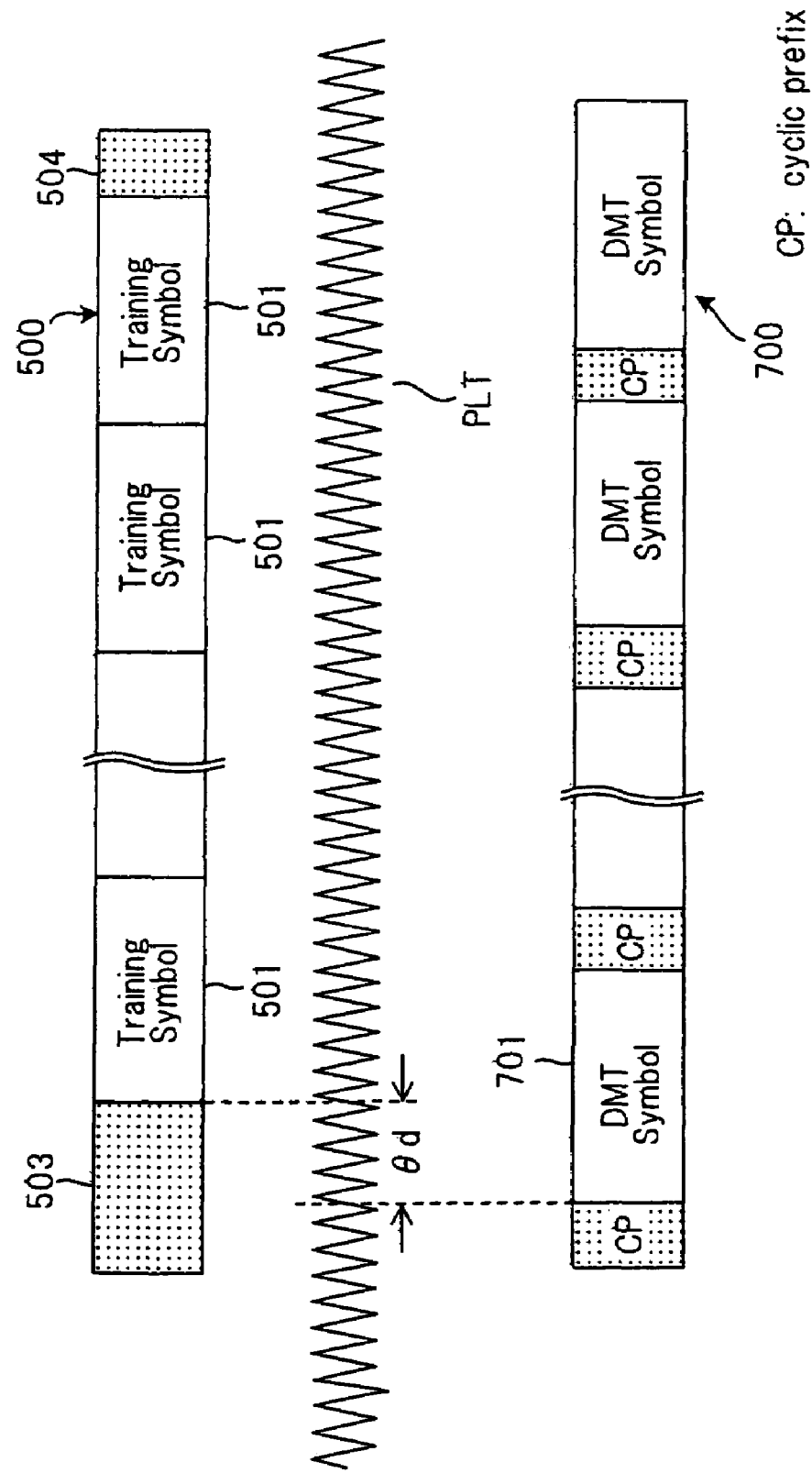

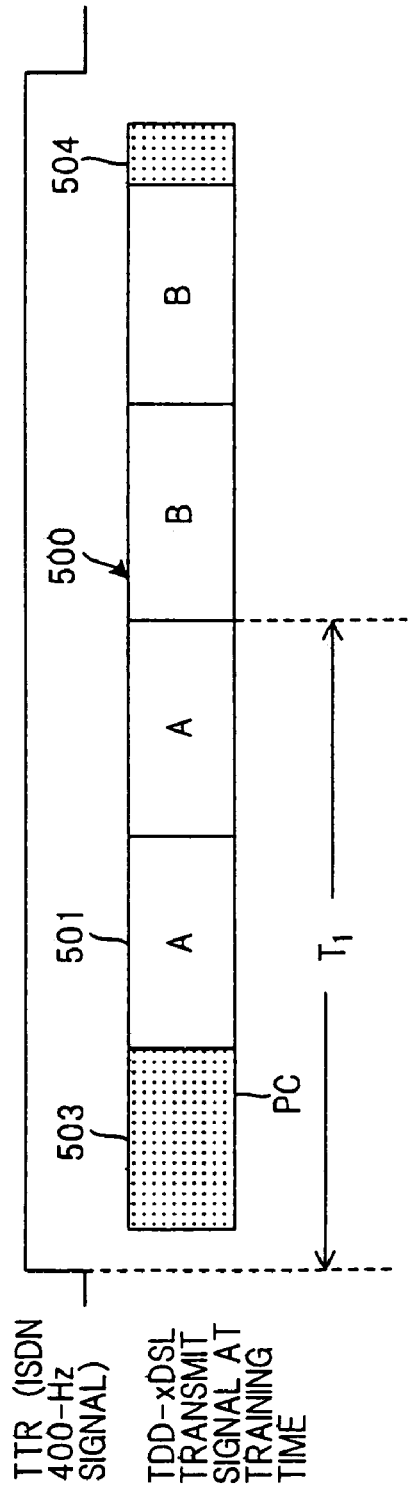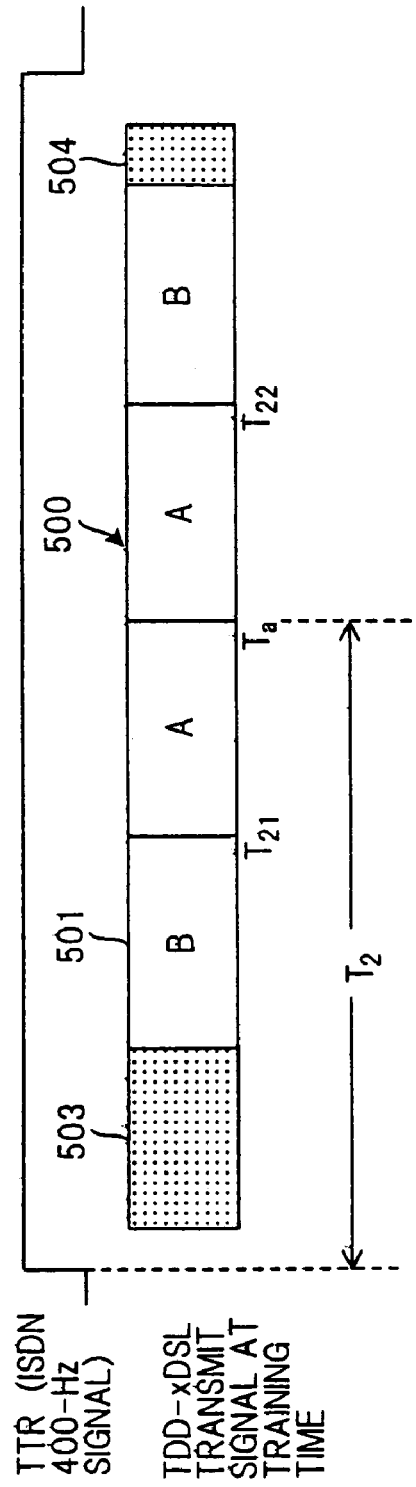

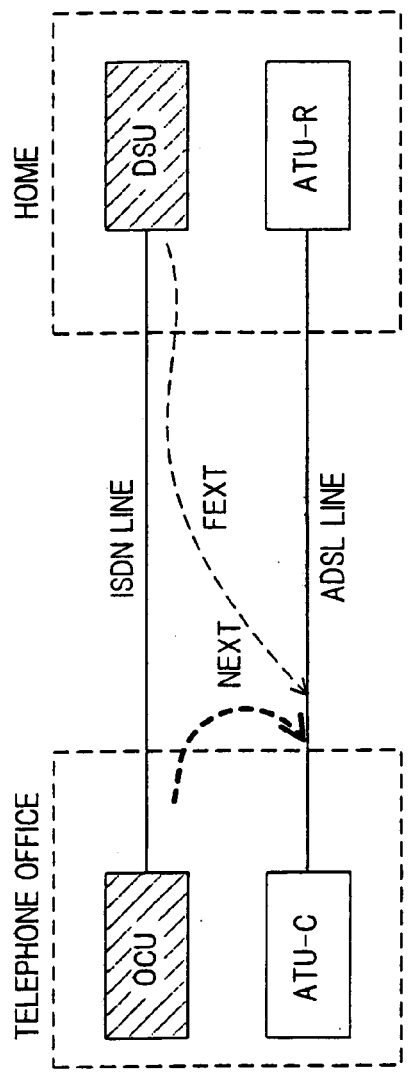
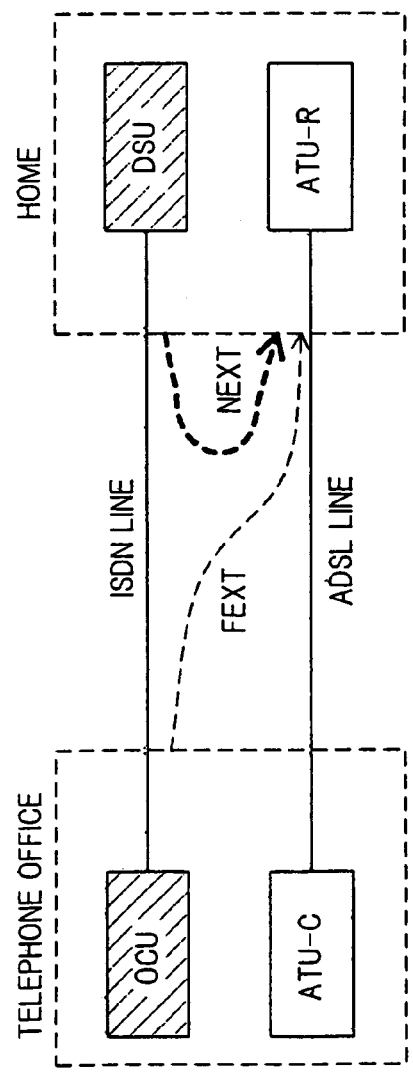
FIG. 33A PRIOR ART
FIG. 33B PRIOR ART

FIG. 41 PRIOR ART
(a) DMT SYMBOLS
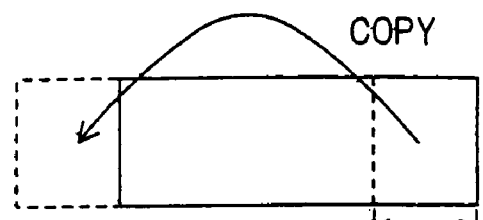
(b) COPY / 32 SAMPLES
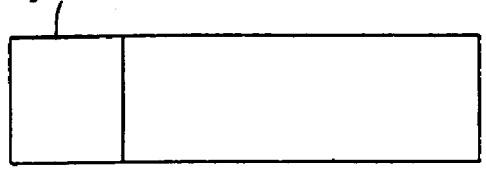
(c) Cyclic Prefix
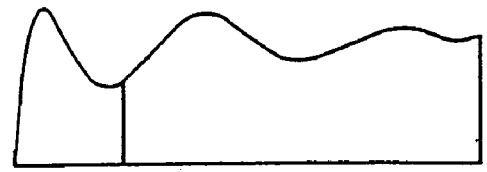
(d)
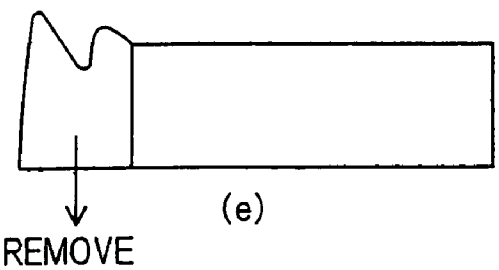
(e) REMOVE
(f)

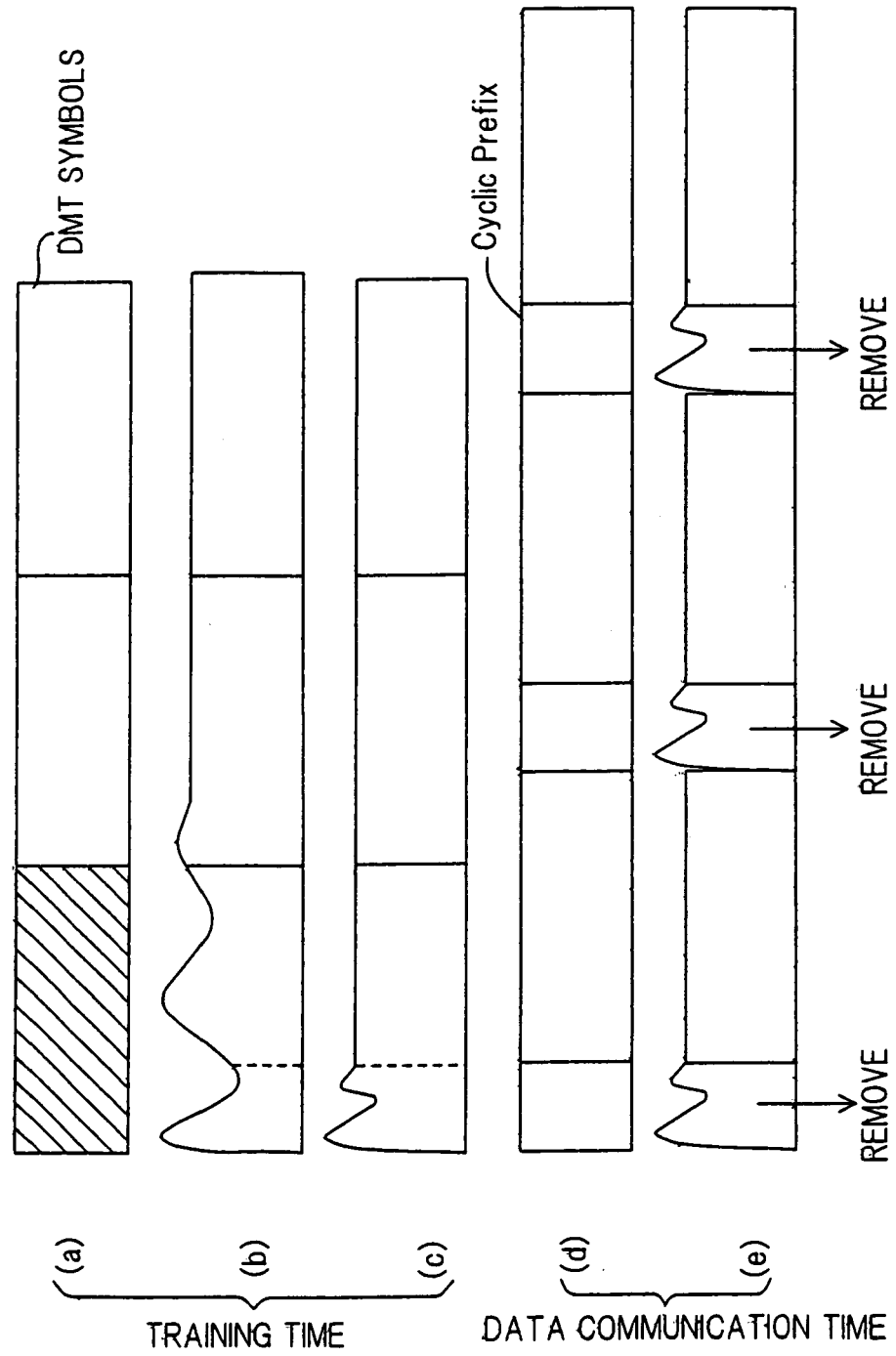

DIGITAL SUBSCRIBER LINE TRANSMISSION METHOD, APPARATUS AND SYSTEM

CROSS-REFERENCE TO RELATED APPLICATIONS

This application is a divisional of U.S. patent application Ser. No. 09/671,468, filed on Sep. 27, 2000, now pending, which is a continuation-in-part of International Application PCT/JP99/02673 filed on May 21, 1999, and claims priority from Japanese Patent Application numbers 2000-146531 filed on May 18, 2000 and 2000-146532 filed on May 18, 2000, the contents of which are herein wholly incorporated by reference.

BACKGROUND OF THE INVENTION

This invention relates to a digital subscriber line transmission method, apparatus and system in which a subscriber line (referred to as a "metallic line" below) connecting a subscriber exchange and a subscriber terminal is utilized as a high-speed data communication line. More particularly, the invention relates to a digital subscriber line transmission method, apparatus and system, which is based upon ISDN ping-pong transmission or TDD-xDSL transmission, used in a periodic crosstalk noise environment.

Multimedia services such as the Internet have become widespread throughout society inclusive of the ordinary home and there is increasing demand for early provision of economical, highly reliable digital subscriber line transmission systems and apparatus for utilizing these services.

xDSL Technology xDSL (Digital Subscriber Line) is known as a technique that provides a digital subscriber line transmission system in which an existing telephone line is utilized as a high-speed data communication line. xSDL is a transmission scheme that utilizes a telephone line and is one modulation/demodulation technique. xDSL is broadly divided into symmetric xDSL and asymmetric xDSL. In symmetric xDSL, the upstream transmission rate from the subscriber residence (referred to as the "subscriber side" below) to the accommodating office (referred to as the "office side" below) and the downstream transmission rate from the office side to the subscriber side are symmetrical; in asymmetric xDSL, the upstream and downstream transmission rates are asymmetrical.

A typical example of asymmetric xDSL is ADSL (Asymmetric DSL) and typical examples of symmetric xDSL are HDSL (High-bit-rate DSL) and SHDSL (Single-pair High-bit-rate DSL). VDSL (Very high-bit-rate DSL) is available as an xDSL technique that is capable of being utilized as both an asymmetric and symmetric DSL. A modulation scheme such as DMT (Discrete Multitone) or CAP (Carrierless Amplitude Phase modulation), etc., is being used for each xDSL system. Examples of ITU-T recommendations concerning ADSL are G.dmt and G.lite, in which the downstream transmission rates are on the order of 6 Mbps and 1.5 Mbps, respectively. Both of these adopt DMT modulation as the modulation method.

DMT Modulation

DMT modulation will be described taking G.dmt as an example. The description will relate only to modulation/demodulation in the downstream direction from the office side to the subscriber side.

With DMT modulation, as shown in FIG. 29, a frequency band of 1.104 MHz is divided into M(=255)–number of multicarriers #1~#255 at intervals of Δf (=4.3125 KHz). In training carried out before communication, the S/N ratios of the respective carriers #1~#255 are measured and it is decided, depending upon the S/N ratios, with which modulation method among 4-QAM, 16-QAM, 64-QAM, 128-QAM . . . modulation methods data is to be transmitted in each carrier. For example, 4-QAM is assigned to a carrier having a small S/N ratio and 16-QAM, 64-QAM, 128-QAM . . . are assigned successively as the S/N ratio increases. It should be noted that 4-QAM is a modulation scheme in which two bits are transmitted at a time, 16-QAM a modulation scheme in which four bits are transmitted at a time, 64-QAM a modulation scheme in which six bits are transmitted at a time, and 128-QAM a modulation scheme in which seven bits are transmitted at a time. Among schemes in which signals are transmitted simultaneously in upstream and downstream directions, a frequency-division transmission scheme uses carriers #1~#32 of the 255 carriers for the upstream direction from the subscriber side to the office side, and uses carriers #33~#255 for the downstream direction from the office side to the subscriber side. With a scheme in which signals are not transmitted simultaneously in the upstream and downstream directions, it is readily feasible to use all of the carriers #1~#255 for the upstream and downstream directions.

FIG. 30 is a functional block diagram of a subscriber line transmission system based upon DMT modulation. Entered transmission data addressed to a subscriber is stored in an amount conforming to the time for one symbol (=¼₀₀₀ sec) in a serial-parallel conversion buffer (Serial-to-Parallel Buffer) 10. The stored data is divided into transmission bit counts per carrier decided and saved in a transmit bitmap 60 by training in advance. The divided data is then input to an encoder 20. More specifically, since the QAM modulation scheme of each carrier is known from training, one symbol's worth of a bit sequence is divided $b_k$ bits at a time, where the bit count $b_k$ conforms to the QAM modulation scheme of each carrier, and the bits are input to the encoder 20. As a result, the total number of output bits per symbol is $\Sigma b_k$ (k=1~M). The encoder 20 converts each carrier corresponding to an input bit sequence to signal-point data (signal-point data on a constellation diagram) for performing quadrature amplitude modulation (QAM) and inputs the converted data to an Inverse Fast-Fourier Transform (IFFT) unit 30. The IFFT unit 30 applies quadrature amplitude modulation to each signal point by performing an IFFT operation and inputs the processed data to a parallel-to-serial conversion buffer (Parallel-to-Serial Buffer) 40. Here a total 32 samples, namely IFFT output samples 480-511, are duplicately attached to the beginning of a DMT signal as a cyclic prefix (the details of which will be described later). The parallel-to-serial conversion buffer 40 inputs 512+32 items of sample data to a D/A converter 50 successively in serial fashion. The D/A converter 50 converts the input digital data to an analog signal at a sampling frequency of 2.208 MHz and sends the analog signal to the subscriber side via a metallic line 70.

On the subscriber side, an A/D converter 80 converts the input analog signal to a 2.208-MHz digital signal and inputs the digital signal to a time domain equalizer (TEQ) 90. The latter applies processing to the input digital data in such a manner that inter-symbol interference (ISI) will fall within the cyclic prefix of 32 symbols, and inputs the processed data to a serial-to-parallel conversion buffer 100. The latter stores one DMT symbol's worth of data and subsequently removes the cyclic prefix and inputs one DMT symbol's worth of data to a fast-Fourier transform (FFT) unit 110 simultaneously in parallel fashion. The FFT unit 110 implements a fast-Fourier transform and generates (demodulates) 255 signal points. A frequency domain equalizer (FEQ) 120 subjects the demodulated 255 items of signal-point data to inter-channel interference (ICI) compensation. A decoder 130 decodes the 255 items of signal-point data in accordance with a receive bitmap 150, which has values identical with those of the transmit bitmap 60, and stores the data obtained by decoding in a parallel-to-serial conversion buffer 140. The data is subsequently read out of this buffer in the form of a bit serial. This data constitutes the receive data.

Crosstalk from ISDN ping-pong transmission

ISDN time compression multiplexing (TCM) which is referred to as ISDN ping-pong transmission separates transmit and receive intervals in time-shared fashion (the total of one transmit interval and one receive interval is 2.5 ms) and makes the transmit and receive timings the same for all neighboring devices. With ISDN ping-pong transmission, 2B+D 144 kbps transmit data is demarcated every 2.5 ms, compressed to 320 kbps by rate conversion and transmitted in the transmit interval. As a consequence, the frequency band of ISDN ping-pong transmission overlaps the frequency band of ADSL (or of G.dmt), as shown in FIG. 31. Already existing telephone lines have a design optimized to a frequency band of about 200 Hz -3.4 kHz, which is the frequency band of the human voice. If ADSL and ISDN high-frequency signals are passed through such telephone lines, the fact that the lines are bundled together as shown in FIG. 32 allows the ISDN signal to leak into the ADSL telephone line and act as noise that interferes with the ADSL communication. Such noise is crosstalk noise. The ADSL transmission rate is limited by the level of this crosstalk noise.

FIG. 33 A and FIG. 33 B are a diagrams useful in describing interference (crosstalk) from an ISDN line to an ADSL, in which FIG. 33A is for describing interference on an ADSL unit on the office side (ATU-C: ADSL Transceiver Unit at the Central office end) and FIG. 33B is for describing interference on an ADSL unit on the subscriber side (ATU-R: ADSL Transceiver Unit at the Central terminal end). In FIG. 33A, the ADSL unit ATU-C on the office side is influenced by a large amount of noise when an OCU (Office Channel Unit) of the ISDN line is transmitting. This crosstalk noise is referred to as near-end crosstalk noise (NEXT). On the other hand, when a DSU (Digital Service Unit) is transmitting, this signal acts as noise by leaking into the ATU-C. This crosstalk noise is referred to as far-end crosstalk noise (FEXT). FEXT is remote with regard to the ATU-C, i.e., is noise from the remote end. In comparison with NEXT, FEXT has a fairly low level.

In FIG. 33 B, the ADSL unit ATU-R on the subscriber side is influenced by a large amount of noise when a DSU of the ISDN line is transmitting. This crosstalk noise is referred to as near-end crosstalk noise (NEXT). On the other hand, when an OCU is transmitting, this signal acts as far-end crosstalk noise (FEXT) by leaking into the ATU-R. In comparison with NEXT, FEXT has a fairly low level. Thus, in ADSL communication, it is necessary to reduce the effects of NEXT.

As mentioned above, when an ISDN ping-pong transmission line is close to an ADSL, the ADSL is influenced by TCM crosstalk (Time compression multiplexing crosstalk) from the ISDN ping-pong transmission line in a manner set forth below. In accordance with ISDN ping-pong transmission, the office side transmits the downstream data in the first-half cycles of 400 Hz in sync with an ISDN 400-Hz signal TTR which is TCM-ISDN timing reference as shown in FIG. 34, and the subscriber side transmits the upstream data in the second-half cycles after it receives the downstream data. The ADSL unit ATU-C on the office side, therefore, is influenced by near-end crosstalk ($NEXT_1$) from the ISDN in the first-half cycles of 400 Hz and is influenced by far-end crosstalk ($FEXT_1$) from the upstream data of the ISDN on the subscriber side in the second-half cycles.

In a manner converse with respect to the office side, the ADSL unit ATU-R on the subscriber side is influenced by $FEXT_2$ in the first-half cycles of 400 Hz and is influenced by $NEXT_2$ in the second-half cycles. The time intervals in which the effects of NEXT and FEXT are received shall be referred to as NEXT and FEXT intervals, respectively. FIG. 34 illustrates the NEXT and FEXT intervals on the subscriber side.

Sliding-Window Method

A "sliding-window method" has been proposed in the specification of Japanese Patent Application 10-144913 (issuing as Japanese Patent No. 3,480,313) for the purpose of providing a digital subscriber line transmission system that is capable of transmitting an ADSL signal satisfactorily in an environment where there is the above-described crosstalk from an ISDN ping-pong transmission. The sliding-window method is such that in the case of the downstream direction in which an ADSL signal is transmitted from an ADSL unit (ATU-C) on the office side to an ADSL unit (ATU-R) on the subscriber side, the state of the ADSL signal transmitted by the ADSL unit (ATU-C) on the office side in an environment where there is crosstalk from an ISDN ping-pong transmission is decided as set forth below. The method includes dual bitmap and FEXT bitmap methods.

Specifically, if an ADSL symbol (DMT symbol) SB to be transmitted falls entirely within the FEXT interval on the subscriber side, as shown in FIG. 34, the ADSL unit (ATU-C) on the office side transmits this symbol as an inside symbol ISB by a sliding window SLW through a high-density transmission. If a symbol SB to be transmitted falls even partially within the NEXT interval on the subscriber side, the ADSL unit (ATU-C) on the office side transmits this symbol as an outside symbol OSB through a low-density transmission (dual bitmap method). In the upstream direction also, the ADSL unit (ATU-R) on the subscriber side transmits the ADSL symbols upon dividing them into inside and outside symbols ISB, OSB, respectively, through a method similar to that employed in the downstream direction.

With the dual bitmap method, symbols are transmitted in low density even outside the sliding window SLW in the downstream direction. However, there is also the FEXT bitmap method, in which the ADSL unit (ATU-C) on the office side transmits only a pilot-tone signal PLT, which is a tone-signal for timing synchronization, outside the sliding window SLW. In this case the ADSL unit (ATU-R) on the subscriber side makes no transmission outside the sliding window SLW in the upstream direction.

FIG. 35 is a diagram showing the relationship between transmit/receive in the OCU of the ISDN and the ADSL symbols in the ADSL unit ATU-C on the office side, this FIG. 35 illustrates ADSL symbols in both the dual bitmap and FEXT bitmap cases.

Bitmap Creation

To support the dual bitmap method, it is required that two types of bitmaps, namely a bitmap for the inside symbols and a bitmap for the outside symbols, be prepared at the time of training in both the transmit bitmap unit 60 and receive bitmap unit 150 shown in FIG. 30. With the FEXT bitmap method, the outside-symbol bitmap of these two types of bitmaps is unnecessary.

The bitmap which shows the bit count assigned to each carrier is decided on the receiving side. That is, the number of assigned bits for upstream signals is decided on the office side and the number of assigned bits for downstream signals is decided on the subscriber side. When training is performed, the ADSL units on the office and subscriber side decide the bitmaps in accordance with a protocol referred to as "B & G (bit & gain)".

FIG. 36 is a diagram useful in describing the B & G protocol for the upstream direction. (1) After the ADSL units recognize each other at the time of training, the ADSL unit ATU-R on the subscriber side sends several frequency signals to the opposing ADSL unit ATU-C on the office side, by way of example. (2) The ADSL unit ATU-C on the office side measures the noise level and received-signal level on a per-carrier basis and calculates the S/N ratios. (3) The ADSL unit ATU-C on the office side creates a bitmap based upon the S/N ratios calculated and reports this bitmap and transmission level to the ADSL unit ATU-R on the subscriber side. (4) The ADSL unit ATU-R on the subscriber side performs DMT modulation based upon the reported bitmap and transmission-level information and transmits the resulting data.

FIG. 37 is a block diagram of an arrangement in which S/N ratio is measured by the ADSL unit ATU-R on the subscriber side. Received data enters a demodulator 210, which outputs signal-point data on a per-carrier basis as demodulated data. Further, a reference 220 outputs carrier-by-carrier signal-point data that should be received originally. A difference ERROR develops between the signal-point data from the reference and the demodulated signal-point data, and the ERROR for each carrier is input to a selector 260.

An internal clock 230 of the device is frequency-divided to 400 Hz by a frequency divider 240 and the resulting signal is input to a phase discriminator 250. The 400-Hz signal has its phase matched beforehand to that of a 400-Hz signal (ISDN 400-Hz signal) on the office side by 400-Hz information transmitted from the office side via the demodulator 210. Using the 400-Hz signal input thereto, the phase discriminator 250 determines whether a received DMT symbol lies within the FEXT interval, the NEXT interval or outside these intervals and inputs the result to the selector 260. The latter outputs the above-mentioned ERROR signal to a NEXT-interval S/N measurement unit 270 or FEXT-interval S/N measurement unit 280 in accordance with the information that enters from the phase discriminator 250. Each S/N measurement unit integrates ERROR to calculate the S/N ratio and each outputs the S/N ratio to a transmit-bit-count conversion unit 290 carrier by carrier. From the entered carrier-by-carrier S/N ratios, the transmit-bit-count conversion unit 290 calculates the bit count (bitmap) transmitted carrier by carrier and calculates a bitmap b-NEXT for the NEXT interval and a bitmap b-FEXT for the FEXT interval.

Frame Structure

A hyperframe has been introduced for the purpose of providing a digital subscriber line transmission system that is capable of transmitting an ADSL signal satisfactorily in an environment where there is the above-described crosstalk from an ISDN ping-pong transmission. The ISDN ping-pong transmission switches between transmit/receive every half-cycle of the 400-Hz clock whose period is 2.5 ms. On the other hand, one symbol, which is the unit of transmission in ADSL transmission whose institutionalization as a global standard is proceeding, has a duration of about 0.246 ms. Accordingly, since 34 cycles of the ISDN ping-pong transmission, which is the least common multiple of the two types of communication, and the length of time of 345 DMT symbols in ADSL transmission coincide, this interval is defined as a "hyperframe".

As shown in FIG. 38, it is so arranged that one frame becomes one symbol in ADSL. At the time of normal data communication, one superframe is constructed from 68 ADSL frames for data and one synchronization frame (S). There are also cases where an inverse synchronization symbol (I) is used instead of the synchronization symbol (S). The inverse synchronization symbol (I) is a symbol realized by rotating the phase of each carrier of the synchronization symbol (S) by 180°. As shown in FIG. 38, one hyperframe is constructed by collecting together five superframes (=345 symbols). FIG. 38 illustrates the case for the downstream direction in which the ADSL unit ATU-C on the office side transmits an ADSL signal to the ADSL unit ATU-R on the subscriber side. In this case it has been decided that the inverse synchronization symbol (I) be situated in the fourth superframe of one hyperframe. In the case of the upstream direction, the inverse synchronization symbol (I) is contained in the first superframe of one hyperframe. Further, one hyperframe is synchronized to 34 cycles of the 400-Hz signal in ISDN ping-pong transmission.

Alternative Frame Structure

In a case where an ISDN ping-pong transmission line is close to an ADSL, the ADSL is affected by both NEXT and FEXT TCM crosstalk from the ISDN ping-pong transmission line, as set forth above. For the purpose of providing a digital subscriber line transmission system that is capable of transmitting an ADSL signal satisfactorily in an environment where there is the above-described crosstalk from an ISDN ping-pong transmission, there is a method available which, unlike that which relies upon the above-mentioned hyperframe, transmits ADSL symbols upon synchronizing them to an ISDN ping-pong transmission.

In accordance with ISDN ping-pong transmission, the OCU on the office side transmits the downstream data in the first-half cycles of 400 Hz and receives the upstream data in the second-half cycles of 400 Hz in sync with the ISDN 400-Hz signal TTR, as illustrated in FIG. 39. In ADSL transmission also, the ADSL unit on the office side transmits ADSL symbols for the downstream FEXT interval in the first-half cycles of 400 Hz and transmits ADSL symbols for the downstream NEXT interval in the second-half cycles of 400 Hz in sync with the ISDN 400-Hz signal TTR. This is true also with regard-to the ADSL unit on the subscriber side. That is, two bitmaps are prepared, namely-a bitmap (DMT symbol A) for the NEXT reception interval and a bitmap (DMT symbol B) for the FEXT reception interval. Then, as shown in FIG. 39, the number of transmitted bits is reduced to improve S/N tolerance by transmitting the DMT symbols A in the NEXT interval and the number of transmitted bits is increased to enlarge transmission capacity by transmitting the DMT symbols B in the FEXT interval. By setting the cyclic prefix length to an appropriate length at this time, the number of ADSL symbols for the FEXT interval and the number of ADSL symbols for the NEXT interval are made to coincide. For example, a cyclic prefix of 40 samples which results in 250 μs per DMT symbol is adopted as opposed to an original cyclic prefix of 32 samples which results in 246 μs per DMT symbol, whereby one period of TCM crosstalk and the length of time of ten DMT signals are made to agree.

Introduction of TDD-xDSL

A TDD-xDSL (time-division duplex-xDSL) scheme is being considered as an xDSL scheme that does not use the above-described sliding window and hyperframes. The TDD-xDSL scheme is one which transmits symbols in sync with the above-mentioned ISDN ping-pong transmission but, unlike the method described above, it does not transmit TDD-xDSL symbols in the NEXT intervals. That is, the TDD-xDSL scheme uses an xDSL in the upstream and downstream directions in time-shared fashion and employs all 255 carriers #1-#255 in data transmission in the upstream and downstream directions.

When a TDD-xDSL symbol sequence 460 is transmitted in sync with an ISDN ping-pong transmission on the office side, a TDD-xDSL symbol sequence 480 received on the subscriber side is affected only by FEXT 440 from the ISDN, as shown in FIG. 40. When a TDD-xDSL symbol sequence 490 is transmitted in sync with an ISDN ping-pong transmission on the subscriber side, a TDD-xDSL symbol sequence 470 received on the office side is affected only by FEXT 430 from the ISDN. Accordingly, it is possible for a TDD-xDSL symbol sequence to avoid being affected by NEXT from an ISDN ping-pong transmission. In accordance with this transmission system, the two types of bitmaps that were required with the dual bitmap method are no longer necessary; here only one is sufficient, just as in the FEXT bitmap method.

ISI Removal Method

The time domain equalizer (TEQ) shown in FIG. 30 operates using the cyclic prefix in the manner described below.

A DMT symbol which enters the parallel-to-serial conversion buffer 40 in FIG. 30 represents a signal state that has no waveform distortion, as illustrated in (a) of FIG. 41. The parallel-to-serial conversion buffer 40 executes processing through which the 32 symbols at the end of this DMT symbol are added onto the beginning of the DMT symbol by copying, as illustrated in (b) of FIG. 41. The portion added on is referred to as the cyclic prefix. The DMT symbol onto which the cyclic prefix has been added is transmitted to the receiving side following subsequent processing on the transmitting side, as shown in (c) of FIG. 41.

A signal that has been received via the metallic line 70, the amplitude and delay characteristics of which are not constant with respect to frequency, becomes distorted owing to the influence of inter-symbol interference (ISI), as illustrated in (d) of FIG. 41.

However, the TEQ 90 has its constants set by training in such a manner that ISI falls within the cyclic prefix of 32 symbols (this is referred to as "TEQ training"). When the TEQ 90 receives the signal indicated at (d) in FIG. 41, therefore, the TEQ 90 executes processing in such a manner that ISI will fall within the cyclic prefix of 32 symbols, as shown in (e) of FIG. 41. Thereafter, the serial-to-parallel buffer 100 removes the cyclic prefix from the TEQ output. As a result, it is possible to obtain a DMT symbol from which the effects of ISI have been eliminated, as shown in (f) in FIG. 41.

Influence of ISI on xDSL Symbol

The influence of ISI on the xDSL symbol will be described with reference to FIG. 42. Illustrated in (a) of FIG. 42 is an ADSL transmit symbol sequence in a case where a continuous signal is transmitted at the time of training. It is assumed here that there is no continuity between the shaded ADSL transmit symbol illustrated in (a) of FIG. 42 and the ADSL transmit signal that precedes it. Illustrated in (b) of FIG. 42(b) is an ADSL receive symbol sequence corresponding to the ADSL transmit symbol sequence in (a) of FIG. 42 before TEQ training, and illustrated in (c) of FIG. 42 is an ADSL receive symbol sequence corresponding to the ADSL transmit symbol sequence in (a) of FIG. 42 after TEQ training.

Further, Illustrated in (d) of FIG. 42 is an ADSL transmit symbol sequence onto which a cyclic prefix which prevails at the time of normal data communication has been added, and illustrated in (e) of FIG. 42 is an ADSL receive symbol sequence corresponding to the ADSL transmit symbol sequence in (d) of FIG. 42.

(1) Influence After TEQ Training

As set forth above, the TEQ acts to remove the effects of ISI from a receive signal by using the cyclic prefix. If the cyclic prefix is added onto each ADSL transmit training symbol at the time of normal data communication, as shown in (d) of FIG. 42, the TEQ executes processing in such a manner that ISI falls within only the cyclic prefix of 32 symbols, thereby removing the effects of ISI from the receive signal.

However, at the time of training in which a continuous signal based upon the same pattern is transmitted, a cyclic prefix is not added onto any ADSL transmit training symbol, as shown in (a) of FIG. 42. The reason for this is that since a continuous signal is not affected by ISI, so cyclic prefix is unnecessary for the training symbols. On the contrary, if a cyclic prefix were added on, the symbol rate would decline correspondingly and it is therefore better not to add on a cyclic prefix.

However, in a case where a burst symbol sequence is sent as a transmit signal, as in the sliding-window method (FEXT bitmap method) or in the method (TDD-xDSL) of transmitting symbols in sync with ISDN ping-pong transmission, continuity of the transmit signal is lost. As a result, at the time of training in which a continuous signal is transmitted, the ADSL receive symbol at the beginning of the ADSL receive symbol sequence is influenced by waveform distortion corresponding to ISI, as shown in (c) of FIG. 42, even when TEQ training has been completed, and training cannot be carried out using this ADSL receive symbol at this beginning of the sequence.

(2) Influence Before TEQ Training

Illustrated in (b) of FIG. 42 is an ADSL receive symbol sequence resulting from the ADSL transmit symbol sequence in (a) of FIG. 42 before TEQ training is performed. Here also, however, the ADSL receive symbol is distorted owing to the effects of ISI for the reason set forth above. In (c) of FIG. 42, the influence of waveform distortion corresponding to ISI on the leading ADSL receive symbol falls within 32 symbols owing to the TEQ. In (b) of FIG. 42, on the other hand, this is an ADSL receive symbol sequence before TEQ training is performed and in general, therefore, the influence of ISI on the ADSL receive symbol does not fall within 32 symbols. It is considered that before TEQ training is performed, the influence of waveform distortion acts upon ADSL receive symbols from the second onward as well, as shown in (b) of FIG. 42. Further, there are instances where the ADSL receive symbol at the end of the ADSL receive symbol sequence also is affected by ISI, though this is not illustrated in FIG. 42.

Thus, at the time of training in which a continuous signal based upon the same pattern is transmitted, a cyclic prefix is not added onto each transmit symbol. As a consequence, in TDD-xDSL transmission in which a burst symbol sequence is transmitted as a training signal, the receiving side cannot respond immediately at the rising edge of the burst symbol sequence and waveform distortion occurs at the beginning of the burst symbol sequence. Accordingly, training is carried out only by the remaining TDD-xDSL receive symbols that have not been influenced by waveform distortion. However, in an instance where four DMT symbols are transmitted in one burst of training, the DMT symbols capable of being used in training are three in number. A problem that arises, therefore, is prolonged training time.

Further, if the transmit training symbol sequence falls within the receive interval (NEXT interval) of an ISDN ping-pong transmission in TDD-xDSL transmission, the transmission is influenced by NEXT from the ISDN line and the TDD-xDSL transmission cannot be performed with a favorable S/N ratio.

Further, in TDD-xDSL transmission, there is no established technique for setting the frequency of a pilot-tone signal used as a timing regeneration signal so as to assure continuity of sample data in contiguous transmit burst signal sequences. A problem that arises is that processing cannot be executed at an accurate timing.

Further, with TDD-xDSL, there is a phase difference between the phase of a training symbol onto which a cyclic prefix for transceiver training has not been added and the phase of a symbol obtained by removing a cyclic prefix from a symbol onto which this cyclic prefix was added at the time of normal data communication. As a consequence, a problem which arises is that the phase of a timing regeneration signal (pilot-tone signal) shifts when a sequence makes a transition from a training symbol onto which a cyclic prefix has not be added to a symbol onto which a cyclic prefix has been added (a training→normal communication transition).

Furthermore, though it is necessary for the office side to synchronize a TDD-xDSL transmission to an ISDN ping-pong transmission, the same is true on the subscriber side as well. Though the office side can use an 8 kHz-network clock to obtain a 400-Hz synchronization signal to which the ISDN ping-pong transmission is synchronized, the subscriber side cannot obtain this 400-Hz synchronization signal. Accordingly, it is important for the subscriber side to have the office side report the transmission phase of the TDD-xDSL accurately so that this information can be obtained. This makes it necessary to provide means for reporting the transmission phase from the office side to the subscriber side efficiently.

The foregoing is for a case where crosstalk from an ISDN line to an xDSL is taken into consideration. However, crosstalk is not limited to that from an ISDN line; there is crosstalk also from other xDSLs within the same cable. In particular, since TDD-xDSL transmission is synchronized to the 400-Hz siqnal TTR of an ISDN ping-pong transmission to perform downstream and upstream transmissions alternately in time-shared fashion, as mentioned above, the xDSL is influenced by crosstalk (NEXT, FEXT), which is similar to that of ISDN ping-pong transmission, from other TDD-xDSLs. Accordingly, the above-described problem holds not only for crosstalk from an ISDN line but also for crosstalk from other TDD-xDSLs.

SUMMARY OF THE INVENTION

The present invention has been devised based upon new findings and considerations regarding the above-described points and its object is to provide a concrete method concerning the adoption of an effective transmission technique for TDD-xDSL in an environment where noise is received from ISDN ping-pong transmission or other TDD-xDSL transmissions, or a digital subscriber line transmission apparatus having means for implementing this method.

Another object of the present invention is to shorten training time.

Another object of the present invention is to so arrange it that a transmit training symbol sequence after the addition thereto of redundancy data will not fall within the receive interval (NEXT interval) of an ISDN ping-pong transmission or TDD-xDSL transmission, thereby eliminating the effects of NEXT from an ISDN line so that a TDD-xDSL transmission can be performed with an excellent S/N ratio.

A further object of the present invention is to assure continuity of sample data in contiguous transmit burst symbol sequences.

A further object of the present invention is to so arrange it that when there is sequence transition from training to normal data communication, phase shift of a timing regeneration signal (pilot-tone signal) will not occur.

A further object of the present invention is to report timing information, e.g., the phase of an ISDN 400-Hz signal, which specifies the period during which the effects of crosstalk are received from a neighboring line, from the office side to the subscriber side accurately and efficiently.

In a TDD-xDSL transmission method according to the present invention, a DMT symbol sequence is transmitted upon adding some data that is contained within the DMT symbol sequence onto the beginning or end or onto both the beginning and end of the sequence redundantly at the time of training, which is carried out before normal communication, and the redundancy data is then removed on the receiving side. If this expedient is adopted, distortion develops in the redundancy portions but not in the portions of the training symbols. Training can be carried out using all training symbols and training time can be shortened.

Further, the length of the transmit training symbol sequence after the redundancy data is added on is made such that the training symbol sequence will fall within the transmit interval of an ISDN ping-pong transmission or of another TDD-xDSL transmission. For example, the system is set up in such a manner that the training symbol sequence will not fall within the receive interval (NEXT interval) of an ISDN ping-pong transmission. If this arrangement is adopted, communication with an excellent S/N ratio can be performed by eliminating the effects of NEXT from ISDN ping-pong transmission or other TDD-xDSL transmission.

Further, in a TDD-xDSL transmission, the frequency of a pilot-tone signal serving as a timing regeneration signal is set so as to assure continuity of sample data in contiguous transmit burst symbol sequences. If this arrangement is adopted, the phase of a pilot-tone singal will not shift between contiguous transmit burst symbol sequences and processing can be executed at an accurate timing.

In TDD-xDSL transmission according to the present invention, the phase difference between the phase of a training symbol onto which a cyclic prefix has not been added and the phase of a DMT symbol obtained by removing the cyclic prefix at the time of normal data communication is made a whole-number multiple of the cycle of the pilot-tone signal used as a timing regeneration signal. As a result, when there is a sequence transition from training to normal data communication, the timing regeneration signal (pilot-tone signal) does not develop a phase shift. This makes accurate processing possible.

In TDD-xDSL transmission according to the present invention, when the subscriber side is notified of transmit timing (the phase of an ISDN 400-Hz signal) of a TDD-xDSL burst signal on the office side, a tone-signal the phase whereof varies one or more times within one transmission burst is transmitted separately of the pilot-tone signal, and this change in the phase of the tone-singal is detected on the receiving side to identify the transmit timing of the TDD-xDSL burst signal. If this expedient is adopted, a correct TDD-xDSL transmission can be performed by detecting the transmit timing (the phase of an ISDN 400-Hz signal) at the time of training of a TDD-xDSL transmission. In this case the phase of the tone-signal can be changed 90° or 180°. If this arrangement is adopted, the transmit timing (the phase of an ISDN 400-Hz signal) can be recognized reliably even if the transmit timing is unknown initially.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is another diagram useful in describing frame phase relationship between bursts (in the downstream case);

FIG. 6 is a diagram showing the phase relationship between burst frames at the time of training and at the time of normal communication;

FIGS. 7A and 7B are diagrams useful in describing a method of reporting transmit phase (the phase of an ISDN 400-Hz signal) of a TDD-xDSL at the time of training;

FIGS. 33A and 33B are diagrams useful in describing interference (crosstalk) from an ISDN line on an ADSL;

FIG. 41 is diagram useful in describing a method of removing ISI; and

FIG. 42 is diagram useful in describing the effects of ISI on xDSL symbols.

DESCRIPTION OF THE PREFERRED EMBODIMENTS (A) Overview of the Present Invention;

The present invention has a number of characterizing features, which are set forth below, when applied in TDD-xDSL transmission in an environment in which the TDD-xDSL transmission is influenced by periodic noise from an ISDN ping-pong transmission line or from a transmission through another TDD-xDSL. The description rendered below relates to TDD-xDSL transmission in an environment in which this transmission is influenced by periodic noise from an ISDN ping-pong transmission line.

(a) First Characterizing Feature

Figure 1:
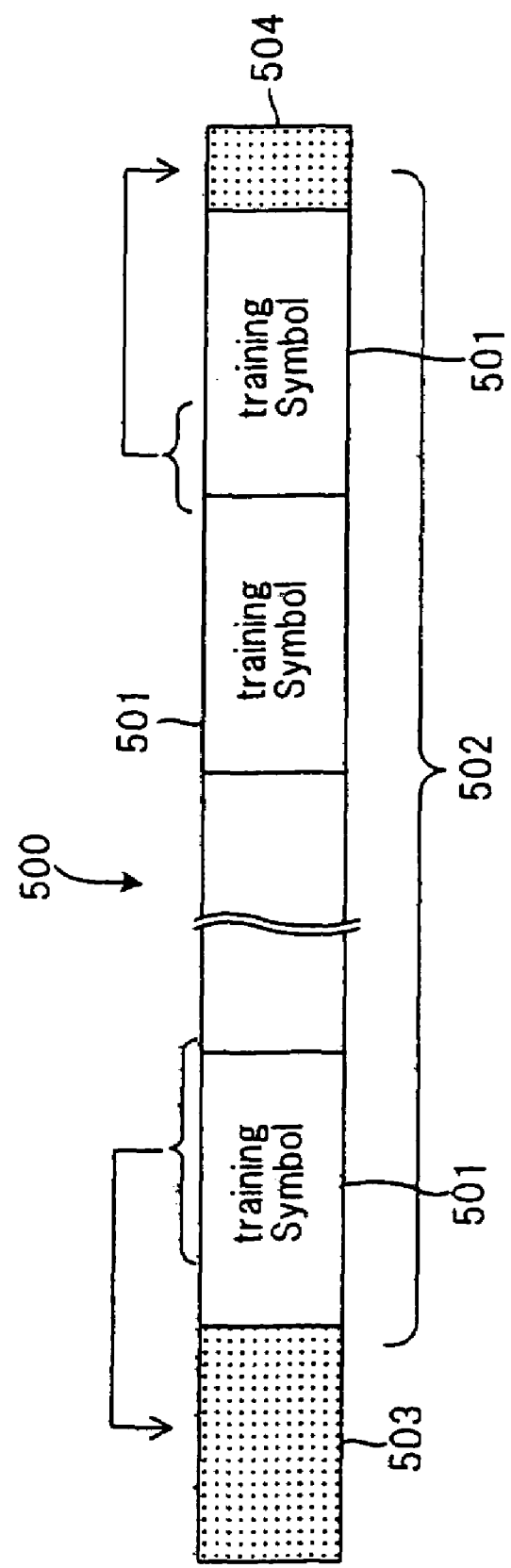
FIG. 1 is a diagram useful in describing a transmit symbol sequence at the time of TDD-xDSL training.

A first characterizing feature is the transmission of a training symbol sequence 500 of the kind shown in FIG. 1 in the training of an ADSL unit (transceiver) of a TDD-xDSL. A conventional transmit symbol sequence 502 is constructed by connecting training symbols 501 each of which is devoid of a cyclic prefix. In the training of a TDD-xDSL transceiver, (1) a pattern 503, which is identical with the end portion of the leading training symbol 501, is added onto the beginning of the conventional transmit symbol sequence 502 as a redundancy signal and is composed of a predetermined number of samples, thereby making it possible to form a pattern of continuous training symbols that includes the portion added on. The length of the portion added on is a predetermined sample count n1 that is larger than a cyclic prefix. (2) Or, in another option, a pattern 504 identical with the leading-end portion of the final training symbol 501 is added onto the end of the transmit symbol sequence 502 as a redundancy signal and is composed of a sample count n2 determined separately of the sample count n1 attached to the beginning in option (1) above. (3) Or, in yet another option, the redundancy signals 503, 504 are added on to both the beginning and end, respectively, of the transmit symbol sequence 502.

With TDD-xDSL, each symbol at the time of training has the same pattern. If an IFFT is used as an intermediary, therefore, a signal continuous between symbols can be transmitted. Accordingly, by adding the end portion of a leading training symbol onto the beginning of a final transmit symbol sequence, or by adding the leading-end portion of a training symbol onto the end of the transmit symbol sequence, or by adding both of these onto the respective ends of the transmit symbol sequence, a continuous signal that includes the added on portion can be formed. If a redundancy signal is thus added onto the beginning or end of a transmit symbol sequence, only the redundancy signal portions (503, 504) are affected by distortion caused by ISI; the transmit symbol sequence other than the redundancy signal portions (503, 504) develops no distortion. All of these symbols, therefore, can be used as training symbols. This makes it possible to shorten training time. It should be noted that transmission time is not prolonged even though the redundancy signals are added on. The reason is that the redundancy signals can be transmitted utilizing those periods in the transmit intervals of the TDD-xDSL in which signals are not transmitted.

(b) Second Characterizing Feature

A second characterizing feature is that the transmit timing and length of the training symbol sequence are set in such a manner that the training symbol sequence after the redundancy sample sequence has been added on according to the first characterizing feature will not fall within the receive interval (NEXT) of an ISDN ping-pong transmission.

More specifically, the transmit timing of a TDD-xDSL transmission and the length of a transmit training symbol sequence are set in such a manner that the transmit training symbol sequence of a TDD-xDSL will fall within the transmit frame interval of an ISDN ping-pong transmission or within an interval obtained by combining the transmit frame interval of an ISDN ping-pong transmission and a guard-time interval between transmission and reception in an ISDN ping-pong transmission.

Figure 2:
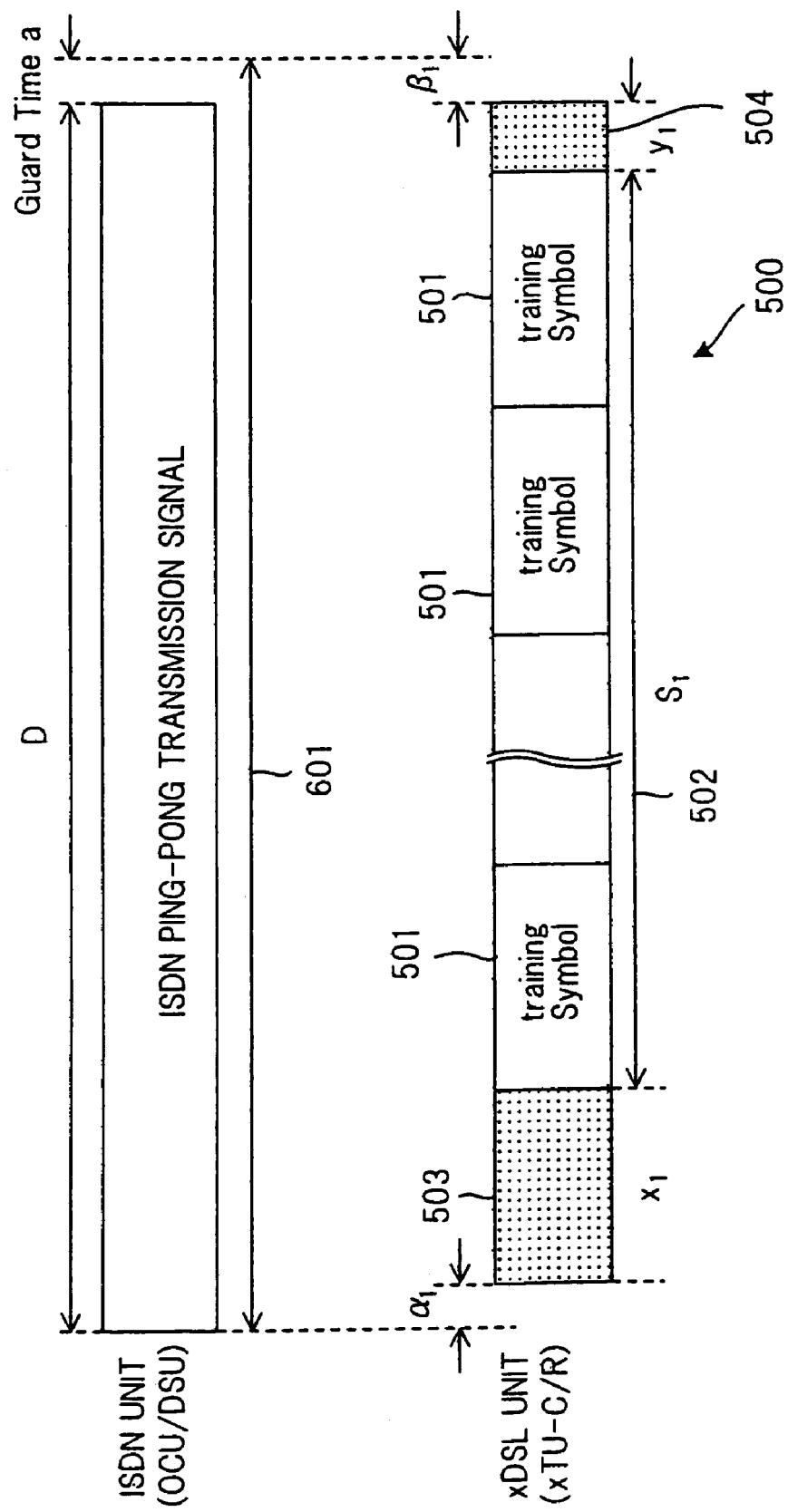
FIG. 2 is a diagram illustrating the structure of a transmit frame based upon the TDD-xDSL method (at the time of training)

Reference will be had to FIG. 2 to describe the requirements for fitting the TDD-xDSL transmit training symbol sequence 500 into a transmit interval 601 of an ISDN ping-pong transmission. Let D (=3.125 μs×377=1.178125 ms) represent the length of time of an ISDN ping-pong transmission interval; a (=18.75–23.4375 μs) the length of the the transmit/receive guard time of the ISDN ping-pong transmission; S1 the length of the transmission time of the training symbol sequence 502 before TDD-xDSL redundancy data is added on; x1 and y1 the lengths of the transmission times of the redundancy signals 503, 504 added onto the beginning and end, respectively, of the DMT symbol sequence for training; and α1, β1 the margins between the interval of the transmit training symbol sequence 500 and the transmit interval 601 of the ISDN ping-pong transmission. A relation that is to be satisfied by the present invention is as follows:

$$S1+\alpha 1+\beta 1+x1+y1 \leq D+a \qquad (1)$$

(where $0 \leq \alpha 1$, $0 \leq \beta 1$)

or $$S1+\alpha 1+\beta 1+x1+y1 \leq D \qquad (2)$$

(where $0 \leq \alpha 1$, $0 \leq \beta 1$)

Further, let m represent the number of samples within a DMT symbol that is devoid of a cyclic prefix; N the number of DMT symbols devoid of a cyclic prefix included in the training symbol sequence 500; and fd the frequency spacing of the DMT carriers. Accordingly, S1, x1 and y1 can be expressed by the following equations:

$$S1=N\times m\times [1/(m\times fd)]=N/fd \qquad (3a)$$

$$x1=nx\times [1/(m\times fd)] \qquad (3b)$$

$$y1=ny\times [1/(m\times fd)] \qquad (3c)$$

where m=2n (n is a natural number) and nx, ny are arbitrary positive integers which signify the sample counts of x1, y1 and (nx+ny)>(m/8) holds.

Figure 3:
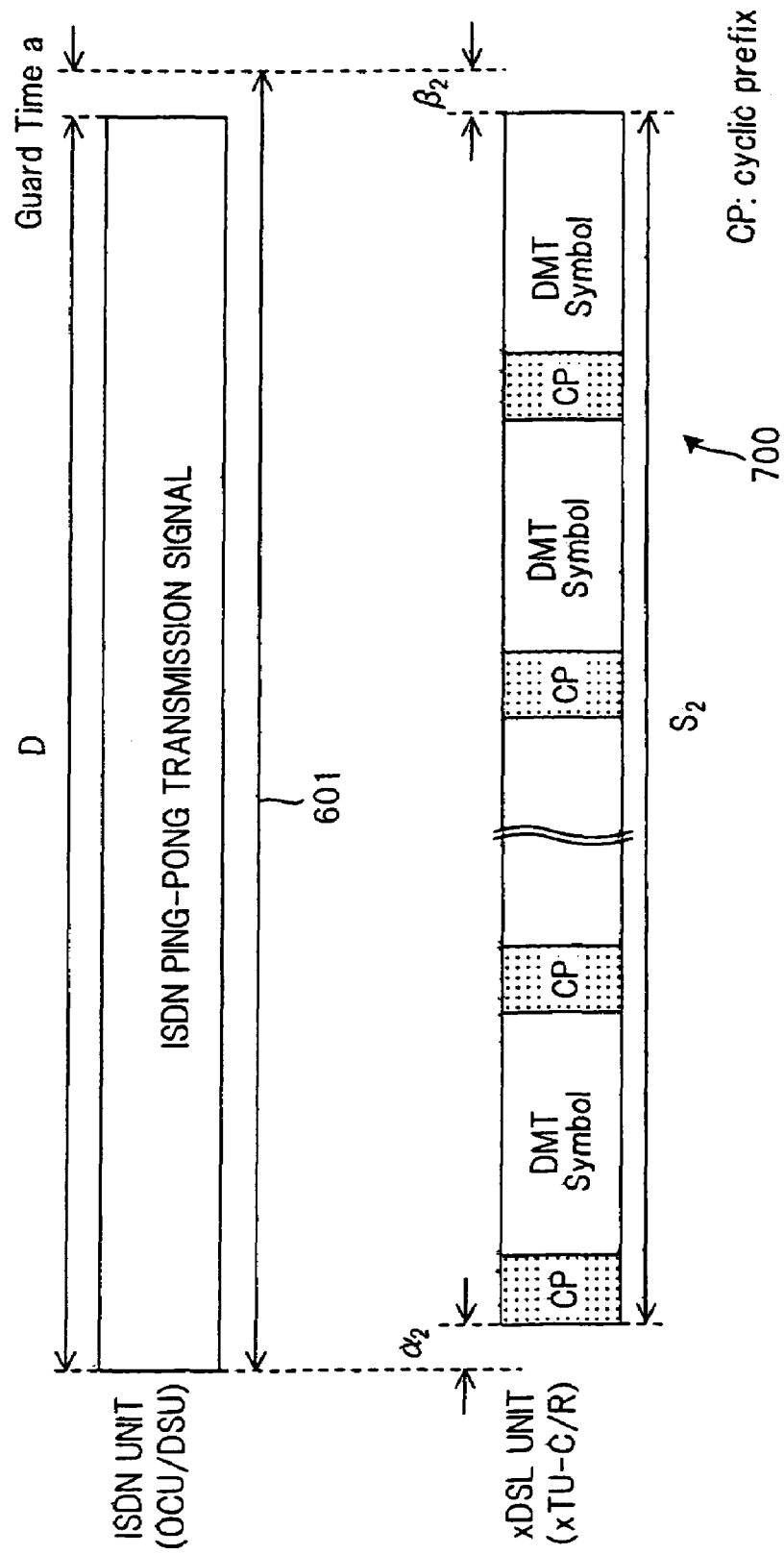
FIG. 3 is a diagram illustrating the structure of a transmit frame based upon the TDD-xDSL method (at the time of normal communication)

Similarly, at the time of normal communication, as depicted in FIG. 3, it possible to obtain relations for fitting a TDD-xDSL DMT transmit symbol sequence 700 into the transmit interval 601 of the ISDN ping-pong transmission in a manner similar to that at the time of training. Specifically, in a manner similar to that at the time of training, let D represent the length of time of the ISDN ping-pong transmission interval; a the length of the transmit/receive guard time of the ISDN ping-pong transmission; S2 the length of the TDD-xDSL DMT transmit symbol sequence 700; α2, β2 the margins between the interval of the TDD-xDSL DMT transmit symbol sequence 700 and the transmit interval 601 of the ISDN ping-pong transmission; m the number of carriers of the DMT transmit symbols; N the number of symbols contained in the symbol sequence at the time of normal communication; and fd the frequency spacing of the DMT carriers. A relation that is to be satisfied by the present invention is as follows:

$$S2+\alpha 2+\beta 2 \leq D+a \qquad (4)$$

or $$S2+\alpha 2+\beta 2 \leq D \qquad (4)'$$

$$S2=N\times (m+nc)\times [1/(m\times fd)] \qquad (5)$$

where $0 \leq \alpha 1$, $0 \leq \beta 1$ hold and nc is the number of samples of a cyclic prefix at the time of normal communication.

In accordance with Equations (4)-(5), a cyclic prefix length fixed at 16 samples conventionally in accordance with G.992.2 (G.lite) also can be varied over a range that satisfies Equation (4).

If the arrangement described above is adopted, the transmit timing of the TDD-xDSL training symbol sequence will fall within the transmit interval (FEXT interval) of the ISDN ping-pong transmission and leakage of NEXT noise from the ISDN line can be avoided when TDD-xDSL training symbols are received. Further, at the time of normal communication, the transmit timing of the TDD-xDSL transmit symbol sequence will fall within the transmit interval (FEXT interval) of the ISDN ping-pong transmission and leakage of NEXT noise from the ISDN line can be avoided when TDD-xDSL transmit symbols are received.

(c) Third Characterizing Feature

A third characterizing feature resides in selecting the frequency of a timing regeneration signal (pilot-tone signal) in such a manner that the continuity of DMT symbols is maintained between transmit burst intervals in a TDD-xDSL.

Figure 4:
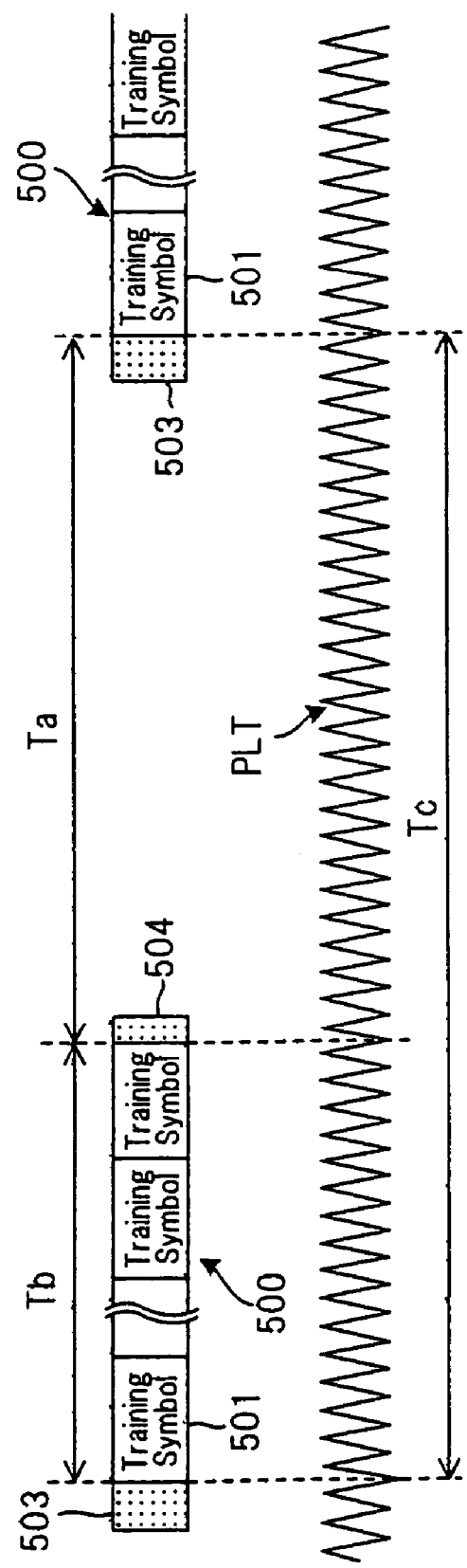
FIG. 4 is a diagram useful in describing frame phase relationship between bursts (in the downstream case)

FIG. 4 is a diagram useful in describing frame phase between transmit bursts at the time of training of a TDD-xDSL. In DMT modulation, it is desired that each symbol be a continuous DMT sample sequence. In other words, in an interval Ta in FIG. 4 in which signal transmission between transmit bursts is not carried out, it is required that the length of this interval be a whole-number multiple of the pilot-tone cycle. Accordingly, the cycle of the pilot tone is selected in such a manner that (1) the length of the transmit symbol sequence indicated by Tb in FIG. 4 will be a whole-number multiple of the pilot-tone cycle and (2) a burst interval Tc in FIG. 4 will be a whole-number multiple of the pilot-tone cycle. If this arrangement is adopted, the length of the interval Ta can be made a whole-number multiple of the pilot-tone cycle so that the continuity of DMT samples in contiguous transmit bursts can be maintained.

FIG. 5 is a diagram useful in describing the phase relationship of transmit symbols between bursts at the time-of training and at the time of normal communication. FIG. 5 relates to frames in the downstream direction. As set forth above (in the description of the second characterizing feature), it is required that the transmit symbols 500, 700 at the time of training and at the time of normal communication fall within the transmit interval 601 of the TCM-ISDN. To achieve this, symbol transmission is carried out using the transmit interval 601 of the TCM-ISDN as the reference timing, and the burst intervals Tc, Td at the time of training and at the time of normal communication are decided from the burst interval of the ISDN ping-pong transmission. According to the present invention, the burst intervals Tc, Td are selected to be whole-number multiples of the cycle of a pilot-tone signal PLT, which is for setting the timing a TDD-xDSL.

(d) Fourth Characterizing Feature

A fourth characterizing feature resides in adopting an arrangement in which a phase difference θd (see FIG. 6) between the phase of the symbol 501 contained in the transmit symbol sequence 500 at the time of training using training symbols devoid of a cyclic prefix (CP) and the phase of a symbol 701 contained in the transmit symbol sequence 700 at the time of normal communication using DMT symbols having a cyclic prefix (CP) will be a whole-number multiple of a pilot-tone cycle selected earlier.

FIG. 6 is a diagram useful in describing the phase relationship between transmit burst frames at the time of training and at the time of normal communication. FIG. 6 relates to the phase difference θd between the starting points of the symbols 501, 701 situated at the beginning of the transmit symbol sequence 500 for training and the transmit symbol sequence 700 for normal communication, respectively.

The transmit symbol sequence 500 for training and the transmit symbol sequence 700 for normal communication are transmitted independently of each other in sync with the burst cycle of the ISDN ping-pong transmission. Further, the manners in which the symbols devoid of cyclic prefixes are arrayed in the respective transmit symbol sequences also differ from each other. For this reason, the phases of the individual symbols 501, 701 contained in the transmit symbol sequences at the time of training and at the time of normal communication differ. It is so arranged that this phase difference θd will be a whole-number multiple of the cycle of the pilot-tone signal PLT. If this expedient is adopted, it will be possible to execute both training processing and processing for normal data communication in sync with the pilot-tone signal.

Methods of arranging it so that the phase difference will become a whole-number multiple of the cycle of the pilot-tone signal PLT include a method of adjusting the cycle of the pilot-tone signal PLT and a method of shifting the transmit timing of the transmit symbol sequence 700 for normal communication relative to the transmit symbol sequence 500 for training.

(e) Fifth Characterizing Feature

A fifth characterizing feature resides in transmitting a tone signal separately of the pilot-tone signal PLT which is for timing regeneration, at the time of training, whereby the office side notifies the subscriber side of the phase of the ISDN 400-Hz signal (i.e., reports the transmission phase of the TDD-xDSL on the office side). In other words, the office side notifies the subscriber side of the timing which specifies the period during which the affects of crosstalk are received.

The tone signal added on in addition to the pilot-tone signal PLT always includes one or more phase-change points within one burst. The xDSL unit on the subscriber side, therefore, finds the phase-change point and adopts a time which is a set time before or a set time after the phase-change point as the TDD-xDSL transmit timing of the xDSL unit on the office side or as the rising edge of the 400-Hz signal. By virtue of the fifth characterizing feature, timing can be regenerated more easily and in a shorter period of time than with the conventional method.

FIGS. 7A and 7B are diagrams useful in describing regeneration of the timing of the ISDN 400-Hz signal by a tone added on anew. In a case where the transmit symbol sequence of one burst contains four training symbols, FIG. 7A shows an example in which phase changes one time within one burst and FIG. 7B an example in which phase changes twice within one burst.

In FIG. 7A, the phase of training symbols changes from pattern A to pattern B between second and third symbols. In FIG. 7B, the phase of training symbols changes from pattern B to pattern A between first and second symbols and from pattern A to pattern B between third and fourth symbols. It is also permissible to adopt an arrangement in which there is a shift from pattern A to a new pattern C between the third and fourth symbols.

In the example of FIG. 7A, a time which is a set time period T1 prior to phase-change detection time is the timing of the rising edge of the ISDN 400-Hz signal TTR. In the example of FIG. 7B, a time which is a set time period T2 prior to the average time of two-phase-change detection times T21, T22 is the timing of the rising edge of the ISDN 400-Hz signal TTR.

(f) Sixth Characterizing Feature

A sixth characterizing feature resides in selecting patterns A, B in the above-mentioned tone that is separate from the pilot-tone signal PLT in such a manner that the phase difference between them will be 90 or 180° in a QAM constellation diagram, and effecting a change A→B or B→A within one burst to thereby convey the phase change.

Figure 8B:
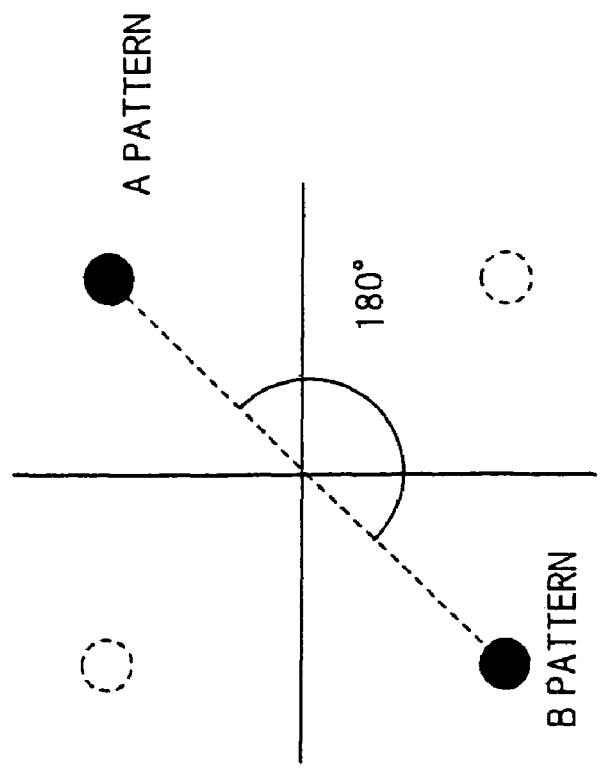
FIGS. 8A and 8B are diagrams useful in describing phase-change conveyance patterns.
Figure 8A:
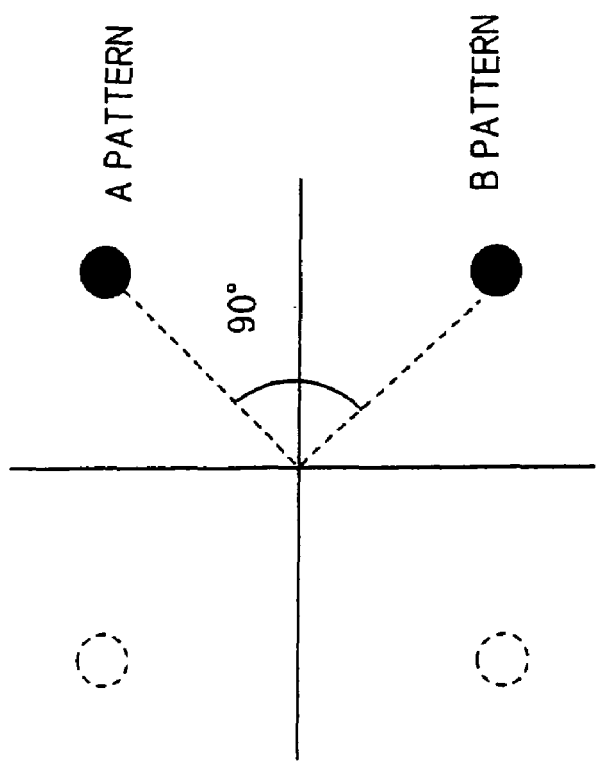

FIGS. 8A, 8B are diagrams useful in describing patterns A and B and illustrate a method of selecting the patterns A, B in a case where the simplest 4 QAM is used as the DMT symbol. FIG. 8A illustrates an example of a constellation when the phase difference between the patterns A and B is 90°, and FIG. 8B illustrates an example of a constellation when the phase difference between the patterns A and B is 180°.

(B) Embodiments (a) Overall Construction

Figure 9:
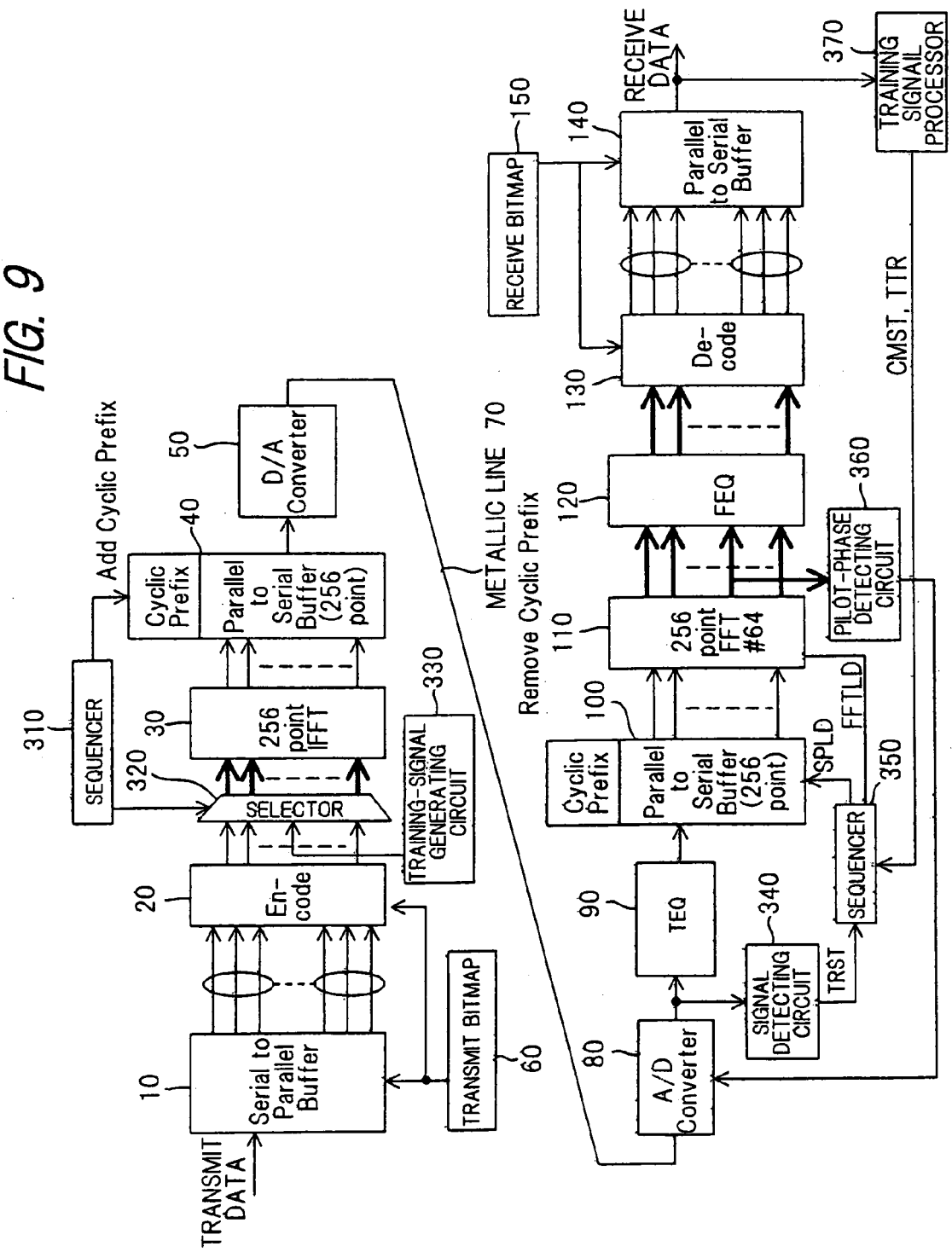
FIG. 9 is a block diagram illustrating a subscriber transmission system based upon DMT modulation in accordance with the present invention.
Figure 30:
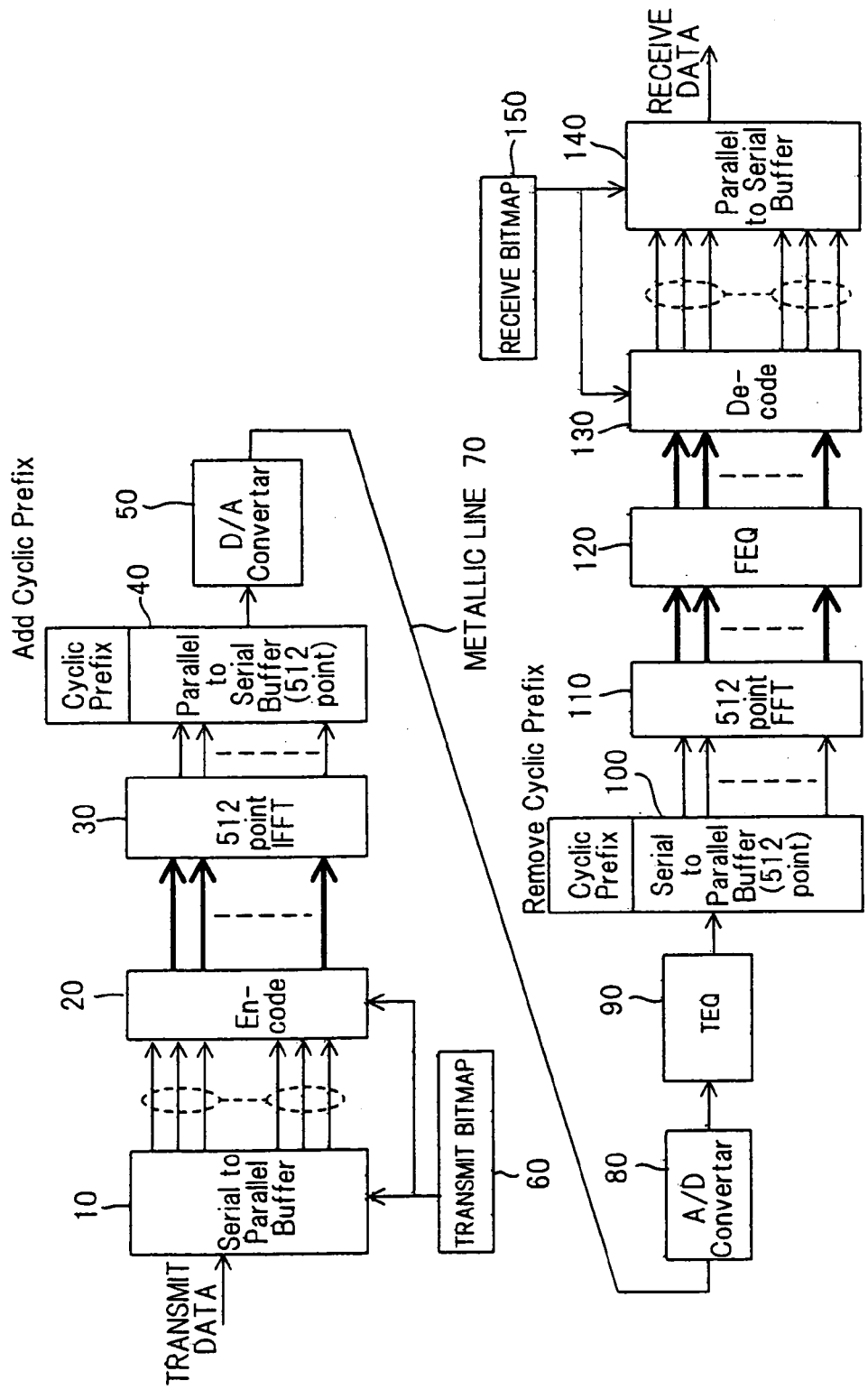
FIG. 30 is a functional diagram of a subscriber transmission system which relies upon DMT modulation.
Figure 31:
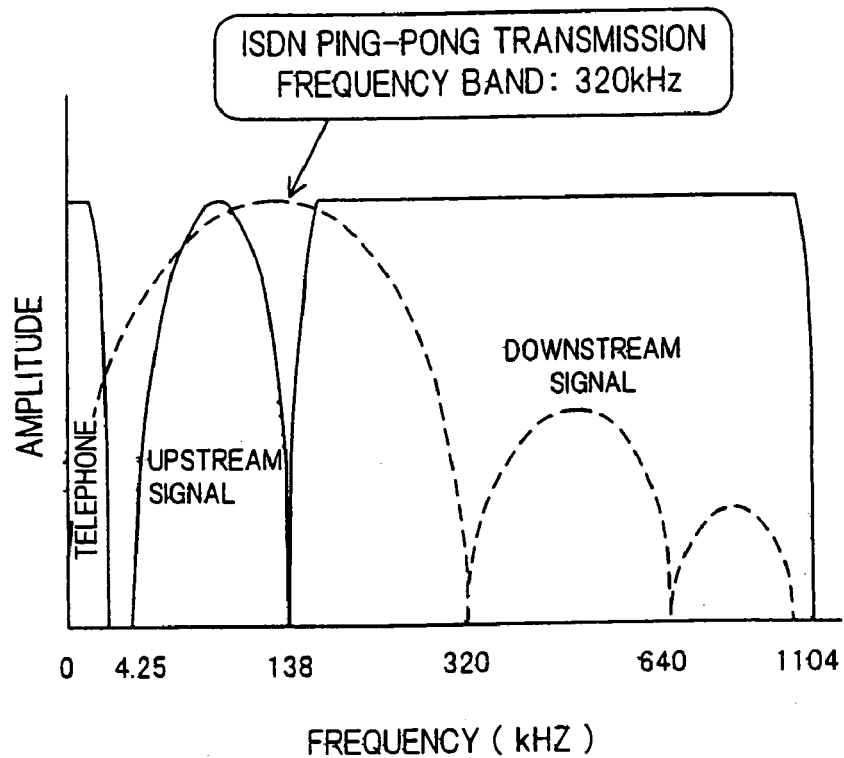
FIG. 31 is a diagram useful in describing the band of ISDN ping-pong transmission and the band of ADSL transmission.
Figure 32:
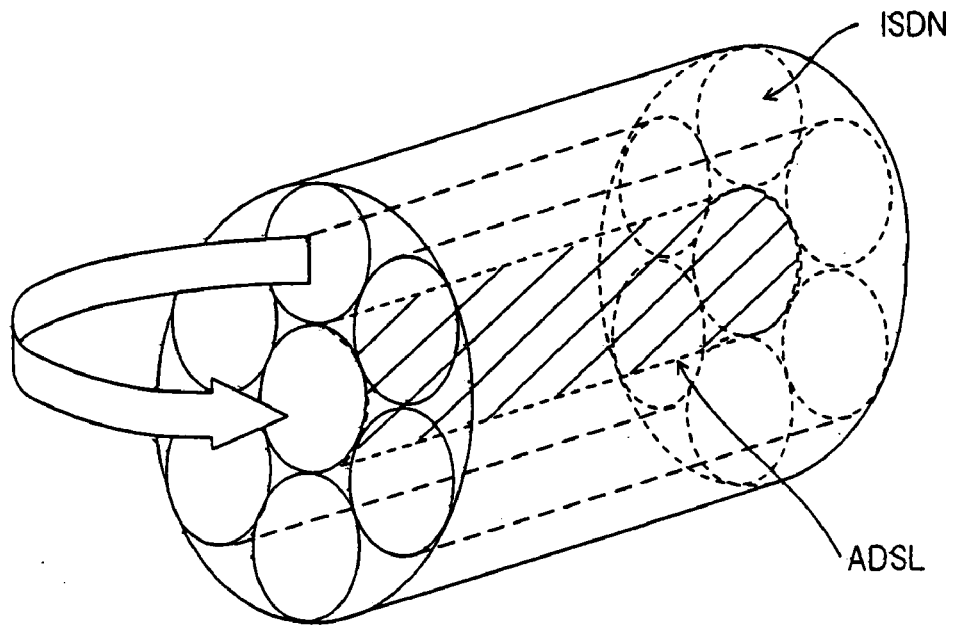
FIG. 32 is a diagram useful in describing crosstalk noise.
Figure 34:
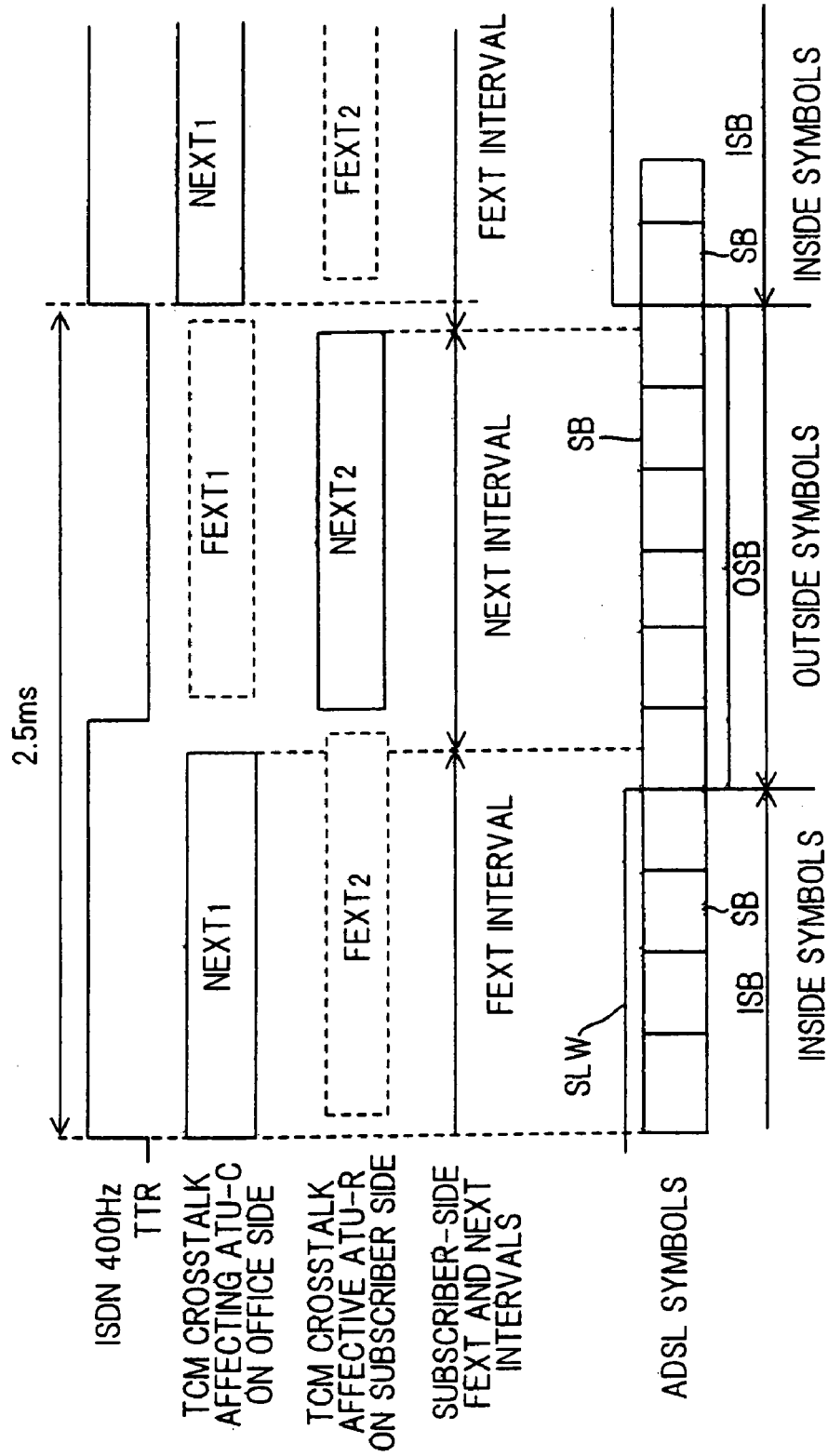
FIG. 34 is a diagram useful in describing a sliding window.
Figure 35:
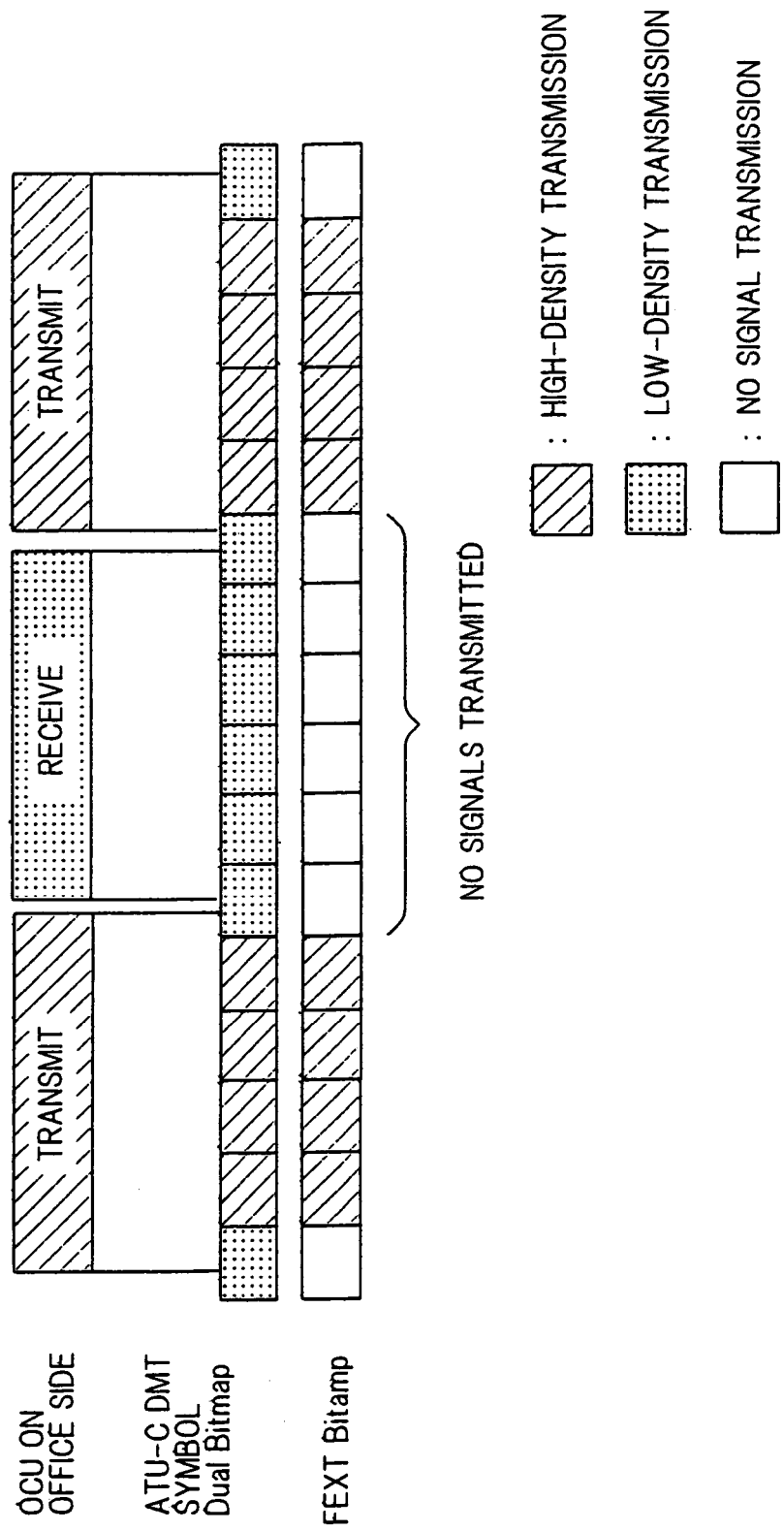
FIG. 35 is a diagram useful in describing a dual bitmap and a FEXT bitmap.
Figure 36:
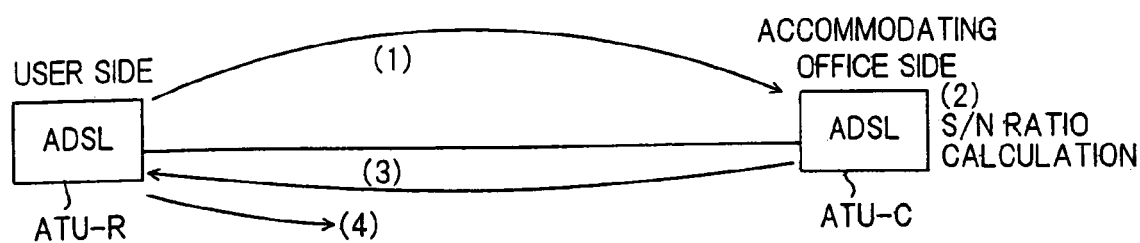
FIG. 36 is a diagram useful in describing the creation of a bitmap based upon a B & G protocol.
Figure 37:
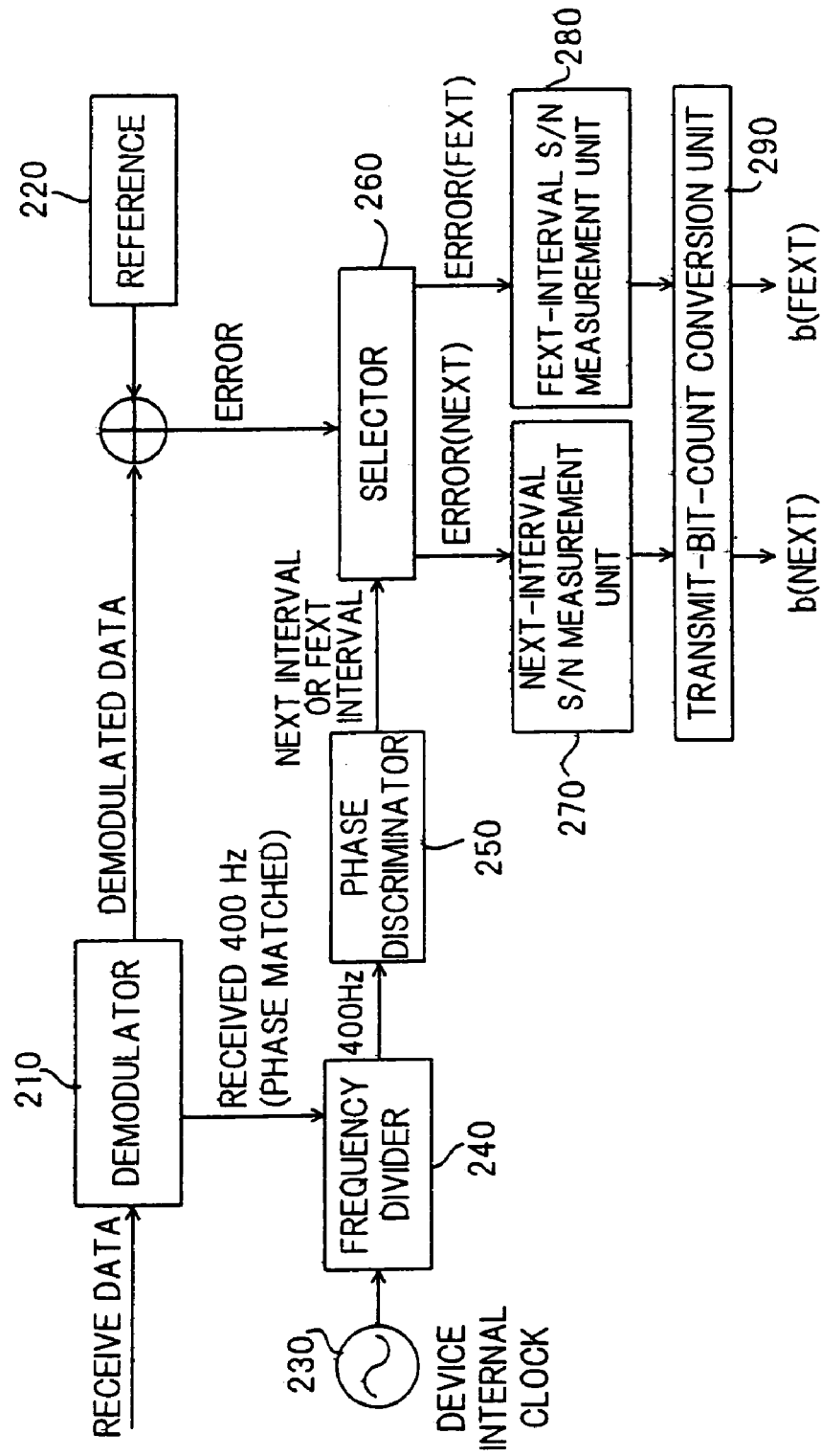
FIG. 37 is a block diagram useful in describing measurement of S/N ratio in every NEXT/FEXT interval.
Figure 38:
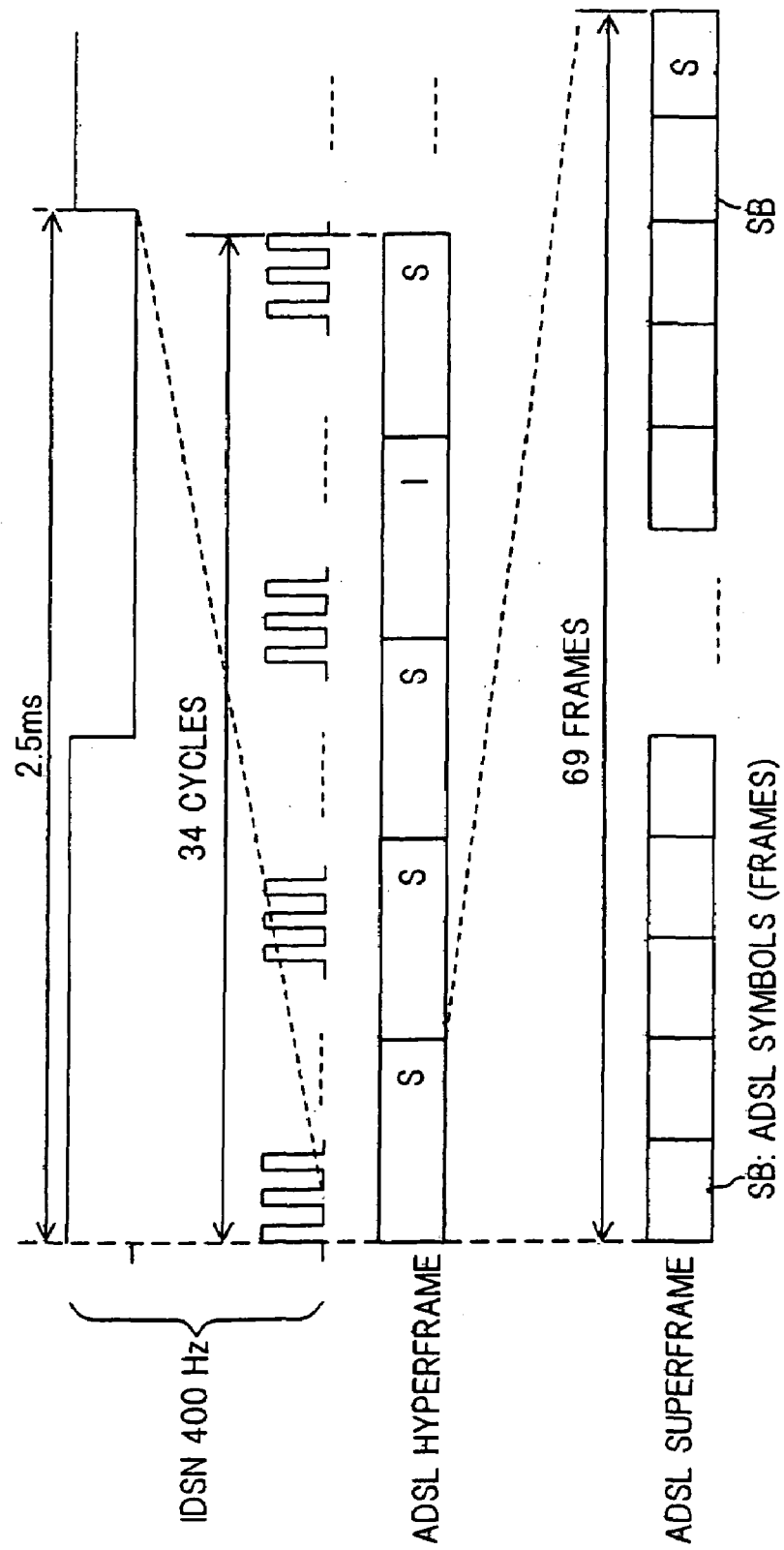
FIG. 38 is a diagram useful in describing a hyperframe scheme.
Figure 39:
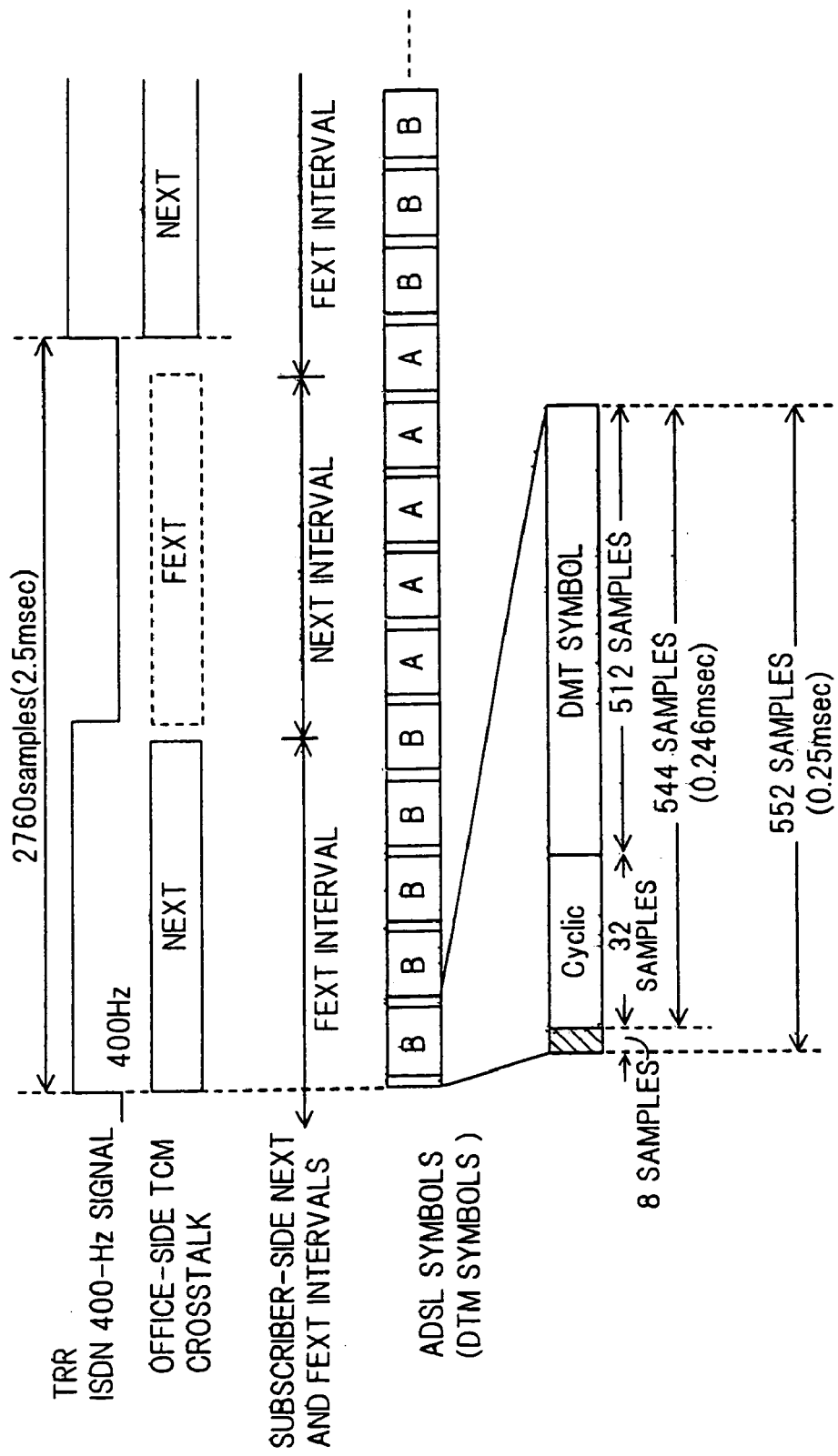
FIG. 39 is a diagram useful in describing a transmission method in which ADSLs symbol are synchronized to an ISDN ping-pong transmission.
Figure 40:
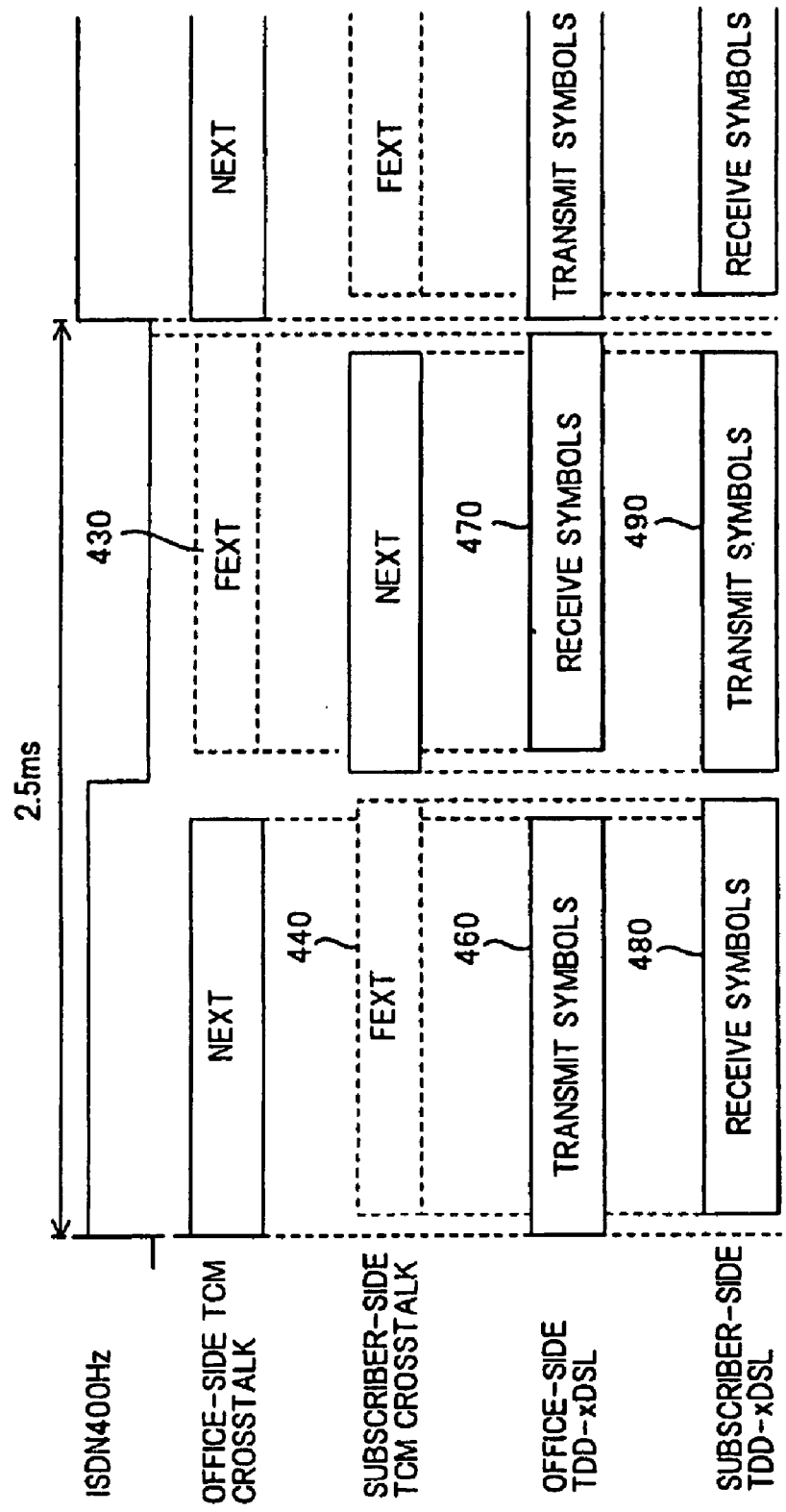
FIG. 40 is a diagram useful in describing a method of transmitting TDD-xDSL symbols.

FIG. 9 is a block diagram of a subscriber transmission system using the TDD-xDSL method according to the present invention. Components in FIG. 9 identical with those shown in FIG. 30 are designated by like reference characters. This system differs from that of FIG. 30 in that the transmitting side is provided with a sequencer 310, selector 320 and training-signal generating circuit 330 and the receiving side is provided with a signal detecting circuit 340, sequencer 350, pilot-phase detecting circuit 360 and training signal processor 370.

The sequencer 310 on the transmitting side (1) generates a training-state signal TRN and a communication-state signal DMN upon distinguishing between training time and normal communication time, and (2) controls the parallel-to-serial conversion buffer 40 and outputs the transmit symbol sequence 500 for training (see FIG. 1) and the transmit symbol sequence 700 for normal communication (see FIG. 3).

The training-signal generating circuit 330 (1) outputs various training signals at the time of training and (2) outputs the timing-regeneration pilot-tone signal PLT in the transmit interval of the TDD-xDSL regardless of whether it is training time or normal communication time. The pilot-tone signal PLT is transmitted to the receiving side by carrier #64. The training-signal generating circuit 330 transmits another tone-signal separately of the pilot-tone signal PLT by carrier #48 at training time to report the phase of the ISDN 400-Hz signal (the transmit phase of the TDD-xDSL on the office side) from the office side to the subscriber side (see FIGS. 7, 8).

In the transmit interval of the TDD-xDSL, the selector 320 (1) selects the training signal output from the training-signal generating circuit 330 and inputs this signal to the IFFT circuit 30 at training time, and (2) selects the transmit data output from the encoder 20 to the IFFT circuit 30 at the time of normal communication.

The signal detecting circuit 340 monitors the level of the output signal from the A/D converter 80 to detect when the training signal has been sent from the transmitting side, and the sequencer 350 controls the serial-to-parallel conversion buffer 100 to exercise control in such a manner that the one symbol of data from which the redundancy signal/cyclic prefix has been removed at training time/normal communication time, respectively, is input to the FFT circuit 110. On the basis of the signal output from the #64 output terminal of the FFT circuit, the pilot-phase detecting circuit 360 detects the phase of the pilot-tone signal PLT and controls the A/D conversion timing of the A/D converter 80.

The training signal processor 370 analyzes the training signal to detect the ISDN 400-Hz signal and detects the start of normal communication based upon sequence switching data sent from the transmitting side.

Figure 10:
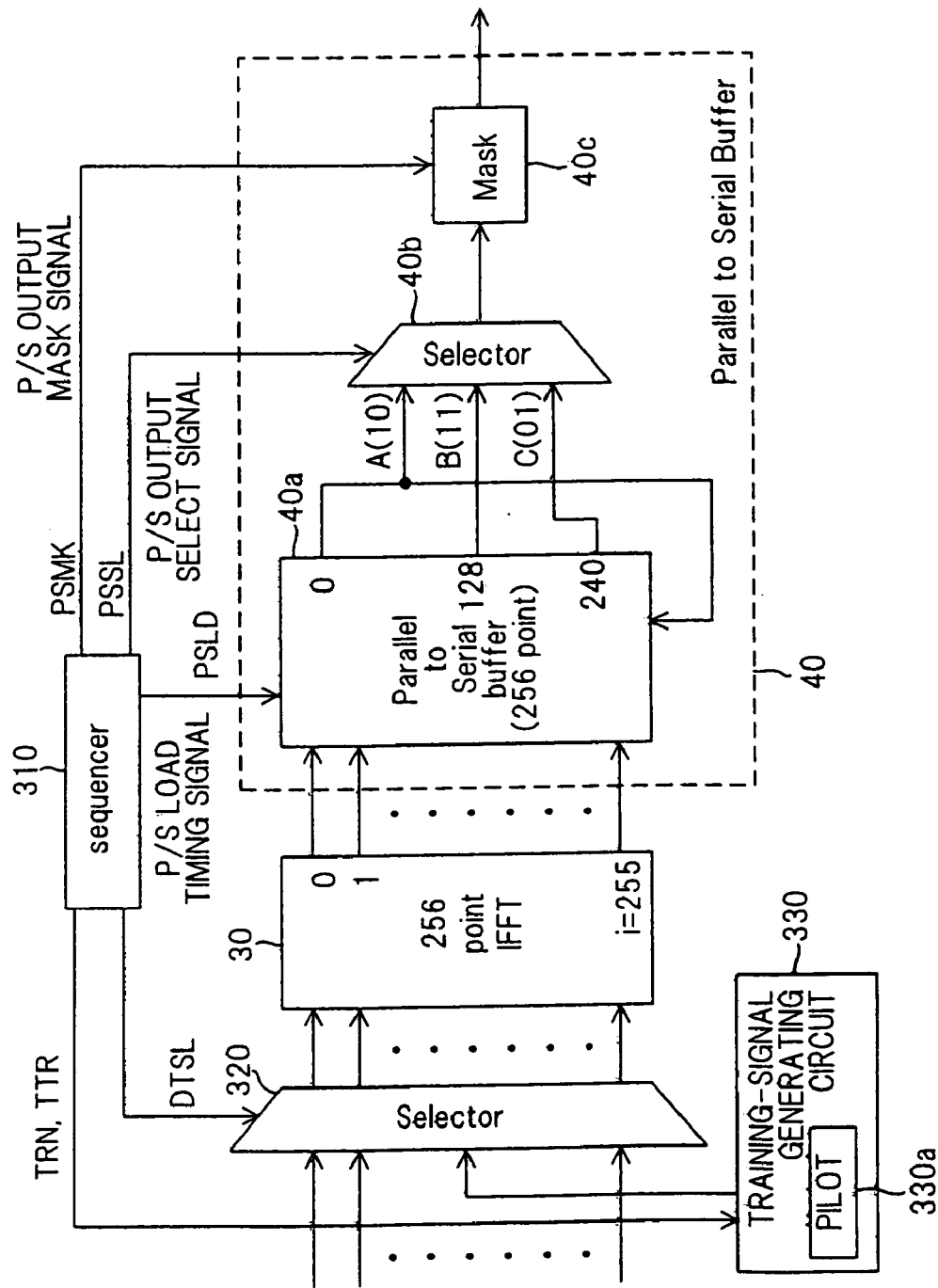
FIG. 10 is a block diagram of an arrangement for reconstructing a symbol sequence in accordance with the present invention.
Figure 11:
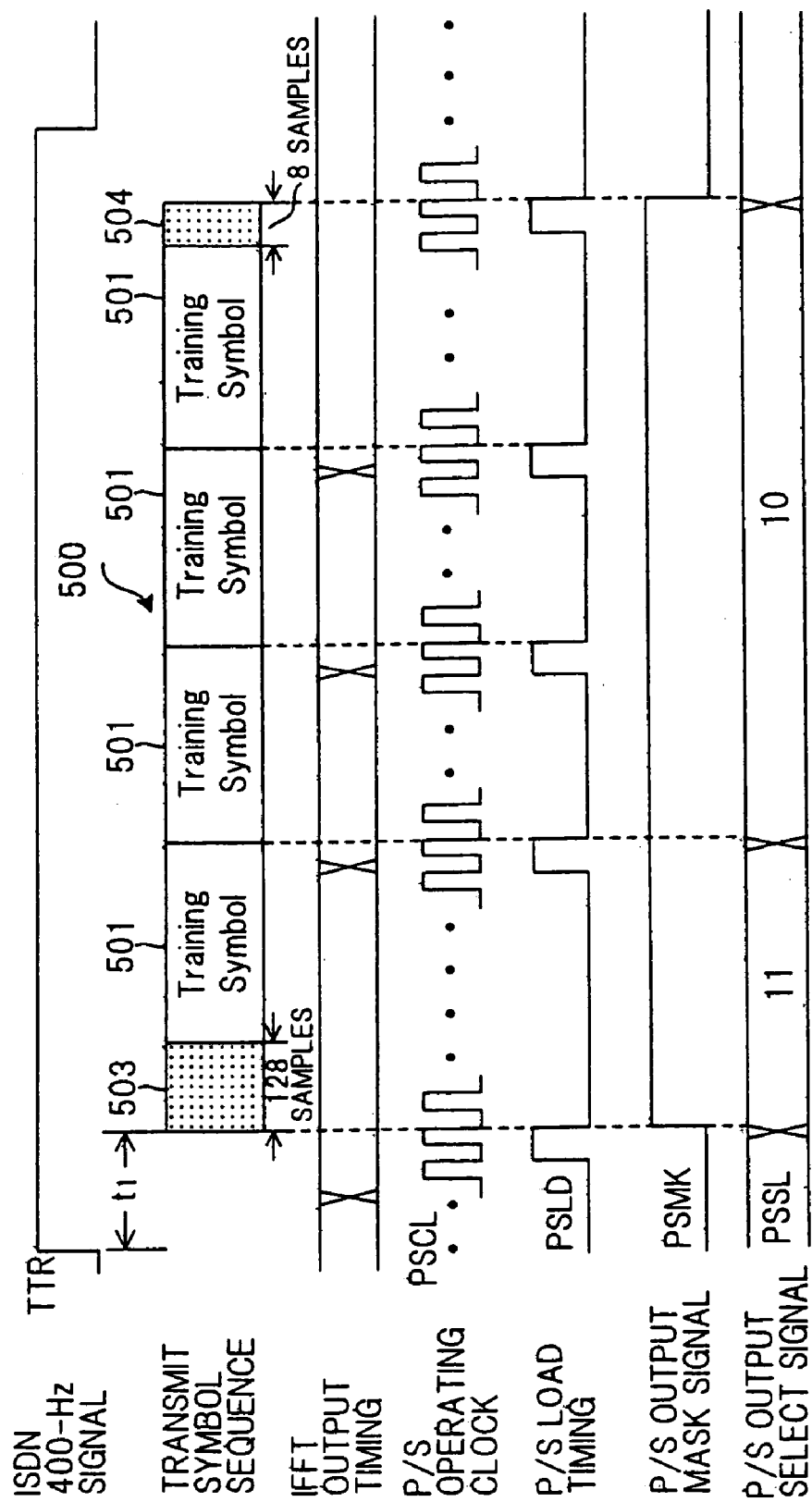
FIG. 11 is a time chart indicating an output sequence operation (at the time of training)
Figure 12:
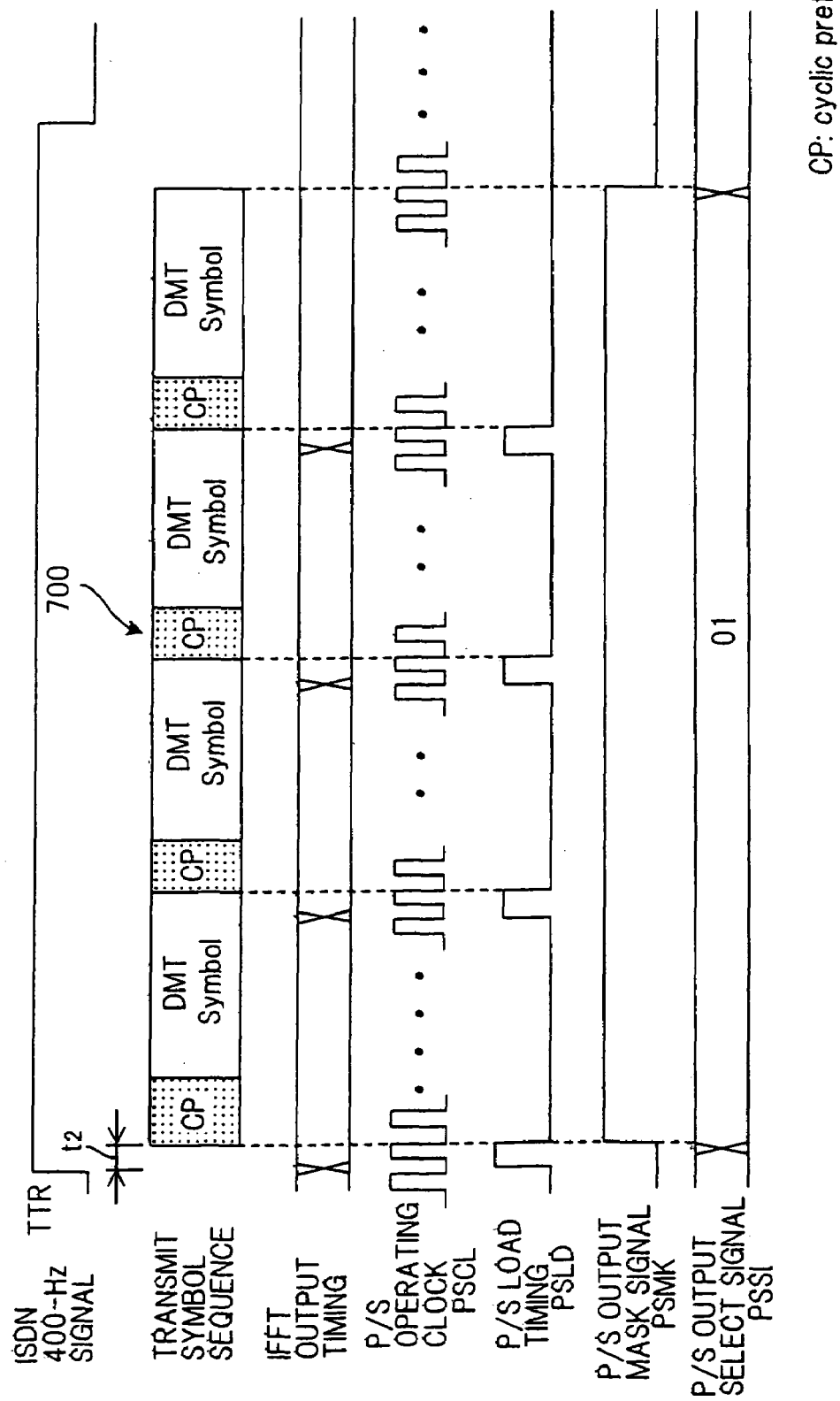
FIG. 12 is a time chart indicating an output sequence operation (at the time of normal communication)

(b) Arrangement for Generating Transmit Symbol Sequence at Training Time and Normal Communication Time FIG. 10 is a block diagram of an arrangement for generating a symbol sequence at training time and normal communication time. Components in FIG. 10 identical with those shown in FIG. 9 are designated by like reference characters. FIG. 11 is a time chart for describing an output sequence operation at training time. This is for a case where a redundancy signal 503 having a length of 128 samples is added onto the beginning of the sequence and a redundancy signal 504 having a length of 8 samples is added onto the end of the sequence. FIG. 12 is a time chart for describing an output sequence operation at the time of normal communication. This is for a case where the cyclic prefix has a length of 16 samples.

(b-1) Creation of Training Symbol Sequence

The sequencer 310 generates various contrbl signals in such a manner that the transmit symbol sequence 500 for training will fall within the transmit interval of the ISDN ping-pong transmission. More specifically, at start-up, the sequencer 310 controls switching between training time and normal transmission time by timer control, inputs a training/normal communication switching signal DTSL to the selector 320 and inputs the training-state signal TRN to the training-signal generating circuit 330. In response to the training/normal communication switching signal DTSL, the selector 320 selects a training signal, which is output from the training-signal generating circuit 330, and inputs this signal to the IFFT circuit 30 at the time of training, and selects the transmit data output from the encoder 20 and inputs this data to the IFFT circuit 30 at the time of normal communication. The training-signal generating circuit 330 generates a predetermined training signal at training time.

At training time, the sequencer 310 generates (1) a P/S load timing signal PSLD, (2) a P/S output mask signal PSMK and (3) a P/S output select signal PSSL (="11") upon elapse of a predetermined time t1 from the rising edge of the ISDN 400-Hz signal TTR, as shown in FIG. 11.

The P/S load timing signal PSLD is a signal which loads the result of the IFFT operation (256 items of signal-point data) into a buffering unit 40a in the parallel-to-serial conversion buffer 40. The P/S output mask signal PSMK allows a data output from the buffering unit 40a when at the high level and inhibits a data output from the buffering unit 40a when at the low level. The P/S output select signal PSSL designates successive read-out of signals starting from the $0^{th}$ signal, the $128^{th}$ signal or the $240^{th}$ signal among the 256 signals that have been stored in the buffering unit 40a. More specifically, the P/S output select signal PSSL takes on the values "10", "11", "01" and the selector 40b reads out signals in numerical order starting from (1) the $0^{th}$ signal of buffering unit 40a if the signal PSSL is "10", (2) the $128^{th}$ signal of buffering unit 40a if the signal PSSL is "11" and (3) the $240^{th}$ signal of buffering unit 40a if the signal PSSL is "01".

If the P/S load timing signal PSLD is generated, 256 signals output from the IFFT circuit 30 are stored in the buffering unit 40a of the parallel-to-serial conversion buffer

40. Next, in response to the P/S output select signal PSSL of logic "11", the selector 40b reads signals out of the buffering unit 40a in numerical order starting from the $128^{th}$ signal in sync with a P/S operating clock PSCL and outputs these signals via a mask circuit 40c. As a result, 128 signals from the $128^{th}$ to the $255^{th}$ are read out as the redundancy signal 503 and then 256 training signals ($1^{st}$ symbol data) from the $0^{th}$ to the $255^{th}$ are read out.

If read-out of the initial training symbol is completed, the sequencer 310 generates the P/S load timing signal PSLD again and generates the P/S output select signal PSSL of logic "10". As a result, the next 256 signals output from the IFFT circuit 30 are stored in the buffering unit 40a of the parallel-to-serial conversion buffer 40. Next, in response to the P/S output select signal PSSL of logic "10", the selector 40b reads signals out of the buffering unit 40a in numerical order starting from the $0^{th}$ signal in sync with a P/S operating clock PSCL and outputs these signals via a mask circuit 40c. As a result, 256 training signals ($2^{nd}$ symbol data) from the $0^{th}$ to the $255^{th}$ are read out.

If read-out of the $2^{nd}$ training symbol is completed, the sequencer 310 generates the P/S load timing signal PSLD and the next 256 signals output from the IFFT circuit 30 are stored in the buffering unit 40a of the parallel-to-serial conversion buffer 40. The selector 40b reads signals out of the buffering unit 40a in numerical order starting from the $0^{th}$ signal in sync with the P/S operating clock PSCL and outputs these signals. As a result, 256 training signals ($3^{rd}$ symbol data) from the $0^{th}$ to the $255^{th}$ are read out.

If read-out of the $3^{rd}$ training symbol is completed, the sequencer 310 generates the P/S load timing signal PSLD and the next 256 signals output from the IFFT circuit 30 are stored in the buffering unit 40a of the parallel-to-serial conversion buffer 40. The selector 40b reads signals out of the buffering unit 40a in numerical order starting from the $0^{th}$ signal in sync with the P/S operating clock PSCL and outputs these signals. As a result, 256 training signals (the final symbol data) from the $0^{th}$ to the $255^{th}$ are read out. Thereafter, eight signals from the $0^{th}$ to the $7^{th}$ are read out and output as the redundancy signal 504.

If output of the redundancy signal 504 is completed, the sequencer 310 places the P/S output mask signal PSMK at the low level and places the P/S output select signal at logic "00" to establish the non-selected state.

Thereafter, at training time, the above-described operation is repeated whenever the ISDN 400-Hz signal TTR rises to create and transmit the transmit symbol sequence for training.

(b-2) Creation of Transmit Symbol Sequence at Time of Normal Communication

The sequencer 310 generates various control signals in such a manner that the transmit symbol sequence 700 for normal communication will be transmitted within the transmit interval of the ISDN ping-pong transmission. More specifically, at start-up, the sequencer 310 exercises control to switch from the training state to the normal communication state after a predetermined period of time following start-up has elapsed. As a result, the selector 320 selects and inputs the transmit data from the encoder 20 to the IFFT circuit 30. In addition, the selector 320 selects the pilot-tone signal PLT from the training-signal generating circuit 330 and inputs this signal to the #64 terminal of the IFFT circuit 30.

Further, at the time of normal communication, the sequencer 310 generates (1) the P/S load timing signal PSLD, (2) the P/S output mask signal PSMK and (3) the P/S output select signal PSSL (="01") upon elapse of a predetermined time t2 from the rising edge of the ISDN 400-Hz signal TTR.

If the P/S load timing signal PSLD is generated, 256 signals output from the IFFT circuit 30 are stored in the buffering unit 40a of the parallel-to-serial conversion buffer 40. Next, in response to the P/S output select signal PSSL of logic "01", the selector 40b reads signals out of the buffering unit 40a in numerical order starting from the $240^{th}$ signal in sync with a P/S operating clock PSCL and outputs these signals via a mask circuit 40c. As a result, 16 signals from the $240^{th}$ to the $255^{th}$ are read out as the cyclic prefix and then 256 transmit signals ($1^{st}$ symbol data) from the $0^{th}$ to the $255^{th}$ are read out.

If read-out of the initial transmit symbol is completed, the sequencer 310 generates the P/S load timing signal PSLD again. As a result, the next 256 signals output from the IFFT circuit 30 are stored in the buffering unit 40a of the parallel-to-serial conversion buffer 40. Next, in response to the P/S output select signal PSSL of logic "01", the selector 40b reads 16 signals from the $240^{th}$ to the $255^{th}$ out of the buffering unit 40a as the cyclic prefix in sync with the P/S operating clock PSCL and then reads out 256 transmit signals ($2^{nd}$ symbol data) from the $0^{th}$ to the $255^{th}$ and outputs these signals. If $3^{rd}$ and $4^{th}$ symbol data with attached cyclic prefixes are subsequently read out and output in similar fashion, the sequencer 310 places the P/S output mask signal PSMK at the low level and places the P/S output select signal PSSL at logic "00" to establish the non-selected state.

Thereafter, at normal communication time, the above-described operation is repeated by the sequencer 310 whenever the ISDN 400-Hz signal TTR rises to create and transmit the transmit symbol sequence for normal communication.

Figure 13:
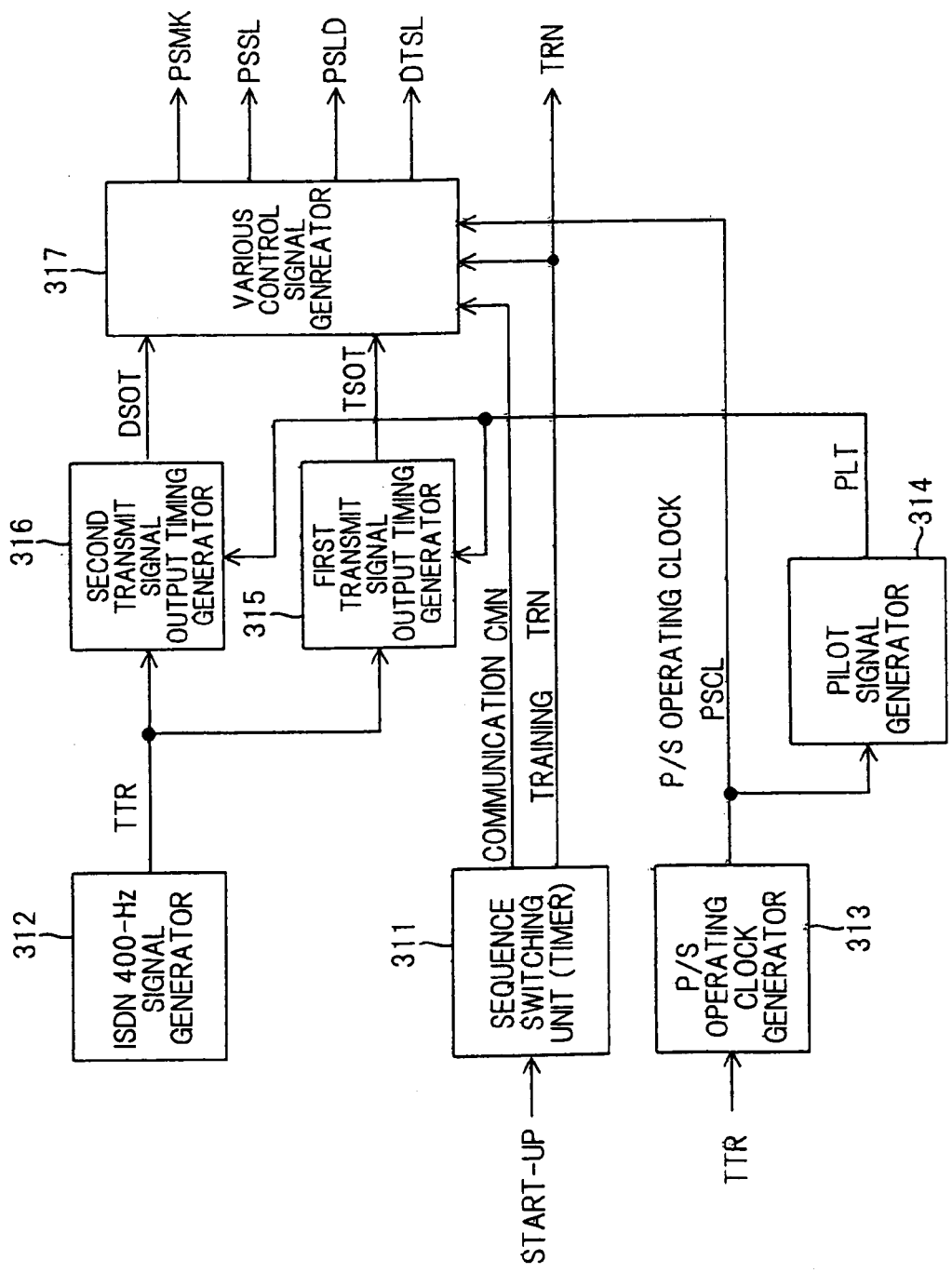
FIG. 13 is a block diagram of a sequencer on the transmitting side.

FIG. 13 is a block diagram of a sequencer in the ADSL unit on the office side. A sequence switching unit 311 generates the training-state signal TRN and a normal-communication-state signal CMN by timer control at start-up, and a signal generator 312 for generating the ISDN 400-Hz signal outputs the 400-Hz signal TTR of the ISDN ping-pong transmission. Further, a P/S operating clock generator 313 generates the P/S operating clock PSCL in sync with the ISDN 400-Hz signal TTR, and a pilot-tone signal generator 314 applies ¼ frequency division to the P/S operating-clock PSCL and outputs the pilot-tone signal PLT for timing regeneration. Though this illustrates an example in which the ISDN 400-Hz signal TTR is output from the signal generator 312, this signal may be input externally. Such an arrangement will be described later.

The reason for outputting the pilot-tone signal PLT by ¼ frequency division of the P/S operating clock PSCL is as follows: If carrier frequency spacing is 4 kHz, the number of samples within one DMT symbol is 256 and #64 is used as the pilot-tone transmission carrier, the FFT sampling frequency on the receiving side will be 1024 kHz (=4×256 kHz) based upon the carrier frequency spacing and number of carriers. Further, the frequency of the pilot tone will be 4 kHz×64=256 kHz. In other words, the data per cycle of the pilot tone is four sample's worth. On the other hand, the P/S operating clock PSCL is transmitted serially from the parallel-to-serial conversion buffer 40 at 1024 kHz. This is equal to the FTT sampling frequency. Accordingly, the pilot-tone signal PLT can be generated by subjecting the P/S operating clock PSCL to ¼ frequency division. The pilot-tone signal PLT has a phase and frequency that agree with those of the pilot-tone signal generated by the training-signal generating circuit 330.

At training time, a first timing generator 315 for generating a first transmit symbol output timing generates a symbol output timing signal TSOT in sync with the pilot-tone signal PLT upon elapse of the predetermined time t1 (see FIG. 11) from the rising edge of the ISDN 400-Hz signal TTR.

At normal communication time, a second timing generator 316 for generating a transmit symbol output timing generates a transmit symbol output timing signal DSOT in sync with the pilot-tone signal PLT upon elapse of the predetermined time t2 (see FIG. 12) from the rising edge of the ISDN 400-Hz signal TTR.

On the basis of the training-state signal TRN, normal-communication-state signal CMN and transmit symbol output timing signals TSOT, DSOT, a signal generator 317 generates various control signals (the P/S load timing signal PSLD, P/S output select signal PSSL, P/S output mask signal PSMK, training/normal communication switching signal DTSL, etc.) in sync with the P/S operating clock PSCL and outputs these signals.

By virtue of the fact that the timing generators 315, 316 generate the transmit symbol output timing signals TSOT, DSOT in sync with the pilot-tone signal PLT, the phase difference θd (see FIG. 6) between the individual symbols 501, 701 contained in the transmit symbol sequence can be adjusted to a whole-number multiple of the cycle of the pilot tone at training time and at normal communication time.

Further, by virtue of the fact that the timing generators 315, 316 generate the transmit symbol output timing signals TSOT, DSOT in sync with the pilot-tone signal PLT, (1) the length of the transmit symbol sequence can be made a whole-number multiple of the cycle of the pilot tone and (2) the transmit burst interval can be made a whole-number multiple of the cycle of the pilot tone at training time and normal communication time, respectively. As a result, in TDD-xDSL transmission, an interval in which no signal is transmitted can be made a whole-number multiple of the pilot-tone cycle in the interval between temporally contiguous transmit bursts, and the continuity of DMT samples in contiguous transmit bursts can be maintained. Since the number of samples in the transmit symbol sequence at training time is 1160 (=128+256×4+8), this is 290 times the pilot-tone cycle, and since the number of samples in the transmit symbol sequence at normal communication time is 1088 [=(16+256)×4], this is 272 times the pilot-tone cycle. Equation (1), therefore, is satisfied.

Alternative Arrangement for Generating the ISDN 400-Hz Signal TTR

Figure 14:
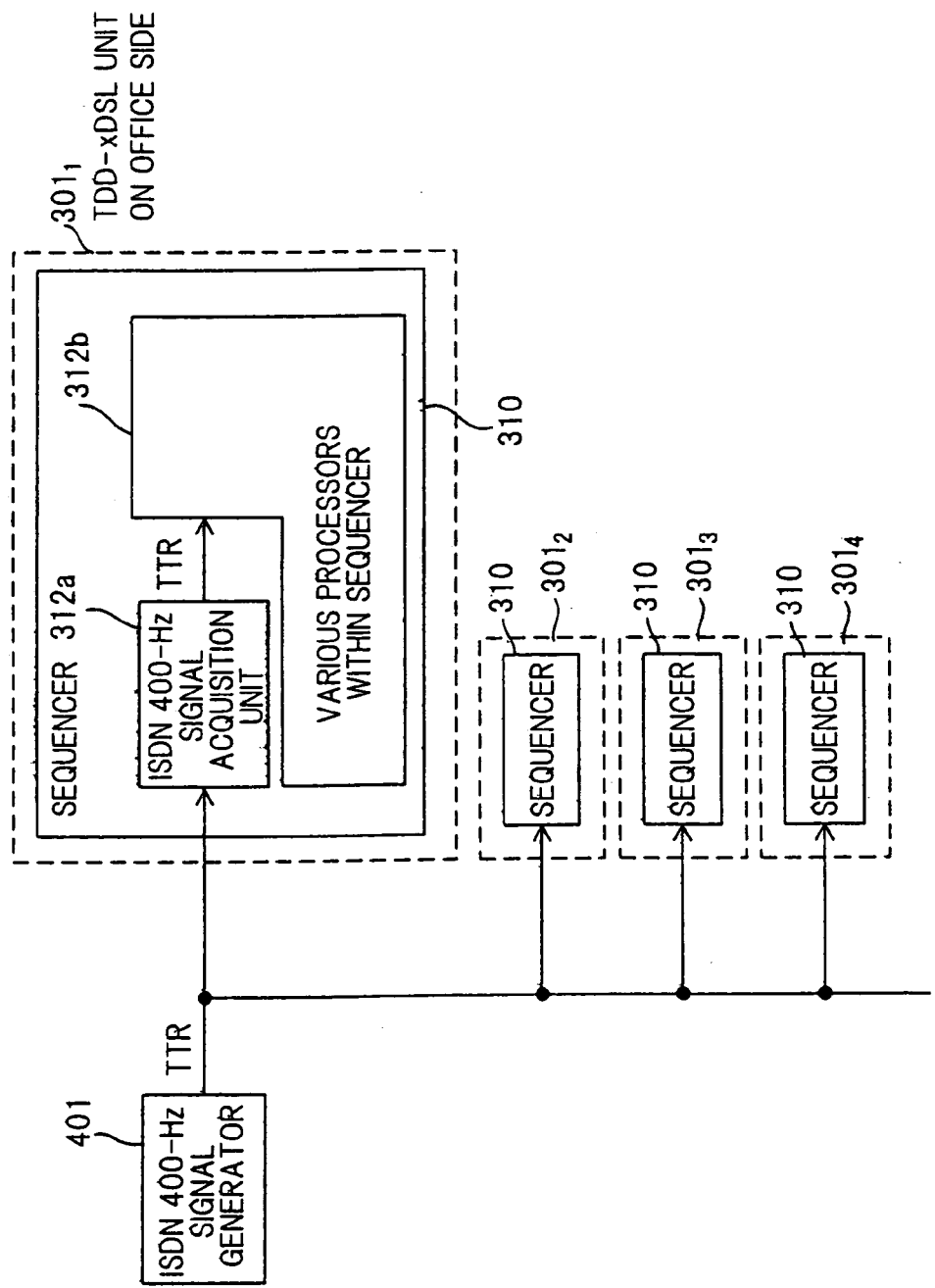
FIG. 14 is a block diagram of an arrangement for inputting an ISDN 400-Hz signal TTR externally.

FIG. 14 illustrates an embodiment in which the ISDN 400-Hz signal TTR. A plurality of office-side TDD-xDSL units $301_1$~$301_4$ disposed within the central office in FIG. 14 are connected to a signal generator 401 which generates the ISDN 400-Hz signal. Though each of the office-side TDD-xDSL units $30_1$~$301_4$ has functional blocks of the kind shown in FIG. 9, only the sequencer 310 is shown in FIG. 14. Further, the sequencer 310 has the construction shown in FIG. 13. In this embodiment the ISDN 400-Hz signal TTR is input externally and therefore a signal acquisition unit 312a which acquires the ISDN 400-Hz signal is provided instead of the unit 312 (FIG. 13) that generates the ISDN 400-Hz signal. Furthermore, blocks other than that of the unit 312 that generates the ISDN 400-Hz signal shown in FIG. 13 are illustrated collectively as a processing unit 312b within the sequencer.

The signal generator 401 which generates the ISDN 400-Hz signal is disposed in all telephone offices that are capable of providing ISDN service and generates the ISDN 400-Hz signal TTR using an 8-kHz network clock. The office-side TDD-xDSL units $301_1$~$301_4$ are connected to the signal generator 401 and the unit 312a acquires the ISDN 400-Hz signal from the signal generator 401. The signal acquisition unit 312a supplies the acquired ISDN 400-Hz signal TTR to each of the components within the internal processing unit 312b in a manner similar to the method illustrated in FIG. 13. In this fashion all of the office-side TDD-xDSL units $301_1$~$301_4$ and the ISDN-OCU (not shown) are capable of communicating in sync with the ISDN 400-Hz signal TTR.

It is possible that a telephone office that does not supply ISDN service will not be provided with the signal generator 401 for generating the ISDN 400-Hz signal. In such case a unit which generates a 400-Hz signal in the same manner as the signal generator 401 is deployed at the central office and supplies the 400-Hz signal to each of the office-side TDD-xDSL units $301_1$~$301_4$ in the manner shown in FIG. 14. Such an arrangement makes it possible to prevent crosstalk noise from an adjacent TDD-xDSL.

(c) Components on Receiving Side

Figure 15:
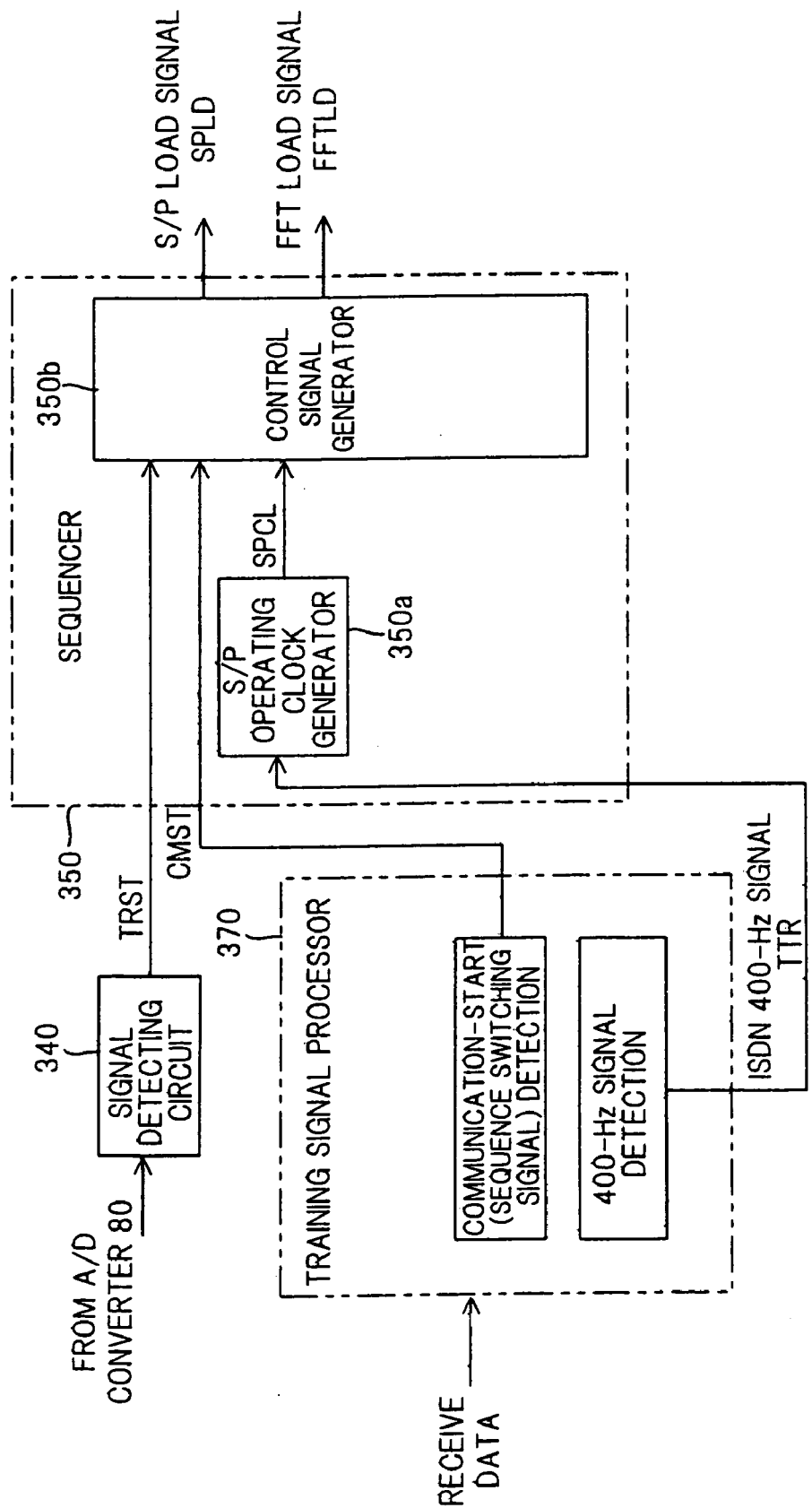
FIG. 15 is a block diagram of various components on the receiving side.

FIG. 15 is a block diagram of the principal components on the receiving side. Components in FIG. 15 identical with those shown in FIG. 9 are designated by like reference characters. The signal detecting circuit 340 monitors the level of the output signal from the A/D converter 80, which subjects the input signal to an analog-to-digital conversion at the FFT sampling frequency, to thereby detect when the training signal has been sent from the transmitting side, and inputs a training-starting signal TRST to the sequencer 350. The training signal processor 370 analyzes the training signal and executes various training processing. For example, the training signal processor 370 detects the timing of the ISDN 400-Hz signal TTR and, on the basis of sequence switching data sent from the transmitting side, detects the start timing of normal communication and inputs a normal-communication start signal CMST to the sequencer 350. The latter has an S/P operating clock generator 350a and a control signal generator 350b. The S/P operating clock generator 350a generates a S/P operating clock SPCL, the frequency of which is the same as the FFT sampling frequency, in sync with the ISDN 400-Hz signal TTR. At training time following detection of the timing of the ISDN 400-Hz signal TTR and completion of phase control of the pilot-tone signal, the control signal generator 350b generates various timing signals shown in FIG. 16 in sync with the S/P operating clock SPCL. At normal communication time following detection of the timing of the ISDN 400-Hz signal TTR and completion of phase control of the pilot-tone signal, the control signal generator 350b generates various timing signals shown in FIG. 17 in sync with the S/P operating clock SPCL.

Figure 16:
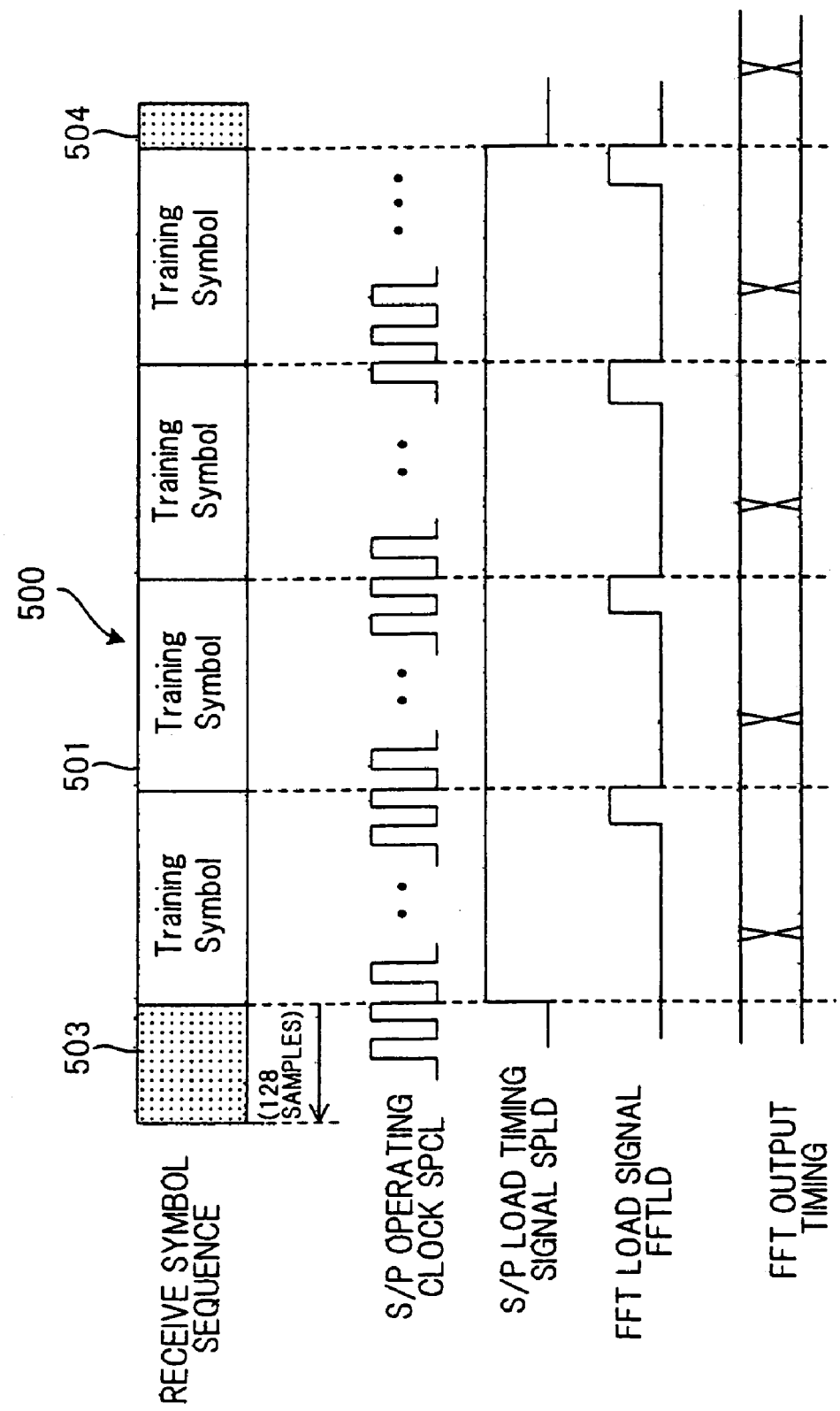
FIG. 16 is a time chart indicating a receive sequence operation (at the time of training)

(c-1) Receive Sequence Operation at Training Time (See FIG. 16)

If the signal detecting circuit 340 generates the training-starting signal TRST, the sequencer 350 generates an S/P load timing signal SPLD after the 128-sample redundancy signal arrives. As a result, the redundancy signal 503 that was added onto the beginning of the transmit symbol sequence 500 can be removed. If the S/P load timing signal SPLD is generated, the serial-to-parallel conversion buffer 100 (FIG. 9) successively stores the sample data output by the TEQ 90 in sync with the S/P operating clock SPCL. After one symbol (=256 samples) is preserved, the sequencer 350 generates an FFT load timing signal FFTLD to load the one symbol's worth of sample data from the serial-to-parallel buffer 100 to the FFT circuit 110. The latter performs an FFT operation at a predetermined timing and outputs the results of the operation.

Meanwhile, the serial-to-parallel conversion buffer 100 continues to successively store the sample data output from the TEQ 90 even after the FFT load timing signal FFTLD is generated and inputs the one symbol's worth (=256 samples) of data to the FFT circuit 110 by the FFT load timing signal FFTLD generated from the sequencer 350 after the one symbol's worth of data is preserved.

The same receive sequence operation is thenceforth repeated. After the final symbol is input to the FFT circuit 110, the sequencer 350 places the S/P load timing signal SPLD at the low level and removes the redundancy signal 504 that was added onto the end of the transmit symbol sequence.

Figure 17:
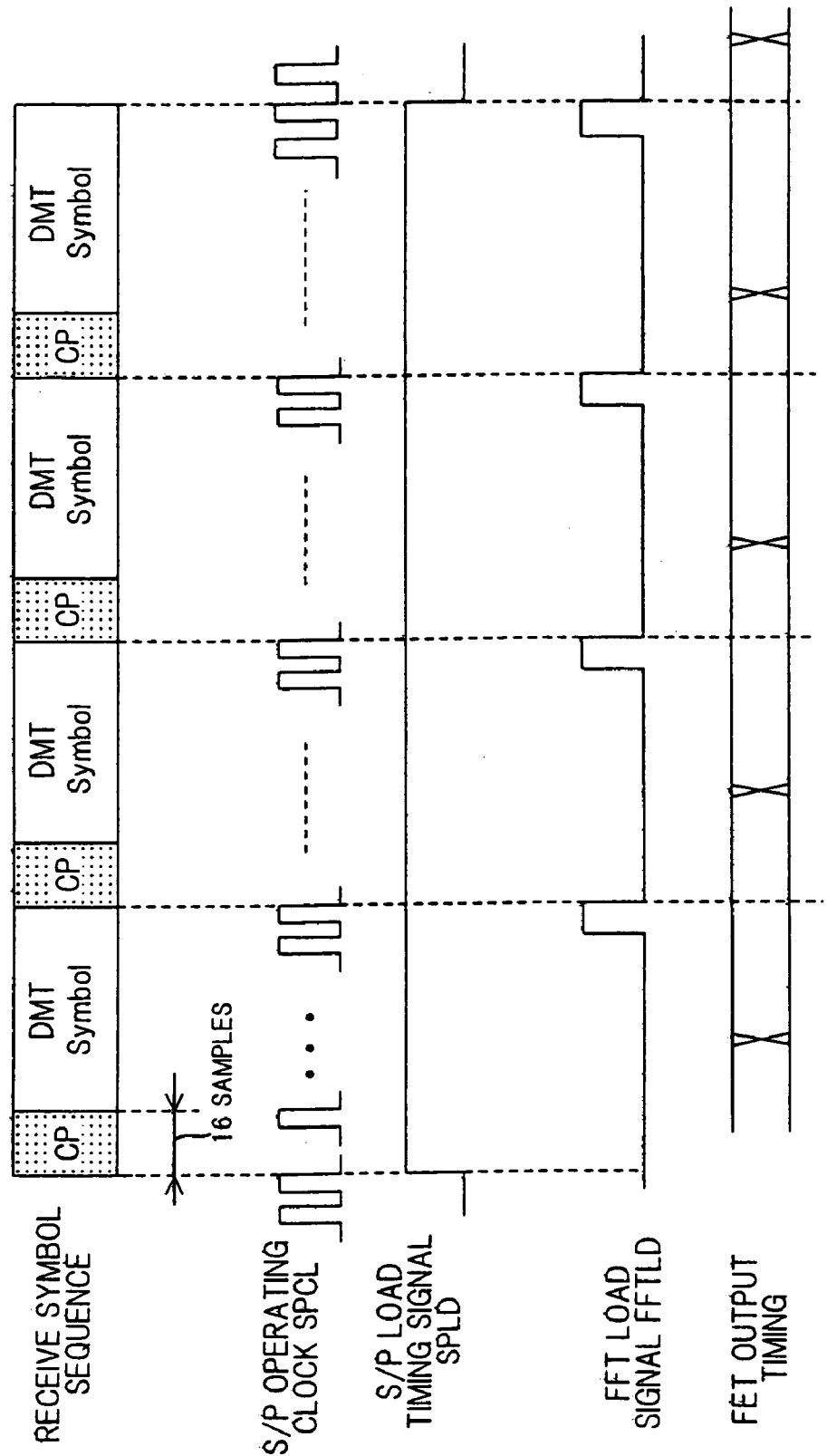
FIG. 17 is a time chart indicating a receive sequence operation (at the time of normal communication)

(c-2) Receive Sequence Operation at Normal Communication Time (See FIG. 17)

If the normal-communication start signal CMST enters from the training signal processor 370, the sequencer 350 immediately generates the S/P load timing signal SPLD. If the S/P load timing signal SPLD is generated, the serial-to-parallel buffer 100 (FIG. 9) successively stores the sample data output by the TEQ 90 in sync with the S/P operating clock SPCL. The sequencer 350 generates the FFT load timing signal FFTLD at the timing at which the 272 (=16+ 256) items of sample data corresponding to the cyclic prefix (CP) and one symbol were stored in the serial-to-parallel conversion buffer 100. As a result, one symbol's worth of sample data minus the 161-sample cyclic prefix is loaded in the FFT circuit 110 from the serial-to-parallel buffer 100. The FFT circuit 110 performs an FFT operation at a predetermined timing and outputs the results of the operation.

Meanwhile, the serial-to-parallel conversion buffer 100 continues to successively store the sample data output from the TEQ 90 even after the FFT load timing signal FFTLD is generated and the sequencer 350 generates the FFT load timing signal FFTLD at the timing at which the 272 (=16+ 256) items of new sample data were stored in the serial-to-parallel conversion buffer 100. As a result, the serial-to-parallel buffer 100 loads one symbol's worth of sample data minus the 16-sample cyclic prefix in the FFT circuit 110. The FFT circuit 110 performs an FFT operation at a predetermined timing and outputs the results of the operation.

The same processing is thenceforth repeated. After the final symbol is input to the FFT circuit 110, the sequencer 350 places the S/P load timing signal SPLD at the low level.

(d) Control of Transmission of Pilot-tone Signal PLT

A pilot generator 330a (FIG. 10) in the training-signal generating circuit 330 generates the pilot-tone signal. The training-signal generating circuit 330 sends the pilot-tone signal to the subscriber side in the transmit interval of the TDD-xDSL transmission regardless of whether it is training time or normal communication time. More specifically, the sequencer 310 generates the select signal DTSL and the selector 320 inputs the pilot-tone signal to the #64 terminal of the IFFT circuit 30 in the transmit interval of the TDD-xDSL transmission. The IFFT circuit 30 applies IFFT processing to the pilot-tone signal and then transmits the processed signal to the receiving side via the parallel-to-serial conversion buffer 40 and D/A converter 50.

On the basis of the signal output from the #64 carrier terminal of the FFT circuit 110, the pilot-phase detecting circuit 360 detects the phase of the pilot-tone signal PLT and controls the A/D conversion timing of the A/D converter 80.

As a result, the A/D conversion and other processing can be executed on the receiving side in sync with the pilot-tone signal.

(e) Sending/Receiving of Phase of ISDN 400-Hz Signal

At the time of training, the training-signal generating circuit 330 transmits a tone signal separately of the pilot-tone signal PLT by carrier #48 to thereby report the phase of the ISDN 400-Hz signal (the transmit phase of the TDD-xDSL on the office side) from the office side to the subscriber side (see FIGS. 7 and 8). In other words, at training time, the office side uses this tone signal to notify the subscriber side of the timing which identifies the period in which the effects of crosstalk are received.

In a case where the transmit symbol sequence of one burst contains four training symbols, a tone signal indicating the phase of the ISDN 400-Hz signal is transmitted by causing the phase of adjacent training symbols in one burst to change at least one time.

FIG. 7A illustrates an example in which the phase of adjacent symbols is caused to change one time in one burst. Here the pattern of the first and second symbols and the pattern of the third and fourth symbols changes from A to B. The symbol patterns can also be changed between the first and second symbols and between the third and fourth symbols. The symbol patterns A and B can be selected in such a manner that the phase difference between them becomes 90°, as shown in the QAM constellation diagram of FIG. 8A, or in such a manner that the phase difference between them becomes 180°, as shown in the QAM constellation diagram of FIG. 8B. That is, 2-bit sets 1 −1, 1 −1, . . . , 1 −1 are input to the selector 320 in the case of pattern B in FIG. 8A, and 2-bit sets −1 −1, −1 −1, . . . −1 −1 are input to the selector 320 in the case of pattern B in FIG. 8B.

FIG. 7B illustrates an example in which the phase of adjacent symbols is caused to change twice in one burst. Here the first and second symbol patterns in the manner B→A and the third and fourth symbol patterns change in the manner A→B. The phase-change points may be chosen in such a manner that the patterns change between any two sets of adjacent symbols.

In order to report the phase of the ISDN 400-Hz signal (the transmit phase of the TDD-xDSL on the office side) by the pattern change of FIG. 7A, the training-signal generating circuit 330 generates data in such a manner that the symbol data changes in the manner A→A→B→B based upon the rising edge of the ISDN 400-Hz signal TTR that enters from the sequencer 310. This data is subjected to IFFT processing by the IFFT circuit 30 and becomes the training symbol sequence of FIG. 7A, which is then transmitted. On the receiving side, therefore, the time at which the A→B phase change occurs is detected and a time which precedes this phase-change time by the time period T1 is recognized as being the phase of the rising edge of the ISDN 400-Hz signal TTR. In actuality, the phase of the rising edge of the ISDN 400-Hz signal TTR is decided based upon average values obtained a plurality of times.

In order to report the phase of the ISDN 400-Hz signal (the transmit phase on the office side) by the pattern change of FIG. 7B, the training-signal generating circuit 330 generates data in such a manner that the symbol data changes in the manner B→A→A→B based upon the rising edge of the ISDN 400-Hz signal TTR that enters from the sequencer 310. This data is subjected to IFFT processing by the IFFT circuit 30 and becomes the training symbol sequence of FIG. 7B, which is then transmitted. On the receiving side, therefore, the times at which the B→A, A→B phase changes occur are detected, the average Tavr of these times is obtained and a time which precedes this average time by the set time period T2 is recognized as being the time of the rising edge of the ISDN 400-Hz signal TTR. In actuality, the phase of the rising edge of the ISDN 400-Hz signal TTR is decided based upon average values obtained a plurality of times. In the example of FIG. 7B, two phase-change times can be detected by a single training. In comparison with FIG. 7A, therefore, the phase of the rising edge of the ISDN 400-Hz signal TTR can be decided by a smaller number of operations.

With G.lite also, which likewise is an xDSL scheme, a method of conveying a change in phase by a tone signal other than a pilot tone is used. In the present invention, however, a transmission in the NEXT interval is not carried out, unlike the case with G.lite. As a consequence, it is unnecessary to distinguish between the FEXT and NEXT intervals and therefore the method in which phase is changed can use a 180° change in addition to the 90° change or a combination of these changes.

(C) First Embodiment of Burst Frames at Training Time and Normal Communication Time G992.2 (G.lite) technology is available as a conventional xDSL scheme. With G.lite, 4.3125 kHz is used as the carrier frequency spacing, 256 as the number of samples within one DMT, and #64 as the carrier which transmits the pilot tone. According to the first embodiment of the present invention, 4 kHz, which is lower than in the G.lite scheme, is used as the carrier frequency spacing. As for the other items, 256 is selected as the number of samples in one DMT symbol and #64 is selected as the carrier which transmits the pilot tone, just as in the G.lite scheme.

In the first embodiment, the FFT sampling frequency of the transmitted signal is 1024 kHz in view of the carrier frequency spacing and number of samples. Further, the frequency of the pilot tone is 4 kHz×64=256 kHz. In other words, the data per cycle of the pilot tone is four sample's worth. Further, in the first embodiment, the symbol length of one symbol is 256 samples and the cycle is 250 µs. In view of the relationship with respect to the burst interval of 1250 µs in an ISDN ping-pong transmission system, the number of symbols contained in one burst is four at most. If the number of symbols is four, this leaves about 250 µs extra. This extra period of time can be utilized to add on the redundancy signals or set the margins. That is, even if the redundancy signals 503, 504 are added onto the beginning and end of the training symbol sequence, four symbols can be sent without reducing the number of symbols per burst.

(a) Signal Transmit Interval at Normal Communication Time

The transmit interval of a transmit frame at the time of normal communication according to the first embodiment will be described with reference to FIG. 1. The symbol 701 with the cyclic prefix (CP) 702 is used at normal communication time in TDD-xDSL transmission. The length of the cyclic prefix can be any length as long as the transmit symbol sequence fits within the transmit interval. In this embodiment, however, the length of the cyclic prefix is made 16 samples (15.635 µs), which is the same as that in the G992.2 (G.lite) scheme that is one xDSL scheme, and four symbols with a cyclic prefix are connected to construct the transmit symbol sequence 700. The symbol length of the transmit symbol sequence 700, therefore, is 1088 samples (1.0625 ms).

Figure 19:
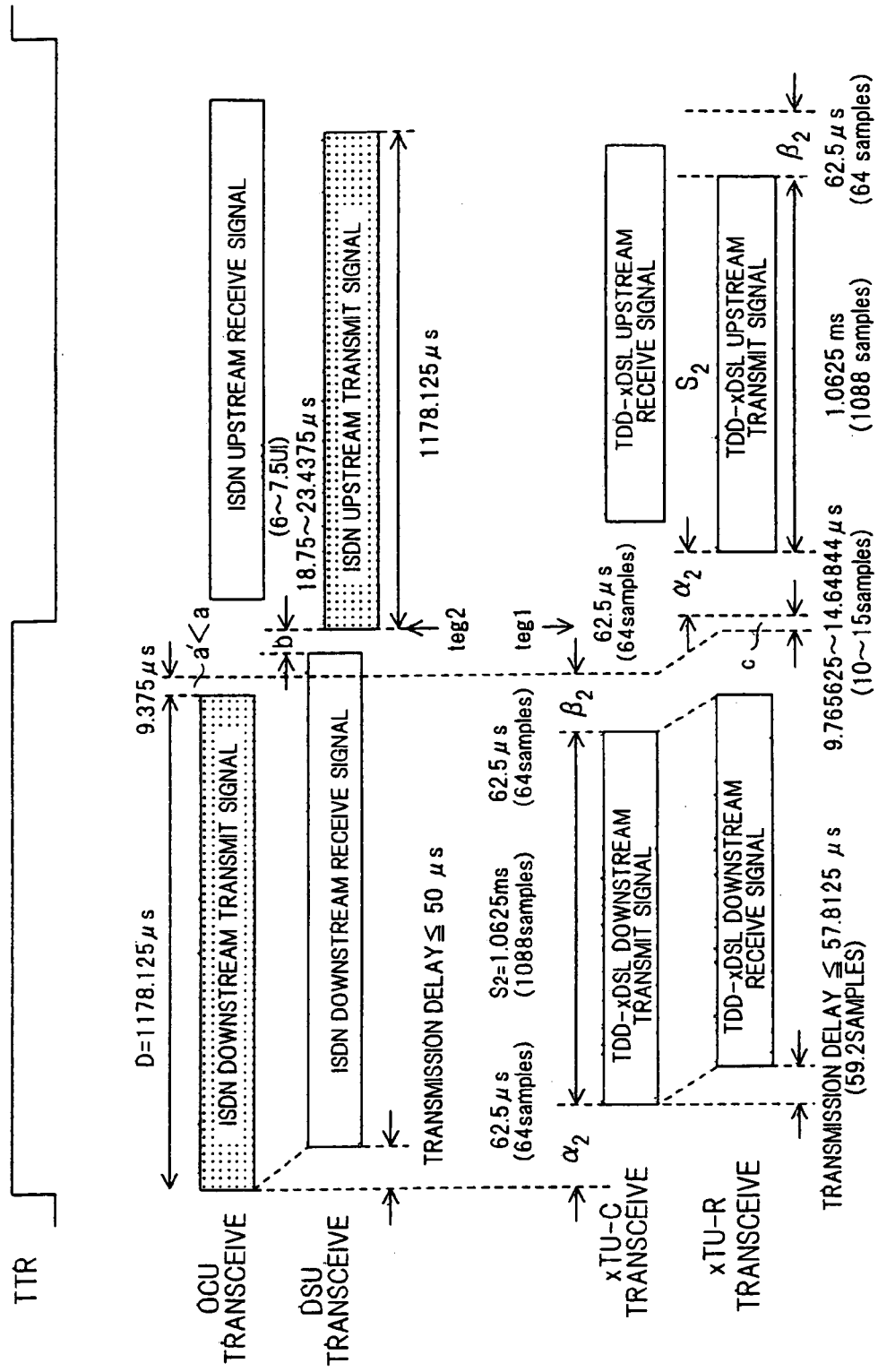
FIG. 19 is a diagram illustrating the structure of a burst frame (at the time of normal communication) according to the first embodiment.

FIG. 19 illustrates the timing relationship between the transmit symbol sequence 700 for normal communication and a signal in ISDN ping-pong transmission.

The transmit interval of a downstream signal will be considered first. In order to arrange it so that the TDD-xDSL transmit interval will not overlap the receive interval of an ISDN ping-pong transmission with certainty, the downstream-signal transmit interval of the TDD-xDSL is placed approximately at the center of the transmit interval of the ISDN ping-pong transmission. It is required that the relation $$S2+\alpha 2+\beta 2 \leq D+a$$

be satisfied as described in accordance with FIG. 3, where the transmit interval D of an ISDN ping-pong transmission is equal to 1.178125 ms (1206.4 samples) and the length S2 of the TDD-xDSL transmit signal is equal to 1.0625 ms (1088 samples). If the a' which will satisfy a'<a is 9.375 (9.6 samples) allowing for margins, then it will suffice to find the $\alpha 2$, $\beta 2$ that satisfy $$S2+\alpha 2+\beta 2 \leq D+a' \leq D+a$$

Since TDD-xDSL downstream transmit interval is brought to the center of the ISDN ping-pong downstream transmit interval, we find that $\alpha 2=\beta 2=62.5$ µs (64 samples).

Similarly, consider the upstream signal interval. Guard time b between downstream signal reception and upstream signal transmission in ISDN ping-pong transmission is a value having a range of 18.75 µs (19.2 samples) to 23.4378 µs (24 samples).

Since the guard time is a value decided independently of the TDD-xDSL scheme, the transmit interval of the TDD-xDSL upstream transmit symbol sequence cannot be brought exactly to the center of the upstream transmit interval of the ISDN ping-pong transmission. Accordingly, to bring the transmit interval of the TDD-xDSL upstream transmit symbol sequence approximately to the center of the upstream transmit interval of the ISDN ping-pong transmission, the guard time of the ISDN ping-pong transmission is regarded as being 18.75 µs (19.2 samples), in which case a TDD-xDSL guard time c is selected in such a manner that end time tge1 of the TDD-xDSL guard time and end time teg2 of the ISDN guard time will approximately coincide.

In the first embodiment, (upstream transmit interval of ISDN ping-pong transmission+guard time b) is 1196.875 µs and (TDD-xDSL upstream-signal transmit interval S2+beginning and end margins $\alpha 2+\beta 2$) is 1187.5 µs (1216 samples). Accordingly, guard time c of the TDD-xDSL transmission is selected to be 9.765625~14.64844 (10~15 samples) and transmit timing is decided in a manner similar to that of the downstream signal.

(b) Signal Transmit Interval at Training Time

Figure 18:
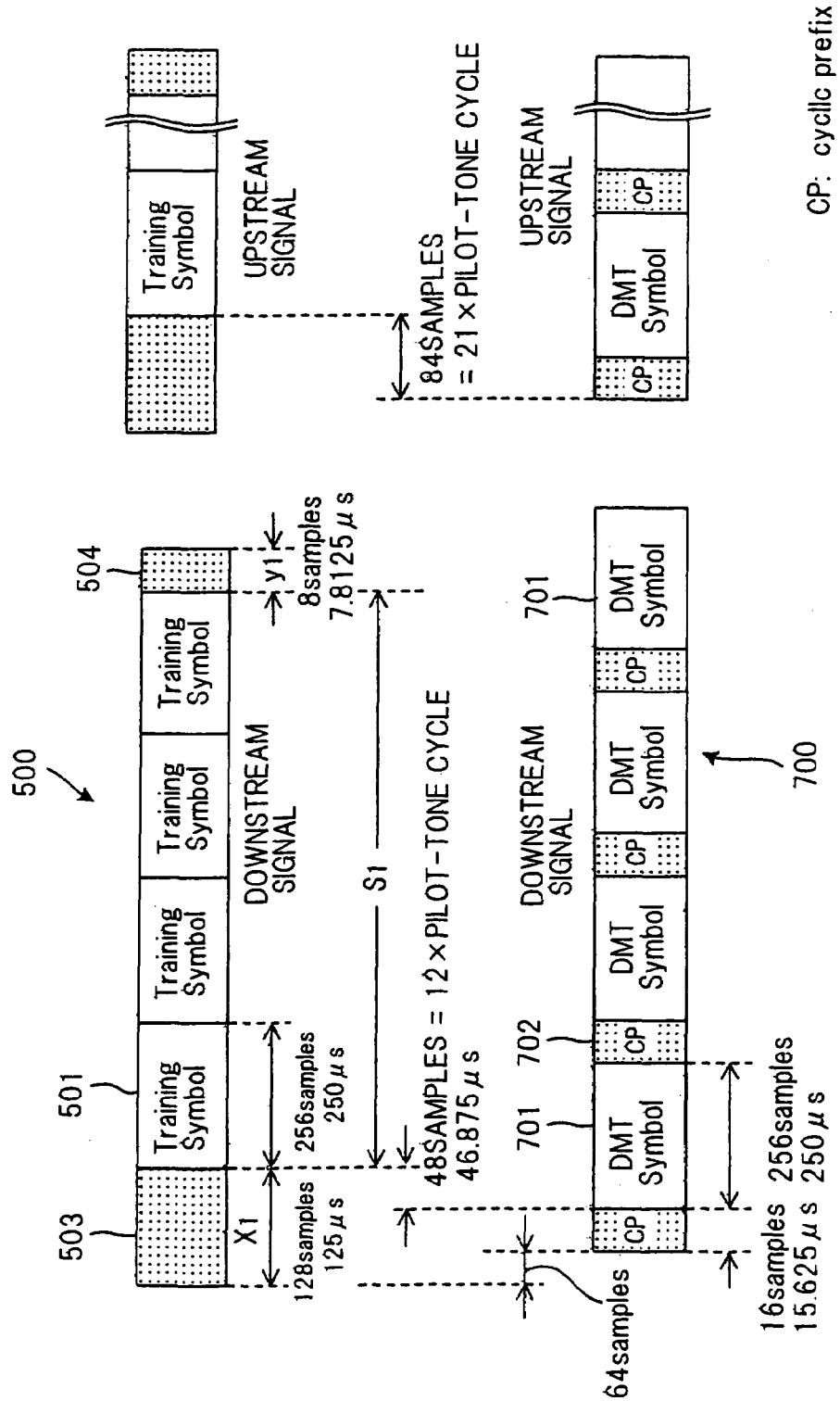
FIG. 18 is a diagram showing the phase relationship between burst frames at the time of training and at the time of normal communication according to a first embodiment of the present invention.

The signal transmit interval at the time of training according to the first embodiment will be described with reference to FIGS. 18 and 20. FIG. 18 illustrates the transmit symbol sequence 500 for TDD-xDSL training. It is desired that the redundancy signal 503 added onto the beginning of four successive training symbols 501 be a sufficiently long interval relative to the cyclic prefix 702 at the time of normal communication. It will be assumed here that a redundancy signal 503 of 125 µs (128 samples), which is a sufficiently long interval relative to a cyclic prefix having a length of 16 samples (15.625 µs), is used as an example. Further, a redundancy signal of eight samples (7.8125 µs) is added on as an example of the redundancy signal 504 added on at the end of the four training symbols. Thus is constructed the transmit symbol sequence 500 for training. As a result, we have x1=125 µs (128 samples), y1=7.8125 µs (eight samples). Further, we have S1=1 ms (1024 samples=256×4).

From this we obtain $S1+x1+y1=1.132813$ ms (1160 samples).

Figure 20:
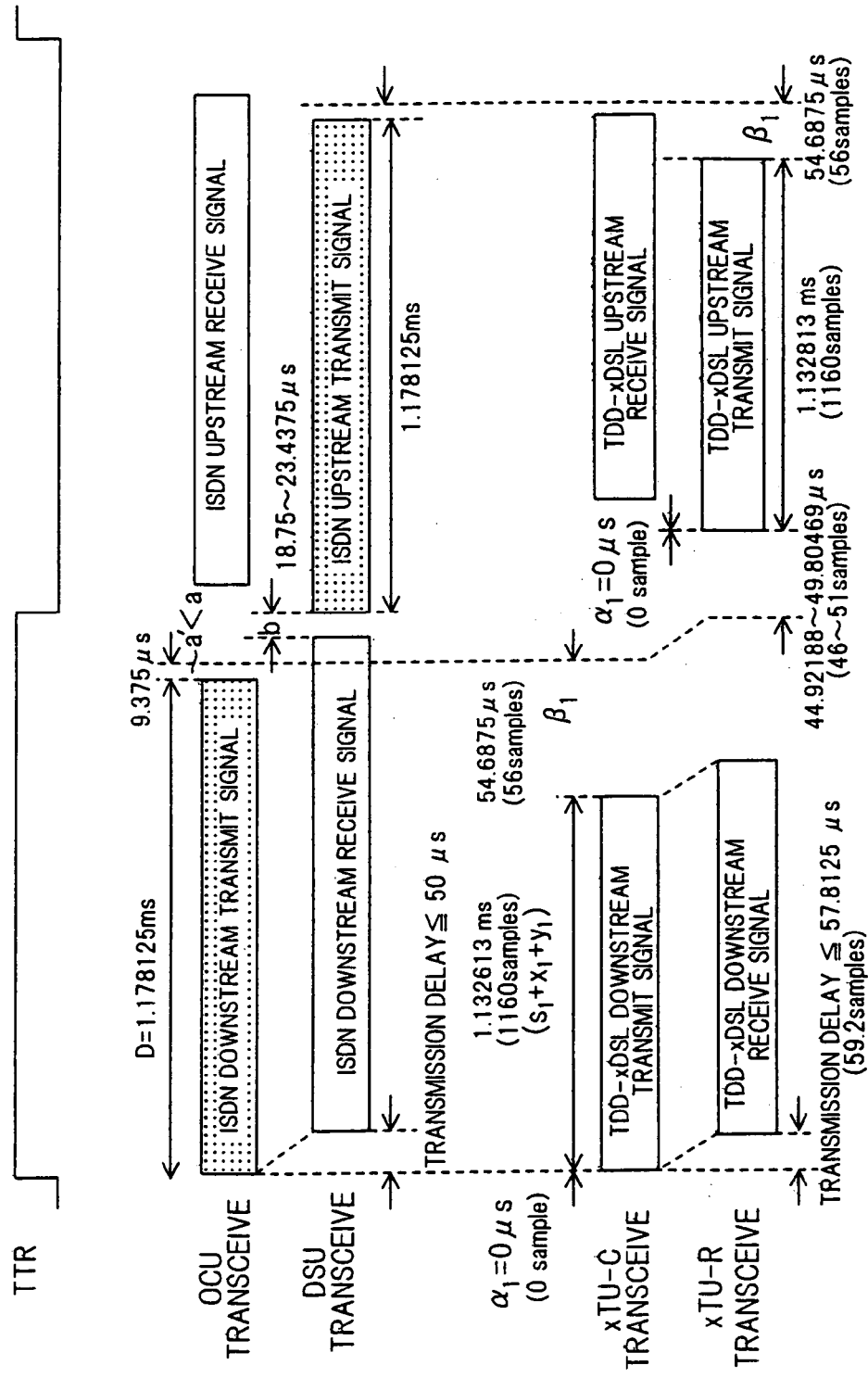
FIG. 20 is a diagram illustrating the structure of a burst frame (at the time of training) according to the first embodiment.

Next, if we find (S1+α1+β1+x1+y1) which falls within D+a' in a manner similar to that at normal communication time, as shown in FIG. 20, we have 1.132813 ms (1160 samples)+α1+β1≦1.1875 ms (1216 samples)

Accordingly, α1=0 μs (zero samples), β1=54.6875 μs (56 samples) is selected.

(c) Consideration of Worst Conditions

Transmission delay in an ISDN ping-pong system and transmission delay in a TDD-xDSL system are decided separately and independently. As a consequence, in a case where an ISDN line is nearby (no delay) and a TDD-xDSL is most remote (maximum delay), there will be instances where, at training time, transmission of an upstream signal from the subscriber side of the ISDN starts before the end of reception of a downstream signal of the TDD-xDSL on the subscriber side, resulting in a discrepancy between the transmit and receive timings. Accordingly, consider the worst conditions of a TDD-xDSL transmission transmit/receive interval with respect to an ISDN transmit/receive interval. In the first embodiment, the length of the TDD-xDSL transmission symbol sequence is greater at training time (i.e., 1160 samples) than at normal communication time (i.e., 1088 samples). Accordingly, consideration will be given to training time.

(c-1) First Worst Condition

Figure 21:
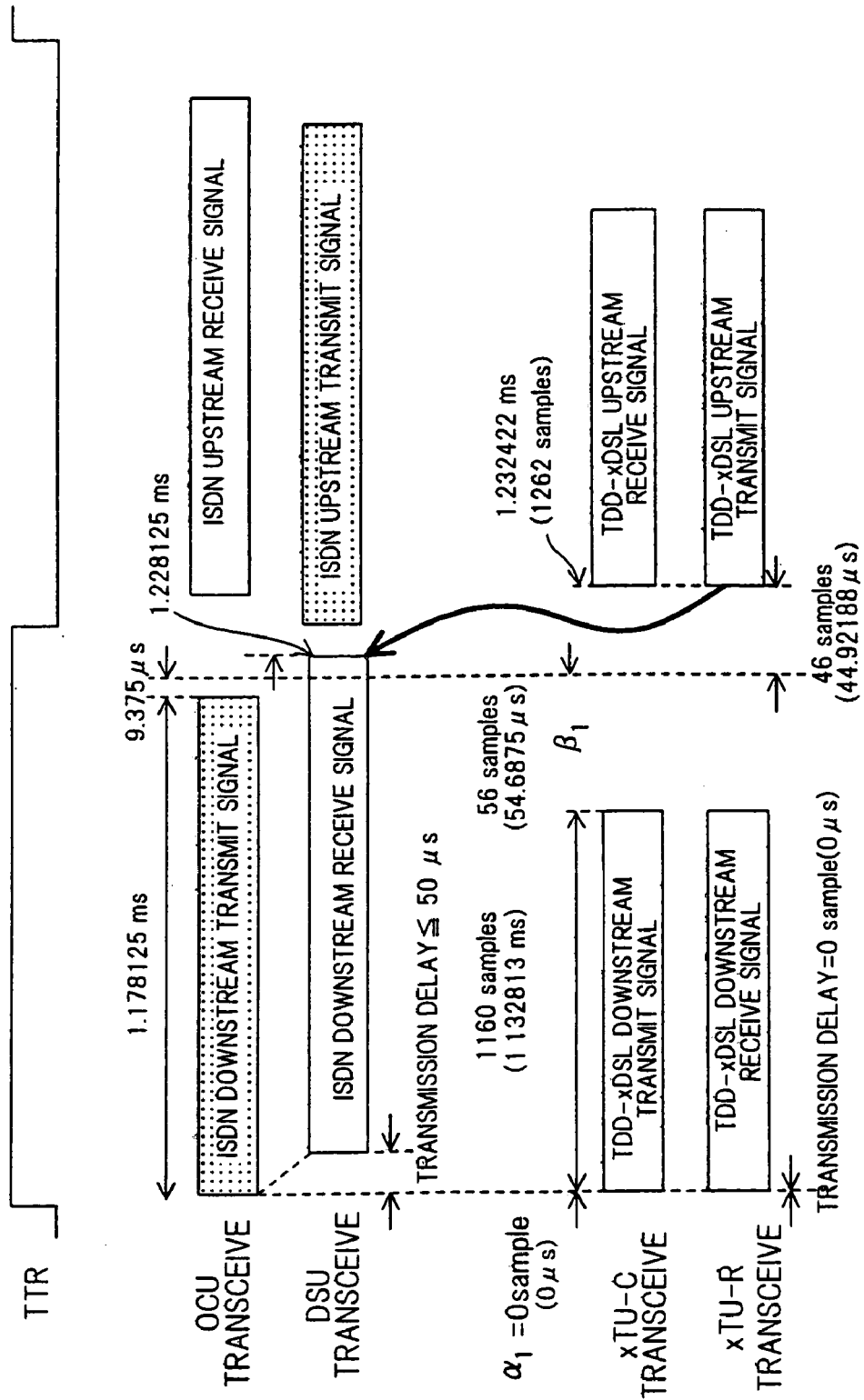
FIG. 21 is a diagram useful in describing a first worst condition (at the time of training) according to the first embodiment.

A worst condition which will be discussed first is a case where the delay time of a TDD-xDSL transmission is minimum and the delay time of an ISDN ping-pong transmission is maximum. As shown in FIG. 21, the start of transmission of an upstream signal in TDD-xDSL transmission must not occur before ISDN transmission of a downstream signal ends. In the first embodiment, the latest timing of the end of reception of an ISDN downstream signal is that obtained by adding a transmission delay of 50 μs (51.2 samples) to the length of 1.178125 ms (1206.4 samples) of the ISDN downstream transmit signal.

On the other hand, the earliest timing of the start of transmission of a TDD-xDSL transmit signal is the total obtained by adding beginning and end margin intervals α1=0 μs (zero samples), β1=54.6875 μs (56 samples), which precede and follow signal transmission, to the TDD-xDSL downstream signal interval of 1.132813 ms (1160 samples) and then adding on the upstream-downstream guard time and beginning margin interval α1 (=0), which precedes signal transmission. A guard time of 44.92188 to 49.80469 μs (46 to 51 samples) between upstream and downstream TDD-xDSL transmissions is decided in such a manner that the following will hold:

end of ISDN downstream signal interval<beginning of TDD-xDSL upstream signal

As a result, we have 1.228125 ms (1257.6 samples) [end of ISDN downstream signal interval]<1.232422 ms (1262 samples) [beginning of TDD-xDSL upstream signal]

Thus the TDD-xDSL upstream signal will not be transmitted earlier than the end of reception of the ISDN downstream signal. In other words, even under the worst condition set forth above, the transmit interval of the TDD-xDSL transmission falls within the transmit interval of the ISDN unit on the side near the transmitting ADSL unit.

(c-2) Second Worst Condition

Figure 22:
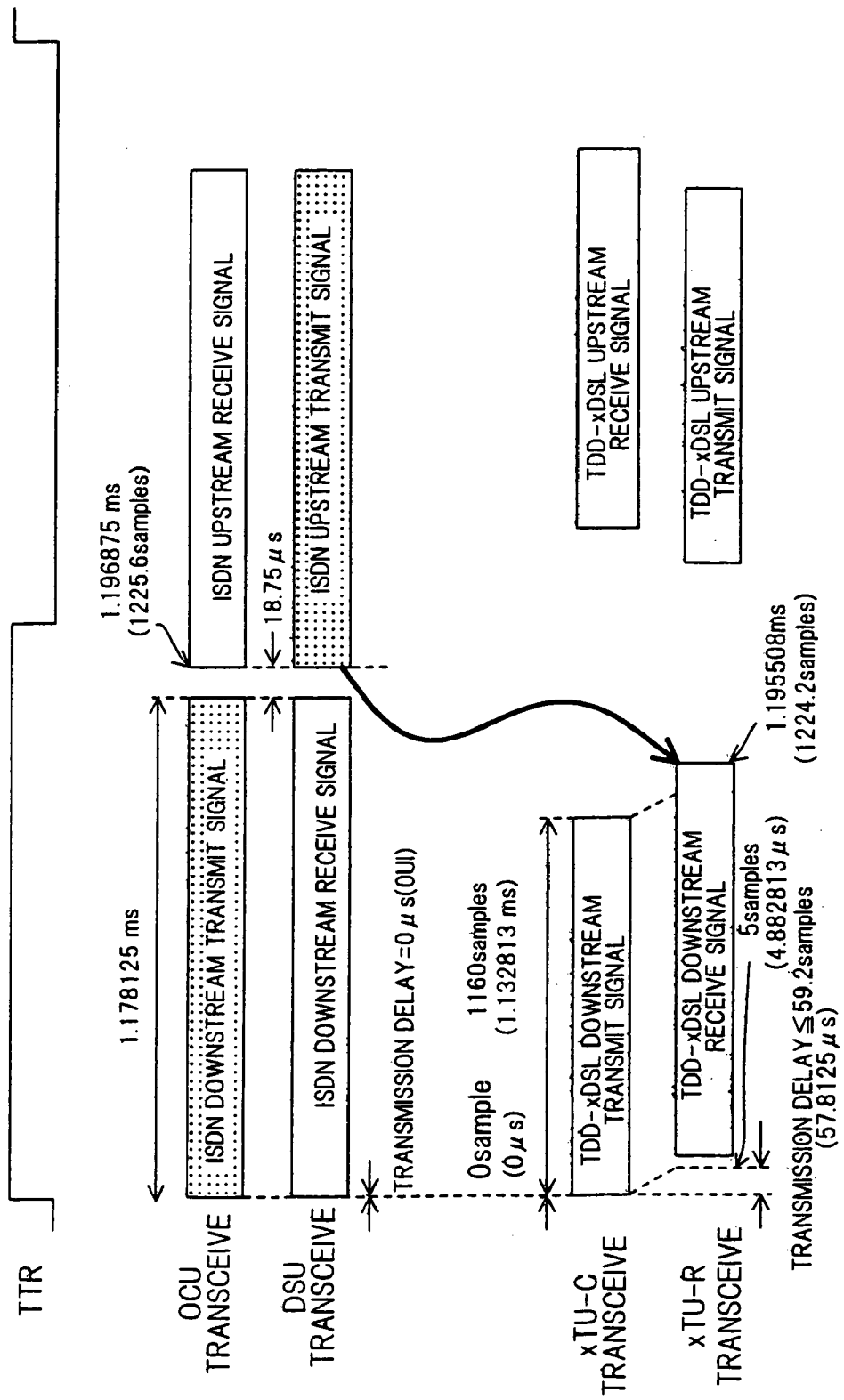
FIG. 22 is a diagram useful in describing a second worst condition (at the time of training) according to the first embodiment.

A worst condition which will be described next is the converse of the above, i.e., a case where the delay time of a TDD-xDSL transmission is maximum and the delay time of an ISDN ping-pong transmission is minimum. In this case, as shown in FIG. 22, the end of the receive interval of the TDD-xDSL downstream signal must end before the beginning of transmission of the ISDN upstream signal. In the first embodiment, the latest timing of the end of reception of the TDD-xDSL downstream signal is obtained by adding the length of 1132.813 μs (1160 samples) of the TDD-xDSL downstream transmit signal, a transmission delay time of 57.8125 μs (59.2 samples), a margin of 4.882813 μs (five samples) for a shift in receive timing and the margin interval α1 (=0) μs (zero samples) that precedes signal transmission.

On the other hand, the earliest transmit timing of the upstream signal in ISDN ping-pong transmission is the result (=1.196875 ms) of adding the minimum upstream-downstream guard time of 18.75 μs (19.2 samples) to the ISDN downstream interval of 1.178125 ms. Comparing this with the foregoing, we have 1.195508 ms (1224.2 samples) [end of TDD-xDSL downstream signal interval]<1.196875 ms (1225.6 samples) [beginning of ISDN upstream signal]

Thus the TDD-xDSL downstream signal is received earlier than the start of transmission of the ISDN upstream signal. As a result, even under the second worst condition set forth above, the transmit interval of the ISDN upstream signal will not overlap the receive interval of the TDD-xDSL downstream signal.

(c-3) Third Worst Condition

Figure 23:
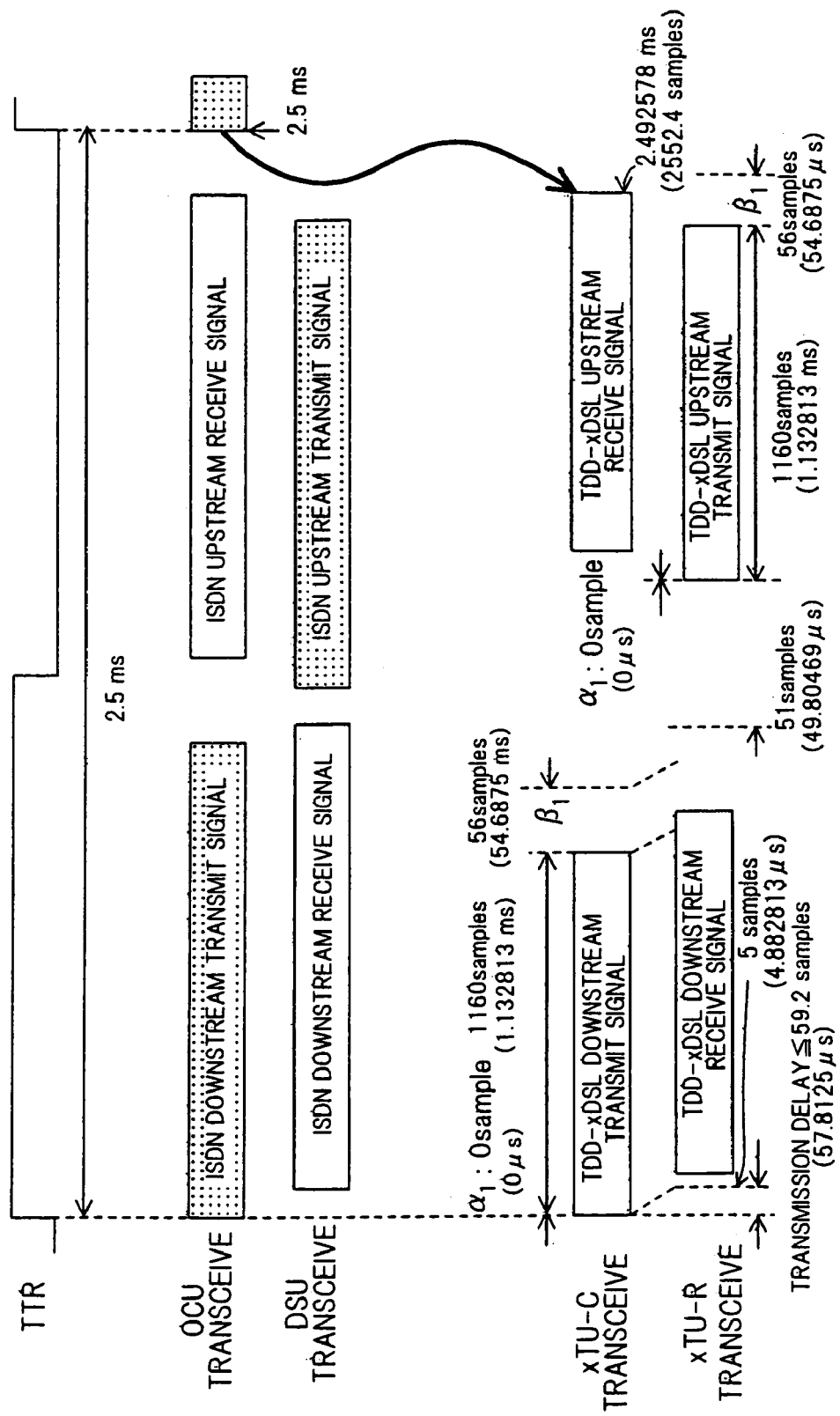
FIG. 23 is a diagram useful in describing a third worst condition (at the time of training) according to the first embodiment.

Reference will be had to FIG. 23 to describe that in a case where the delay time of TDD-xDSL transmission is maximum, the receive interval of a TDD-xDSL upstream signal will not overlap the transmit interval of a downstream signal in ISDN ping-pong transmission.

The end of the TDD-xDSL upstream receive signal is 2.492578 ms, which is obtained by adding (1) a transmit interval of 1.132813 ms (1160 samples) of the TDD-xDSL downstream signal, (2) a beginning margin interval of α1=0 μs (=zero samples) and (3) an end margin interval of β1=54.6875 μs (56 samples), which precede and follow the signal transmission, (4) a transmission delay of 57.8125 μs (59.2 samples)×2 (because of the two directions, namely upstream and downstream), (5) summation of an upstream-downstream maximum guard time of 49.80469 μs (51 samples) and a margin of 4.882813 μs (5 samples) for the shift of receive timing, (6) the transmit interval of 1.132813 ms (1160 samples) of the TDD-xDSL upstream signal, (7) a margin interval of α1=0 μs (zero samples) that precedes the transmission of the signal and (8) a margin of 0.976567 (one sample)×2, which is for a delay in rise time when the DMT symbol starts to be sent or a remaining signal when transmission of the DMT symbol is stopped, On the other hand, the burst cycle of the ISDN ping-pong transmission is 2.5 ms. Comparing this with the foregoing, we have 2.492578 ms (2552.4 samples) [end of TDD-xDSL upstream signal interval]<2.5 ms (2560 samples) [ISDN burst cycle]

Thus the reception of the TDD-xDSL upstream ends earlier than the start of transmission of the next ISDN downstream signal. In other words, even if the delay time of the TDD-xDSL transmission is maximum, the receive interval of the TDD-xDSL upstream signal will not span the ISDN transmit interval of the next burst.

The foregoing is a review of worst conditions. However, in a case where an ISDN line and a TDD-xDSL metallic line are adjacent to each other, these are connected to the same office and therefore the worst conditions are not possible in actuality.

Figure 24A:
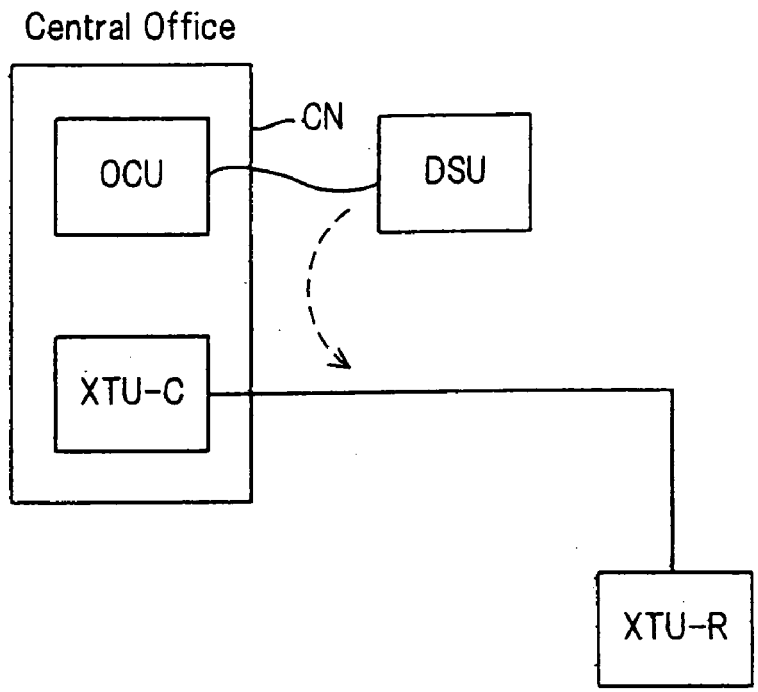
FIGS. 24A and 24B are diagrams useful in describing two worst conditions.

For example, in a case where an ISDN line has no transmission delay time and the transmission delay time of a TDD-xDSL is maximum, the ISDN unit DSU on the subscriber side is disposed alongside the central office CN and the TDD-xDSL unit xTU-R on the subscriber side is disposed at a location remote from the central office, as shown in FIG. 24A In a case where an upstream signal from the ISDN unit DSU leaks into the TDD-xDSL under these circumstances, the fact that noise is transmitted from the location at which the ISDN unit DSU is disposed to the location at which the TDD-xDSL unit xTU-R is disposed results in a transmission delay. If the transmission of the downstream TDD-xDSL signal from the office side has ended, therefore, the upstream signal of the ISDN line will be unaffected.

Figure 24B:
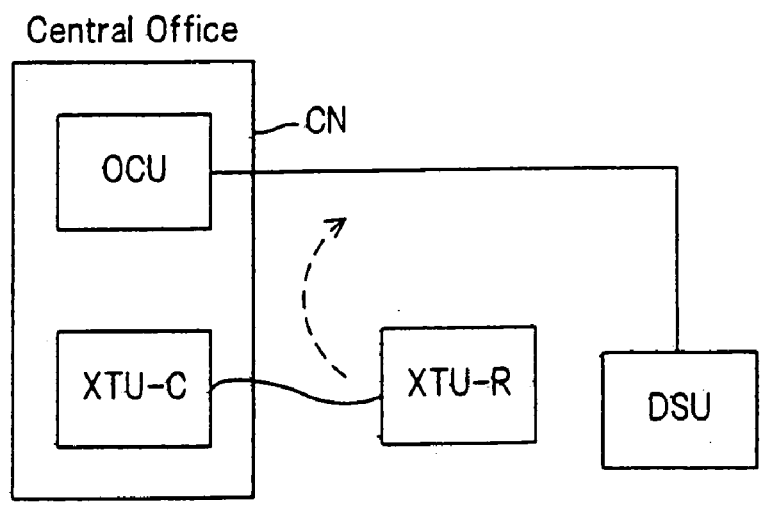

Conversely, in a case where the transmission delay time of the ISDN line is maximum and the TDD-xDSL has no transmission delay, the ISDN unit DSU on the subscriber side is disposed at a location remote from the central office CN and the TDD-xDSL unit xTU-R on the subscriber side is disposed at a location alongside the central office, as shown in FIG. 24B In this case also the fact that the upstream signal of the TDD-xDSL transmission leaks into the ISDN unit DSU on the subscriber side as noise results in transmission delay. If the transmission of the ISDN downstream signal from the office side has ended, therefore, the ISDN line will be unaffected.

Figure 25:
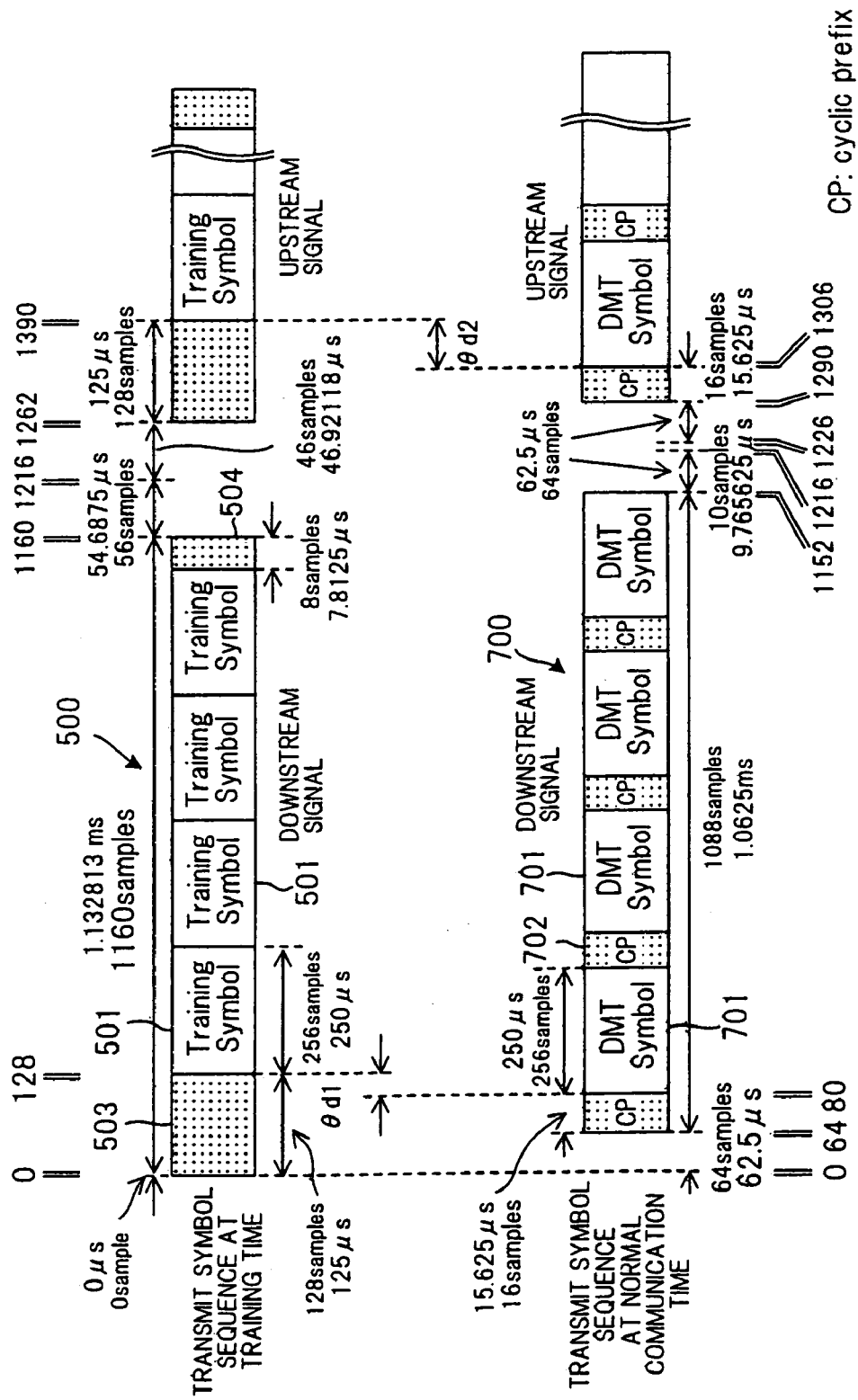
FIG. 25 is a diagram useful in describing the phase difference between a transmit symbol sequence for training and a transmit symbol sequence at the time of normal communication.

(d) Phase Difference Between Transmit Symbol Sequences at Training Time and Normal Communication Time The phase difference between the transmit symbol sequence for training and the transmit symbol sequence for normal communication time will be described with reference to FIG. 25. The difference between the starting position of the leading symbol 501 at training time and the starting position of the leading symbol 701 from which the cyclic prefix (CP) has been removed at normal communication time is $\theta d1=46.875$ μs (48 samples) in case of a downstream signal and $\theta d2=82.0312$ μs (48 samples) in case of an upstream signal, as will be obvious from FIG. 25.

Since 3.90625 μs (four samples) is one pilot tone cycle, the phase differences $\theta d1$, $\theta d2$ are 12 and 21 times the pilot tone, respectively, and therefore the requirement that the phase differences be a whole-number multiple of the pilot-tone cycle is satisfied.

(2) Second Embodiment

As in the case of the G.lite scheme, the second embodiment relates to a case where 4.3125 kHz is selected as the carrier frequency spacing, 256 as the number of samples and #64 as the carrier which transmits the pilot tone.

Figure 26:
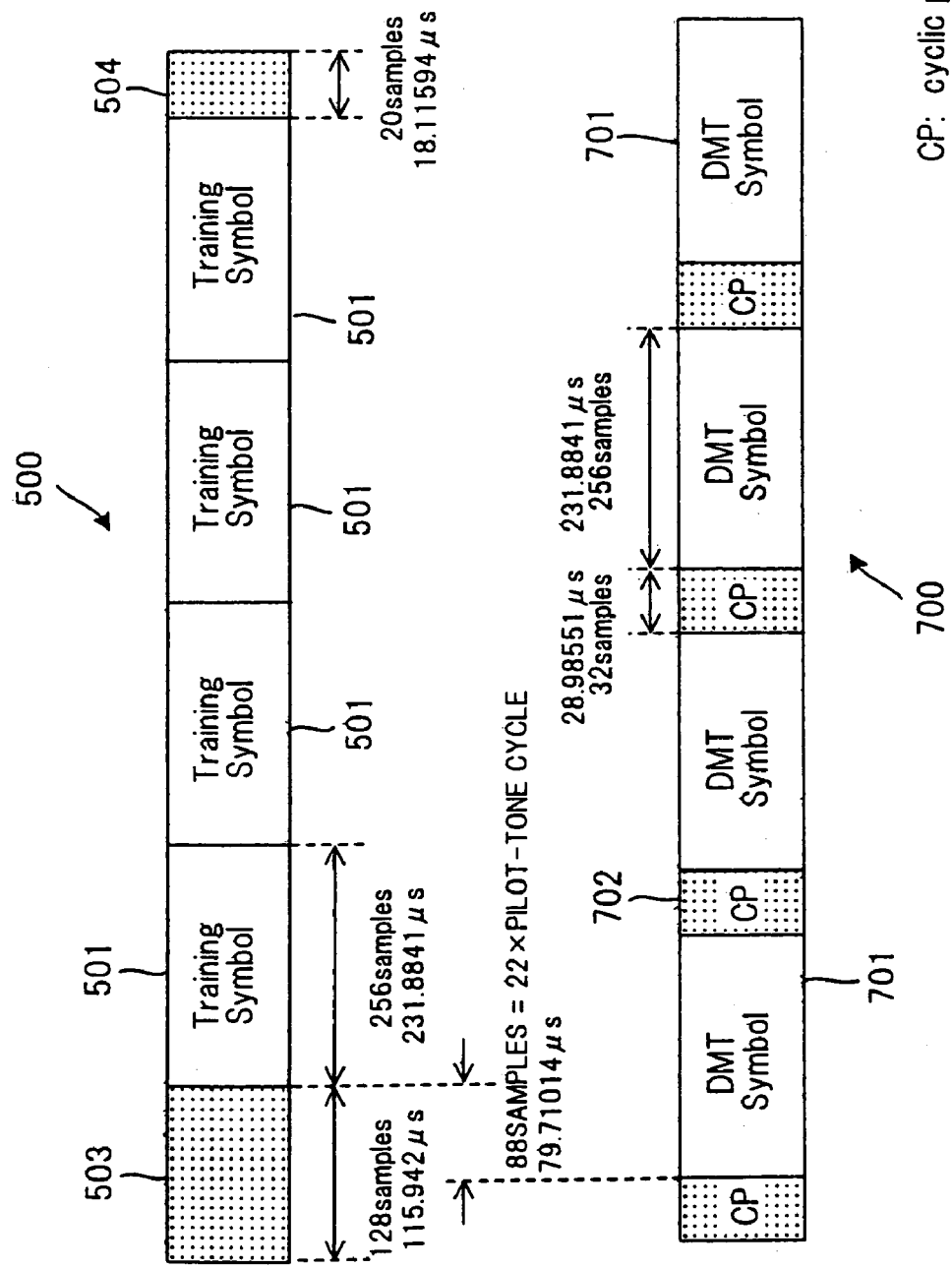
FIG. 26 is a diagram useful in describing the phase relationship between burst frames at the time of training and at the time of normal communication according to a second embodiment of the present invention.

According to the second embodiment, the sampling frequency is 1104 kHz and the pilot-tone frequency is 276 kHz. Accordingly, 3.623188 μs (four samples) constitutes one pilot tone cycle in a manner similar to that of the first embodiment. Further, in the second embodiment, the length of the cyclic prefix is, e.g., 28.98551 μs (32 samples), which is longer than in the case of the G.lite scheme, the length of the redundancy signal 503 added onto the beginning at training time is 115.94203 μs (128 samples), which is a redundancy length sufficiently longer than the cyclic prefix of the G.lite scheme, and the length of the redundancy signal added on at the end is 18.11594 μs (20 samples). In view of the foregoing, the structures of the transmit symbol sequences 500, 700 at normal communication time and training time, respectively, are as shown in FIG. 26.

Figure 27:
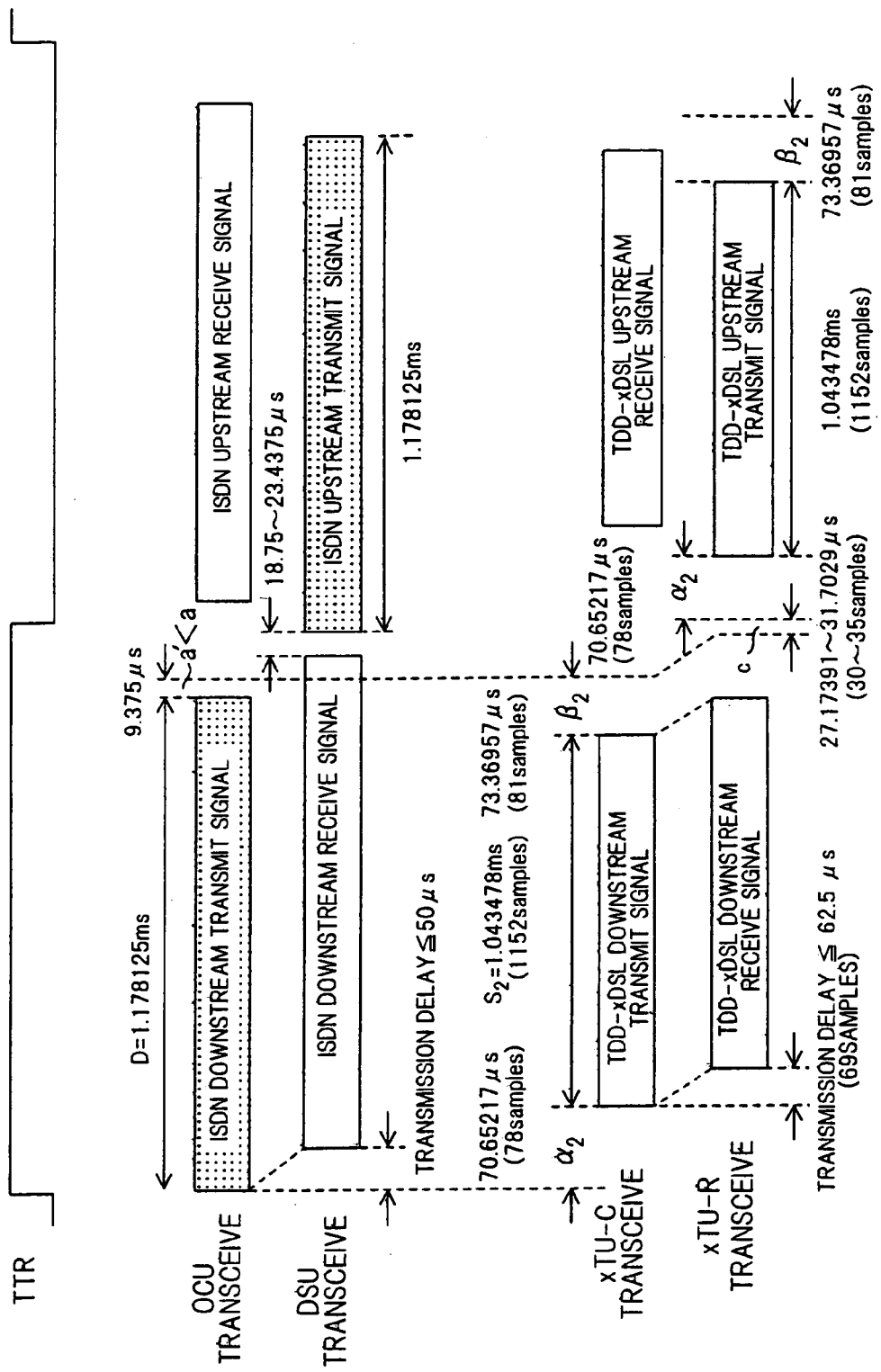
FIG. 27 is a diagram illustrating the structure of a burst frame (at the time of normal communication) according to the second embodiment.

The signal transmit interval at normal communication time in the second embodiment will be described with reference to FIG. 27. If it is so arranged that the TDD-xDSL signal transmit interval is brought to approximately the center of the transmit interval of the ISDN ping-pong transmission in a manner similar to that of the first embodiment, then, if the following hold:

$D+a'=1.1875$ ms (1311 samples)

$S2=1.043478$ ms (1152 samples)

we have $\alpha 1+\beta 2=144.0217$ μs (159 samples) and therefore $\alpha 2=70.65217$ μs (78 samples) and $\beta 2=73.36957$ μs (81 samples) are selected.

Figure 28:
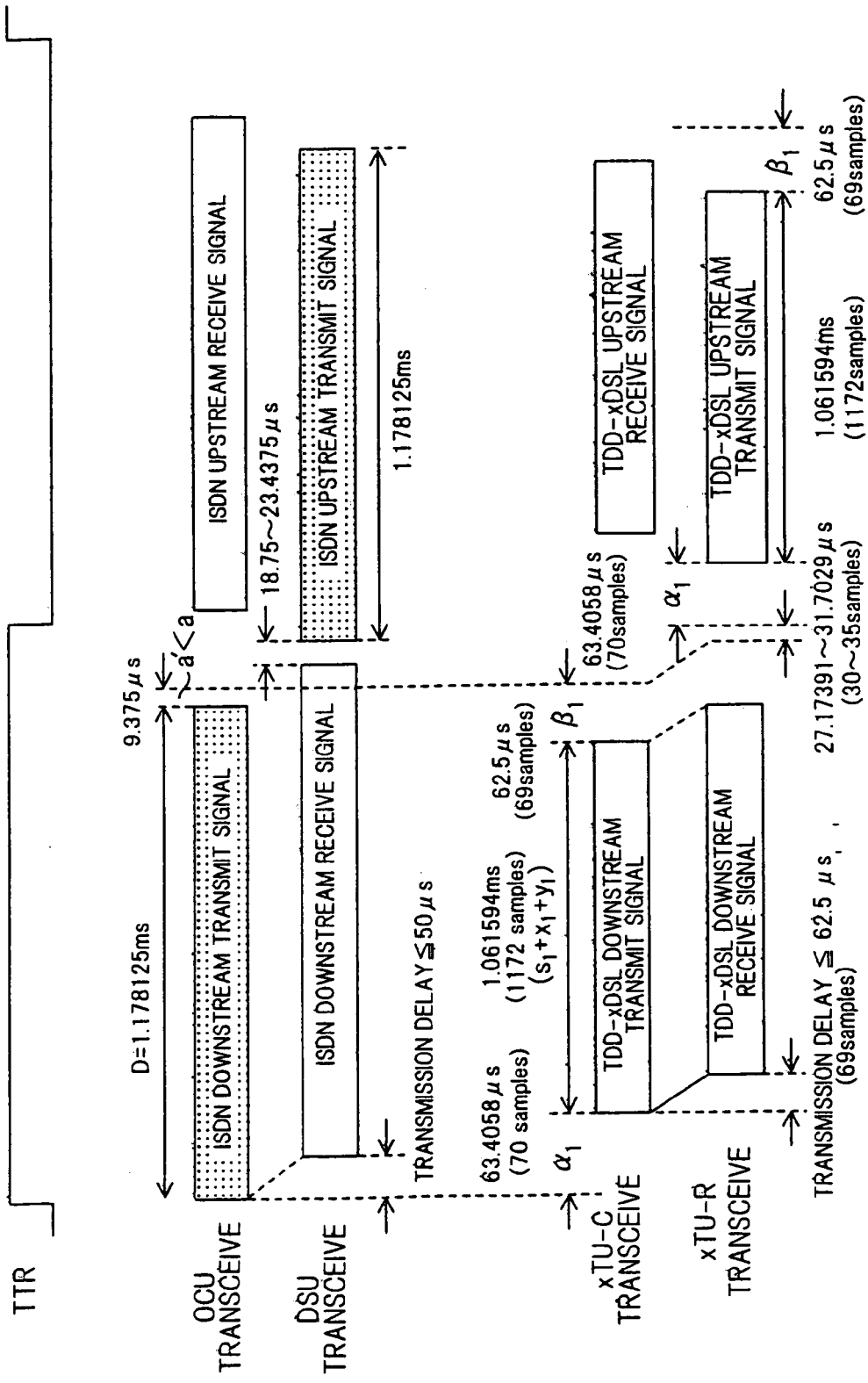
FIG. 28 is a diagram illustrating the structure of a burst frame (at the time of training) according to the second embodiment.
Figure 29:
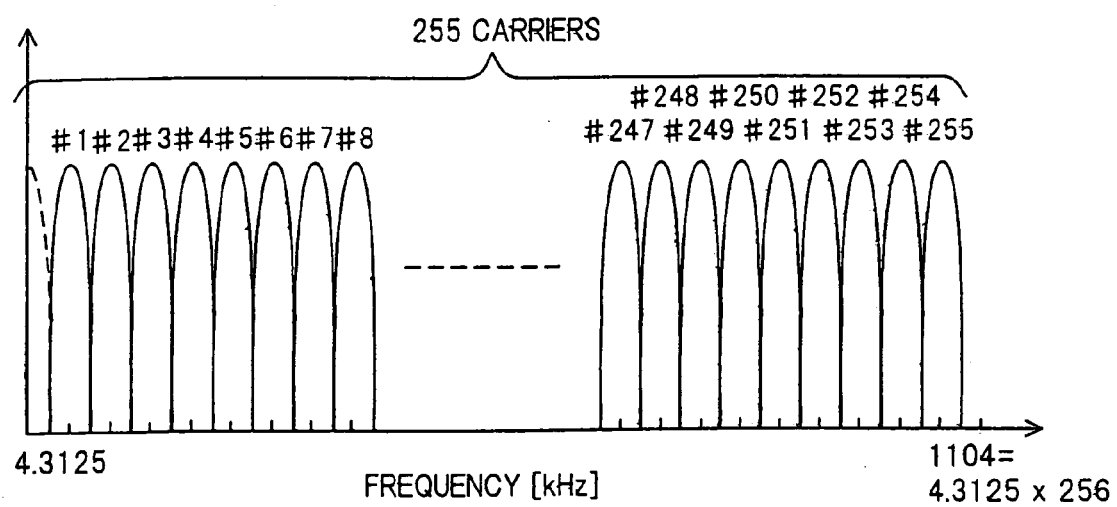
FIG. 29 is a diagram useful in describing a DMT transmission spectrum.

Similarly, the signal transmit interval at training time in the second embodiment is illustrated in FIG. 28.

Since the following hold:

$D+a'=1.1875$ ms (1311 samples)

$S1+x1+y1=1.061594$ ms (1172 samples)

we have $\alpha 1+\beta 1=125.9058$ μs (139 samples).

Accordingly, if it is so arranged that the TDD-xDSL signal transmit interval is brought to approximately the center of the transmit interval of the ISDN ping-pong transmission in a manner similar to that of the first embodiment, $\alpha 1=63.4057$ μs (70 samples) and $\beta 1=62.5$ μs (69 samples) are selected.

If the above-described first, second and third worst conditions are taken into consideration in the second embodiment, (1), (2) and (3) set forth below will hold, where the guard time between upstream and downstream signals is 27.17391 to 31.7029 μs (30 to 40 samples):

(1) 1.228125 ms (1355.85 samples) [latest end of ISDN downstream signal interval]

<1.27808 ms (1411 samples) [earliest beginning of TDD-xDSL upstream signal interval];

(2) 1.92029 ms (1316 samples) [latest end of TDD-xDSL downstream signal interval]

<1.96875 ms (1321.35 samples) [earliest beginning of ISDN upstream signal interval]; and (3) 2.475543 ms (2733 samples) [end of TDD-xDSL upstream signal interval]

<2.5 ms (2760 samples) [ISDN burst cycle].

In accordance with (1), the upstream signal of the TDD-xDSL transmission will not be transmitted earlier than the end of reception of the ISDN downstream signal even under the first worst condition.

In accordance with (2), the TDD-xDSL downstream signal is received earlier than the start of transmission of the ISDN upstream signal under the second worst condition.

In accordance with the (3), reception of the TDD-xDSL upstream signal ends earlier than start of transmission of the ISDN downstream signal of the next burst.

With reference to FIG. 26, the phase difference between the transmit symbol sequence 700 for normal communication and the transmit symbol sequence 500 at the time of training is 79.71014 μs (88 samples), which is equal to the pilot-tone cycle×22. Thus the phase difference is a whole-number multiple of the pilot tone (i.e., 22 times the pilot tone).

Thus, in a digital subscriber line transmission system based upon TDD-xDSL in accordance with the present invention, training for establishing communication can be speeded up, communication reliability can be enhanced and the structure of the communications equipment can be simplified over that of the prior art.

More specifically, in accordance with the present invention, it is so arranged that in a TDD-xDSL transmission, a DMT symbol sequence is transmitted upon adding some data that is contained within the DMT symbol sequence onto the beginning or end or onto both the beginning and end of the sequence as redundancy data at the time of training, which is carried out before normal communication, and the redundancy data is removed on the receiving side. As a result, distortion develops in the redundancy data but not in the training symbols. This makes it possible to carry out training using all training symbols and to shorten training time.

Further, in accordance with the present invention, the length of the transmit training symbol sequence after the redundancy data is added on is made such that the training symbol sequence will fall within the transmit interval of an ISDN ping-pong transmission or of another TDD-xDSL transmission. In other words, it is so arranged that the training symbol sequence will not fall within the receive interval (NEXT interval) of an ISDN ping-pong transmission or of another TDD-xDSL transmission. As a result, communication with an excellent S/N ratio can be performed by eliminating the effects of NEXT from ISDN ping-pong transmission or other TDD-xDSL transmission.

Further, in accordance with the present invention, it is so arranged that in a TDD-xDSL transmission, the frequency of a pilot tone serving as a timing regeneration signal is set so as to assure continuity of sample data in contiguous transmit burst symbol sequences, or such that the length of an interval in which there is no transmission of contiguous transmit burst symbol sequences is made a whole-number multiple of the pilot-tone cycle. As a result, the phase of a pilot tone will not shift between contiguous transmit burst symbol sequences and processing can be executed at an accurate timing on the receiving side.

Further, in accordance with the present invention, it is so arranged that in a TDD-xDSL transmission, the phase difference between the phase of a training symbol onto which a cyclic prefix used in transceiver training has not been added and the phase of a DMT symbol obtained by removing the cyclic prefix at the time of normal data communication is made a whole-number multiple of the pilot-tone cycle used as a timing regeneration signal. As a result, when there is a sequence transition from training to normal data communication, the timing regeneration signal (pilot tone) does not develop a phase shift. This makes accurate processing possible.

Further, in TDD-xDSL transmission according to the present invention, when the subscriber side is notified of transmit timing (the phase of an ISDN 400-Hz signal) of a TDD-xDSL burst signal on the office side, a tone signal the phase whereof varies one or more times within one transmission burst is transmitted separately of the pilot-tone signal, and this change in the phase of the tone signal is detected on the subscriber side to identify the transmit timing of the TDD-xDSL burst signal. As a result, a correct TDD-xDSL transmission can be performed by detecting the transmit timing (the phase of an ISDN 400-Hz signal) at the time of training of a TDD-xDSL transmission. In this case the phase of the tone signal can be changed 90 or 180°. This makes it possible to recognize transmit timing even if transmit timing (the phase of the ISDN 400-Hz signal) is unknown initially. Further, in accordance with the present invention, the subscriber side is capable of recognizing intervals in which the office side is influenced by crosstalk from neighboring lines and therefore can transmit upstream data to the office side upon removing these intervals.

As many apparently widely different embodiments of the present invention can be made without departing from the spirit and scope thereof, it is to be understood that the invention is not limited to the specific embodiments thereof except as defined in the appended claims.

What is claimed is:

1. A digital subscriber line transmission method for transmitting downstream data from a device on an office side to a device on a subscriber side and upstream data from the device on the subscriber side to the device on the office side over a single line by switching between these data transmissions in time-division fashion, dividing data of one symbol, modulating carrier waves having different frequencies by each item of divided data and frequency-multiplexing the modulated signals, and transmitting the frequency-multiplexed signals in bursts a few symbols at a time, wherein the bursts are contiguous transmit burst symbol sequences, said method comprising the steps of:

generating a pilot-tone signal with which synchronous processing of the symbol sequences is executed;

making the length of an interval between the contiguous transmit burst symbol sequences, in which no frequency-multiplexed signals are transmitted, a whole-number multiple of the cycle of the pilot-tone signal; and assuring continuity of sample data in the contiguous transmit burst symbol sequences by executing processing of the symbol sequences in sync with the pilot-tone signal.

2. The digital subscriber line transmission method according to claim 1, further comprising the steps of:

making a phase difference between a phase of a training symbol and a phase of a transmit symbol from which a cyclic prefix has been removed at a time of normal communication a whole-number multiple of a pilot-tone cycle; and executing training processing and processing for normal data communication in sync with the pilot-tone signal.

3. A digital subscriber line transmission apparatus for transmitting downstream data from a device on an office side to a device on a subscriber side and upstream data from the device on the subscriber side to the device on the office side over a single line by switching between these data transmissions in time-division fashion, dividing data of one symbol, modulating carrier waves having different frequencies by each item of divided data and frequency-multiplexing the modulated signals, and transmitting the frequency-multiplexed signals in bursts a few symbols at a time, wherein the bursts are contiguous transmit burst symbol sequences, said apparatus comprising:

a pilot-tone signal generator for generating a pilot-tone signal with which synchronous processing of the symbol sequences is executed;

means for making the length of an interval between the contiguous transmit burst symbol sequences, in which no frequency-multiplexed signals are transmitted, a whole-number multiple of the cycle of the pilot-tone signal; and means for executing processing of the symbol sequences in sync with the pilot-tone signal and assuring continuity of sample data in the contiguous transmit burst symbol sequences.

4. The digital subscriber line transmission apparatus according to claim 3, further comprising:

means for making a phase difference between a phase of a training symbol and a phase of a transmit symbol from which a cyclic prefix has been removed at a time of normal communication a whole-number multiple of a pilot-tone cycle; and means for executing training processing and processing for normal data communication in sync with the pilot-tone signal.

* * * * *